United States Patent
Katz

(10) Patent No.: US 6,512,415 B1
(45) Date of Patent: *Jan. 28, 2003

(54) TELEPHONIC-INTERFACE GAME CONTROL SYSTEM

(75) Inventor: Ronald A. Katz, Los Angeles, CA (US)

(73) Assignee: Ronald A. Katz Technology Licensing LP., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/340,618

(22) Filed: Jun. 28, 1999

Related U.S. Application Data

(63) Continuation of application No. 09/128,936, filed on Aug. 5, 1998, now Pat. No. 6,151,387, which is a continuation of application No. 08/559,538, filed on Nov. 16, 1995, now Pat. No. 5,793,846, which is a continuation of application No. 08/073,585, filed on Jun. 7, 1993, now Pat. No. 5,553,120, which is a continuation of application No. 07/534,907, filed on Jun. 8, 1990, now Pat. No. 5,218,631, which is a continuation-in-part of application No. 07/335,923, filed on Apr. 10, 1989, now Pat. No. 6,016,344, which is a continuation of application No. 07/194,258, filed on May 16, 1988, now Pat. No. 4,845,739, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned, said application No. 08/559,538, is a continuation-in-part of application No. 07/335,923, which is a continuation of application No. 07/194,258, which is a continuation-in-part of application No. 07/018,244, which is a continuation-in-part of application No. 06/753,299.

(51) Int. Cl.[7] .................................................. H04M 1/64
(52) U.S. Cl. .................................. 329/88.22; 379/93.13
(58) Field of Search ........................ 379/142.01, 127.01, 379/88.19, 88.2, 88.21, 88.22, 90.01, 92.01, 92.02, 93.03, 93.12, 93.13

(56) References Cited

U.S. PATENT DOCUMENTS 2,902,541 A    9/1959   Singleton (List continued on next page.)

FOREIGN PATENT DOCUMENTS

AU           66113/81          7/1981

(List continued on next page.)

OTHER PUBLICATIONS

Basinger, R. G., et al., "Calling Card Service–Overall Description and Operational Characteristics", The Bell System Technical Journal, Sep., 1982.

(List continued on next page.)

Primary Examiner—Scott L. Weaver
(74) Attorney, Agent, or Firm—Reena Kuyper; B. G. Nilsson

(57) ABSTRACT

A control system CS interfaces a multiplicity of individual terminals T1–Tn through a telephone network facility CO to accommodate game formats. At the terminals T1–Tn, callers are prompted by voice-generated instructions to provide digital data that is identified for positive association with a caller and stored, as for processing. Calls are conditionally accepted based on a test of preliminary identification data (ANI or DNIS). Computer generated designations are assigned to callers and stored. Questions for game use are stored in banks, classified by order of difficulty for selection according to various formats. Specific game formats accommodate various time criteria and caller selection of degree of risk. Caller data is stored in cells along with statistical and identification data; also, key contest data is held accessible in a cache memory for reporting. Caller data may be processed individually or in interrelated formats as with reference to random or source data as to establish progressive subsets. A break-off control circuit may terminate the computer interface aborting to a manual terminal for direct communication with an operator. Real-time operation processing is an alternative to subsequently processing stored data.

32 Claims, 3 Drawing Sheets

U.S. PATENT DOCUMENTS

| | | |
|---|---|---|
| 2,941,161 A | 6/1960 | Scantlin |
| 3,060,275 A | 10/1962 | Meacham et al. |
| 3,076,059 A | 1/1963 | Meacham et al. |
| 3,082,402 A | 3/1963 | Scantlin |
| 3,128,349 A | 4/1964 | Boesch et al. |
| 3,159,818 A | 12/1964 | Scantlin |
| 3,246,082 A | 4/1966 | Levy |
| 3,249,919 A | 5/1966 | Scantlin |
| 3,299,210 A | 1/1967 | Bandy |
| 3,337,847 A | 8/1967 | Olsson et al. |
| 3,347,988 A | 10/1967 | Marill et al. |
| 3,371,162 A | 2/1968 | Scantlin |
| 3,381,276 A | 4/1968 | James |
| 3,393,272 A | 7/1968 | Hanson |
| 3,394,246 A | 7/1968 | Goldman |
| 3,482,057 A | 12/1969 | Abbott et al. |
| 3,515,814 A | 6/1970 | Morgan |
| 3,544,769 A | 12/1970 | Hedin |
| 3,553,378 A | 1/1971 | Solomon et al. |
| 3,556,530 A | 1/1971 | Barr |
| 3,557,311 A | 1/1971 | Goldstien |
| 3,568,157 A | 3/1971 | Downing et al. |
| 3,569,939 A | 3/1971 | Doblmaier et al. |
| 3,571,799 A | 3/1971 | Coker, Jr., et al. |
| 3,573,747 A | 4/1971 | Adams et al. |
| 3,581,072 A | 5/1971 | Nymeyer |
| 3,594,004 A | 7/1971 | Barr |
| 3,617,638 A | 11/1971 | Jochimsen et al. |
| 3,618,038 A | 11/1971 | Stein |
| 3,624,292 A | 11/1971 | Guzak, Jr. |
| 3,644,675 A | 2/1972 | Waltington |
| 3,647,973 A | 3/1972 | James et al. |
| 3,651,480 A | 3/1972 | Downing et al. |
| 3,656,113 A | 4/1972 | Lince |
| 3,665,107 A | 5/1972 | Kopec et al. |
| 3,675,513 A | 7/1972 | Flanagan et al. |
| 3,688,126 A | 8/1972 | Klein |
| 3,696,335 A | 10/1972 | Lemelson |
| 3,697,702 A | 10/1972 | Buonsante et al. |
| 3,727,186 A | 4/1973 | Stephenson |
| 3,781,810 A | 12/1973 | Downing |
| 3,787,632 A | 1/1974 | Male et al. |
| 3,792,446 A | 2/1974 | McFiggins et al. |
| 3,794,774 A | 2/1974 | Kemmerly et al. |
| 3,800,283 A | 3/1974 | Gropper |
| 3,829,628 A | 8/1974 | Tripsas |
| 3,858,032 A | 12/1974 | Scantlin |
| 3,870,821 A | 3/1975 | Steury |
| 3,881,160 A | 4/1975 | Ross |
| 3,889,050 A | 6/1975 | Thompson |
| 3,909,553 A | 9/1975 | Marshall |
| 3,912,874 A | 10/1975 | Botterell et al. |
| 3,914,747 A | 10/1975 | Barnes et al. |
| 3,918,174 A | 11/1975 | Miller et al. |
| 3,920,908 A | 11/1975 | Kraus |
| 3,928,724 A | 12/1975 | Byram et al. |
| 3,934,095 A | 1/1976 | Matthews et al. |
| 3,940,569 A | 2/1976 | Schonbrun |
| 3,947,972 A | 4/1976 | Freeman |
| 3,950,618 A | 4/1976 | Bloisi |
| 3,974,338 A | 8/1976 | Luzier et al. |
| 3,982,103 A | 9/1976 | Goldman |
| 3,987,252 A | 10/1976 | Vicari |
| 3,989,899 A | 11/1976 | Norwich |
| 3,991,406 A | 11/1976 | Downing et al. |
| 3,998,465 A | 12/1976 | Mascola |
| 4,009,342 A | 2/1977 | Fahrenschon et al. |
| 4,012,599 A | 3/1977 | Meyer |
| 4,017,835 A | 4/1977 | Randolph |
| 4,024,345 A | 5/1977 | Kochem |
| 4,054,756 A | 10/1977 | Comella et al. |
| 4,068,099 A | 1/1978 | Mikkola |
| 4,071,698 A | 1/1978 | Barger, Jr. et al. |
| 4,078,316 A | 3/1978 | Freeman |
| 4,087,638 A | 5/1978 | Hayes et al. |
| 4,088,838 A | 5/1978 | Nakata et al. |
| 4,090,034 A | 5/1978 | Moylan |
| 4,090,038 A | 5/1978 | Biggs |
| 4,108,361 A | 8/1978 | Krause |
| 4,117,278 A | 9/1978 | Ehrlich et al. |
| 4,121,052 A | 10/1978 | Richard |
| 4,145,578 A | 3/1979 | Orriss |
| 4,150,255 A | 4/1979 | Theis et al. |
| 4,152,547 A | 5/1979 | Theis |
| 4,160,125 A | 7/1979 | Bower et al. |
| 4,160,129 A | 7/1979 | Peyser et al. |
| 4,162,377 A | 7/1979 | Mearns |
| 4,187,498 A | 2/1980 | Creekmore |
| 4,191,376 A | 3/1980 | Goldman |
| 4,191,860 A | 3/1980 | Weber |
| 4,192,972 A | 3/1980 | Bertoglio et al. |
| 4,194,089 A | 3/1980 | Hashimoto |
| 4,200,770 A | 4/1980 | Hellman et al. |
| 4,201,887 A | 5/1980 | Burns |
| 4,221,933 A | 9/1980 | Cornell et al. |
| 4,223,183 A | 9/1980 | Peters, Jr. |
| 4,232,199 A | 11/1980 | Boatwright et al. |
| 4,241,942 A | 12/1980 | Bachman |
| 4,242,539 A | 12/1980 | Hashimoto |
| 4,243,844 A | 1/1981 | Waldman |
| 4,255,618 A | 3/1981 | Danner et al. |
| 4,255,619 A | 3/1981 | Saito |
| 4,260,854 A | 4/1981 | Kolodny et al. |
| 4,264,924 A | 4/1981 | Freeman |
| 4,264,925 A | 4/1981 | Freeman et al. |
| 4,270,024 A | 5/1981 | Theis et al. |
| 4,277,649 A | 7/1981 | Sheinbein |
| 4,290,141 A | 9/1981 | Anderson et al. |
| 4,299,637 A | 11/1981 | Oberdeck et al. |
| 4,302,810 A | 11/1981 | Bouricius et al. |
| 4,303,804 A | 12/1981 | Johnson et al. |
| 4,307,266 A | 12/1981 | Messina |
| 4,314,103 A | 2/1982 | Wilson |
| 4,317,961 A | 3/1982 | Johnson |
| 4,320,256 A | 3/1982 | Freeman |
| 4,323,770 A | 4/1982 | Dieulot et al. |
| 4,328,396 A | 5/1982 | Theis |
| 4,338,494 A | 7/1982 | Theis |
| 4,338,798 A | 7/1982 | Hedges et al. |
| 4,345,315 A | 8/1982 | Cadotte et al. |
| 4,348,554 A | 9/1982 | Asmuth |
| 4,355,207 A | 10/1982 | Curtin |
| 4,355,372 A | 10/1982 | Johnson et al. |
| 4,360,827 A | 11/1982 | Braun |
| 4,360,875 A | 11/1982 | Behnke |
| 4,371,752 A | 2/1983 | Matthews et al. |
| 4,376,875 A | 3/1983 | Beirne |
| 4,389,546 A | 6/1983 | Glisson et al. |
| 4,393,277 A | 7/1983 | Besen et al. |
| 4,398,708 A | 8/1983 | Goldman et al. |
| 4,401,856 A | 8/1983 | Curtin et al. |
| 4,405,829 A | 9/1983 | Rivest et al. |
| 4,420,656 A | 12/1983 | Freeman |
| 4,427,848 A | 1/1984 | Tsakanikas |
| 4,428,296 A | 1/1984 | Scheuchzer et al. |
| 4,439,635 A | 3/1984 | Theis et al. |
| 4,439,636 A | 3/1984 | Newkirk et al. |
| 4,445,001 A | 4/1984 | Bertoglio |
| 4,451,700 A | 5/1984 | Kempner et al. |
| 4,468,528 A | 8/1984 | Reece et al. |
| 4,475,198 A | 10/1984 | Herr et al. |

| | | | | | |
|---|---|---|---|---|---|
| 4,489,438 A | 12/1984 | Hughes | 4,685,127 A | 8/1987 | Miller et al. |
| 4,490,583 A | 12/1984 | Bednarz et al. | 4,688,170 A | 8/1987 | Waite et al. |
| 4,494,197 A | 1/1985 | Troy et al. | 4,689,742 A | 8/1987 | Troy et al. |
| 4,511,764 A | 4/1985 | Nakayama et al. | 4,692,817 A | 9/1987 | Theis |
| 4,517,410 A | 5/1985 | Williams et al. | 4,694,490 A | 9/1987 | Harvey et al. |
| 4,517,412 A | 5/1985 | Newkirk et al. | 4,696,028 A | 9/1987 | Morganstein et al. |
| 4,518,824 A | 5/1985 | Mondardini | 4,696,029 A | 9/1987 | Cohen |
| 4,518,827 A | 5/1985 | Sagara | 4,697,282 A | 9/1987 | Winter et al. |
| 4,521,643 A | 6/1985 | Dupuis et al. | 4,704,725 A | 11/1987 | Harvey et al. |
| 4,523,055 A | 6/1985 | Hohl et al. | 4,706,275 A | 11/1987 | Kamil |
| 4,532,378 A | 7/1985 | Nakayama et al. | 4,710,955 A | 12/1987 | Kauffman |
| 4,539,436 A | 9/1985 | Theis | 4,715,061 A | 12/1987 | Norwich |
| 4,539,735 A | 9/1985 | Eckmann | 4,716,583 A | 12/1987 | Groner et al. |
| 4,541,087 A | 9/1985 | Comstock | 4,719,647 A | 1/1988 | Theis et al. |
| 4,544,804 A | 10/1985 | Herr et al. | 4,722,526 A | 2/1988 | Tovar et al. |
| 4,547,851 A | 10/1985 | Kurland | 4,745,468 A | 5/1988 | Von Kohorn |
| 4,549,047 A | 10/1985 | Brian et al. | 4,747,124 A | 5/1988 | Ladd |
| 4,549,291 A | 10/1985 | Renoulin | 4,748,668 A | 5/1988 | Shamir et al. |
| 4,555,594 A | 11/1985 | Friedes et al. | 4,750,199 A | 6/1988 | Norwich |
| 4,559,415 A | 12/1985 | Bernard et al. | 4,756,020 A | 7/1988 | Fodale |
| 4,559,416 A | 12/1985 | Theis et al. | 4,757,267 A | 7/1988 | Riskin |
| 4,562,342 A | 12/1985 | Solo | 4,759,056 A | 7/1988 | Akiyama |
| 4,565,903 A | 1/1986 | Riley | 4,761,684 A | 8/1988 | Clark et al. |
| 4,566,030 A | 1/1986 | Nickerson et al. | 4,761,807 A | 8/1988 | Matthews et al. |
| 4,567,359 A | 1/1986 | Lockwood | 4,761,808 A | 8/1988 | Howard |
| 4,570,930 A | 2/1986 | Matheson | 4,763,191 A | 8/1988 | Gordon et al. |
| 4,577,062 A | 3/1986 | Hilleary et al. | 4,764,666 A | 8/1988 | Bergeron |
| 4,577,067 A | 3/1986 | Levy et al. | 4,766,604 A | 8/1988 | Axberg |
| 4,578,700 A | 3/1986 | Roberts et al. | 4,769,834 A | 9/1988 | Billinger et al. |
| 4,580,012 A | 4/1986 | Matthews et al. | 4,774,655 A | 9/1988 | Kollin et al. |
| 4,581,486 A | 4/1986 | Matthews et al. | 4,781,377 A | 11/1988 | McVean et al. |
| 4,582,956 A | 4/1986 | Doughty | 4,782,510 A | 11/1988 | Szlam |
| 4,584,602 A | 4/1986 | Nakagawa | 4,782,519 A | 11/1988 | Patel et al. |
| 4,585,903 A | 4/1986 | Schiller et al. | 4,783,796 A | 11/1988 | Ladd |
| 4,585,906 A | 4/1986 | Matthews et al. | 4,783,800 A | 11/1988 | Levine |
| 4,586,707 A | 5/1986 | McNeight et al. | 4,785,408 A | 11/1988 | Britton et al. |
| 4,587,379 A | 5/1986 | Masuda | 4,785,473 A | 11/1988 | Pfeiffer et al. |
| 4,591,190 A | 5/1986 | Clark | 4,788,682 A | 11/1988 | Vij et al. |
| 4,591,664 A | 5/1986 | Freeman | 4,788,715 A | 11/1988 | Lee |
| 4,591,665 A | 5/1986 | Foster et al. | 4,788,716 A | 11/1988 | Zebe |
| 4,592,546 A | 6/1986 | Fascenda et al. | 4,788,718 A | 11/1988 | McNabb et al. |
| 4,594,476 A | 6/1986 | Freeman | 4,789,928 A | 12/1988 | Fujisaki |
| 4,598,367 A | 7/1986 | DeFrancesco et al. | 4,791,664 A | 12/1988 | Lutz et al. |
| 4,599,493 A | 7/1986 | Cave | 4,791,666 A | 12/1988 | Cobb et al. |
| 4,600,809 A | 7/1986 | Tatsumi et al. | 4,792,968 A | 12/1988 | Katz |
| 4,603,232 A | 7/1986 | Kurland et al. | 4,796,293 A | 1/1989 | Blinken et al. |
| 4,611,094 A | 9/1986 | Asmuth et al. | 4,797,818 A | 1/1989 | Cotter |
| 4,611,096 A | 9/1986 | Asmuth et al. | 4,797,910 A | 1/1989 | Daudelin |
| 4,614,367 A | 9/1986 | Breen | 4,797,911 A | 1/1989 | Szlam et al. |
| 4,625,079 A | 11/1986 | Castro et al. | 4,797,913 A | 1/1989 | Kaplan et al. |
| 4,625,081 A | 11/1986 | Lotito et al. | 4,799,156 A | 1/1989 | Shavit et al. |
| 4,625,276 A | 11/1986 | Benton et al. | 4,799,255 A | 1/1989 | Billinger et al. |
| 4,630,200 A | 12/1986 | Ohmae et al. | 4,800,583 A | 1/1989 | Theis |
| 4,630,201 A | 12/1986 | White | 4,805,207 A | 2/1989 | McNutt et al. |
| 4,634,809 A | 1/1987 | Paulsson et al. | 4,805,209 A | 2/1989 | Baker, Jr. et al. |
| 4,635,251 A | 1/1987 | Stanley et al. | 4,812,843 A | 3/1989 | Champion, III et al. |
| 4,640,991 A | 2/1987 | Matthews et al. | 4,815,031 A | 3/1989 | Furukawa |
| 4,645,873 A | 2/1987 | Chomet | 4,815,121 A | 3/1989 | Yoshida |
| 4,649,563 A | 3/1987 | Riskin | 4,815,741 A | 3/1989 | Small |
| 4,652,998 A | 3/1987 | Koza et al. | 4,827,500 A | 5/1989 | Binkerd et al. |
| 4,654,482 A | 3/1987 | DeAngelis | 4,829,563 A | 5/1989 | Crockett et al. |
| 4,658,417 A | 4/1987 | Hashimoto et al. | 4,832,341 A | 5/1989 | Muller |
| 4,663,777 A | 5/1987 | Szeto | 4,835,630 A | 5/1989 | Freer |
| 4,665,502 A | 5/1987 | Kreisner | 4,842,278 A | 6/1989 | Markowicz |
| 4,669,730 A | 6/1987 | Small | 4,845,739 A | 7/1989 | Katz |
| 4,671,512 A | 6/1987 | Bachman et al. | 4,847,890 A | 7/1989 | Solomon et al. |
| 4,672,660 A | 6/1987 | Curtin | 4,850,007 A | 7/1989 | Marino et al. |
| 4,674,044 A | 6/1987 | Kalmus et al. | 4,852,154 A | 7/1989 | Lewis et al. |
| 4,677,552 A | 6/1987 | Sibley, Jr. | 4,853,882 A | 8/1989 | Marshall |
| 4,677,553 A | 6/1987 | Roberts et al. | 4,856,050 A | 8/1989 | Theis et al. |
| 4,685,123 A | 8/1987 | Hsia et al. | 4,856,066 A | 8/1989 | Lemelson |

| Patent Number | Date | Inventor |
|---|---|---|
| 4,866,756 A | 9/1989 | Crane et al. |
| 4,876,592 A | 10/1989 | Von Kohorn |
| 4,876,717 A | 10/1989 | Barron et al. |
| 4,878,240 A | 10/1989 | Lin et al. |
| 4,881,261 A | 11/1989 | Oliphant et al. |
| 4,882,473 A | 11/1989 | Bergeron et al. |
| 4,893,325 A | 1/1990 | Pankonen et al. |
| 4,893,328 A | 1/1990 | Peacock |
| 4,893,330 A | 1/1990 | Franco |
| 4,894,857 A | 1/1990 | Szlam et al. |
| 4,896,345 A | 1/1990 | Thorne |
| 4,896,346 A | 1/1990 | Belfield et al. |
| 4,897,867 A | 1/1990 | Foster et al. |
| 4,899,373 A | 2/1990 | Lee et al. |
| 4,899,375 A | 2/1990 | Bauer et al. |
| 4,907,079 A | 3/1990 | Turner et al. |
| 4,908,761 A | 3/1990 | Tai |
| 4,908,850 A | 3/1990 | Masson et al. |
| 4,908,852 A | 3/1990 | Hird et al. |
| 4,916,726 A | 4/1990 | Morley, Jr. et al. |
| 4,922,519 A | 5/1990 | Daudelin |
| 4,922,520 A | 5/1990 | Bernard et al. |
| 4,922,522 A | 5/1990 | Scanlon |
| 4,926,462 A | 5/1990 | Ladd et al. |
| 4,932,021 A | 6/1990 | Moody |
| 4,933,965 A | 6/1990 | Hird |
| 4,937,853 A | 6/1990 | Brule et al. |
| 4,942,598 A | 7/1990 | Davis |
| 4,942,599 A | 7/1990 | Gordon et al. |
| 4,942,616 A | 7/1990 | Linstroth et al. |
| 4,943,995 A | 7/1990 | Daudelin et al. |
| 4,951,307 A | 8/1990 | Willard |
| 4,955,047 A | 9/1990 | Morganstein et al. |
| 4,959,783 A | 9/1990 | Scott et al. |
| 4,959,855 A | 9/1990 | Daudelin |
| 4,961,217 A | 10/1990 | Akiyama |
| 4,964,157 A | 10/1990 | Aoshima |
| 4,965,825 A | 10/1990 | Harvey et al. |
| 4,969,183 A | 11/1990 | Reese |
| 4,969,185 A | 11/1990 | Dorst et al. |
| 4,972,461 A | 11/1990 | Brown et al. |
| 4,974,252 A | 11/1990 | Osborne |
| 4,975,945 A | 12/1990 | Carbullido |
| 4,989,233 A | 1/1991 | Schakowsky et al. |
| 4,989,234 A | 1/1991 | Schakowsky et al. |
| 4,992,940 A | 2/1991 | Dworkin |
| 4,996,705 A | 2/1991 | Entenmann et al. |
| 5,000,486 A | 3/1991 | Rua, Jr. et al. |
| 5,001,710 A | 3/1991 | Gawrys et al. |
| 5,003,574 A | 3/1991 | Denq et al. |
| 5,003,595 A | 3/1991 | Collins et al. |
| 5,014,298 A | 5/1991 | Katz |
| 5,017,917 A | 5/1991 | Fisher et al. |
| 5,018,736 A | 5/1991 | Pearson et al. |
| 5,023,904 A | 6/1991 | Kaplan et al. |
| 5,033,076 A | 7/1991 | Jones et al. |
| 5,033,088 A | 7/1991 | Shipman |
| 5,036,535 A | 7/1991 | Gechter et al. |
| 5,046,183 A | 9/1991 | Dorst et al. |
| 5,054,059 A | 10/1991 | Stern et al. |
| 5,083,272 A | 1/1992 | Walker et al. |
| 5,097,528 A | 3/1992 | Gursahaney et al. |
| 5,109,414 A | 4/1992 | Harvey et al. |
| 5,125,024 A | 6/1992 | Gokcen et al. |
| 5,127,003 A | 6/1992 | Doll, Jr. et al. |
| 5,128,984 A | 7/1992 | Katz |
| 5,146,491 A | 9/1992 | Silver et al. |
| 5,148,474 A | 9/1992 | Haralambopoulos et al. |
| 5,164,981 A | 11/1992 | Mitchell et al. |
| 5,168,548 A | 12/1992 | Kaufman et al. |
| 5,179,585 A | 1/1993 | MacMillan, Jr. et al. |
| 5,181,236 A | 1/1993 | LaVallee et al. |
| 5,181,238 A | 1/1993 | Medamana et al. |
| 5,186,471 A | 2/1993 | Vancraeynest |
| 5,199,062 A | 3/1993 | Von Meister et al. |
| 5,214,689 A | 5/1993 | O'Sullivan |
| 5,222,120 A | 6/1993 | McLeod et al. |
| 5,233,654 A | 8/1993 | Harvey et al. |
| 5,236,199 A | 8/1993 | Thompson, Jr. |
| 5,255,183 A | 10/1993 | Katz |
| 5,263,723 A | 11/1993 | Pearson et al. |
| 5,289,531 A | 2/1994 | Levine |
| 5,299,260 A | 3/1994 | Shaio |
| 5,303,298 A | 4/1994 | Morganstein |
| 5,303,299 A | 4/1994 | Hunt et al. |
| 5,327,554 A | 7/1994 | Palazzi, III et al. |
| 5,333,185 A | 7/1994 | Burke et al. |
| 5,335,277 A | 8/1994 | Harvey et al. |
| 5,351,276 A | 9/1994 | Doll, Jr. et al. |
| 5,351,285 A | 9/1994 | Katz |
| 5,353,335 A | 10/1994 | D'Urso et al. |
| 5,354,069 A | 10/1994 | Guttman et al. |
| 5,361,295 A | 11/1994 | Solomon et al. |
| 5,369,685 A | 11/1994 | Kero |
| 5,403,999 A | 4/1995 | Entenmann et al. |
| 5,415,416 A * | 5/1995 | Scagnelli et al. ........ 379/93.13 |
| 5,416,830 A | 5/1995 | MacMillan, Jr. et al. |
| 5,418,844 A | 5/1995 | Morrisey et al. |
| 5,475,205 A | 12/1995 | Behm et al. |
| 5,490,207 A | 2/1996 | Schorr |
| 5,511,112 A | 4/1996 | Szlam |
| 5,537,143 A | 7/1996 | Steingold et al. |
| 5,561,710 A | 10/1996 | Helms |
| 5,599,046 A | 2/1997 | Behm et al. |
| 5,623,536 A | 4/1997 | Solomon et al. |
| 5,651,048 A | 7/1997 | Leeuw |
| 5,709,603 A | 1/1998 | Kaye |
| 5,709,609 A | 1/1998 | Kaye |
| 5,768,348 A | 6/1998 | Solomon et al. |
| 5,787,156 A | 7/1998 | Katz |
| 5,790,636 A | 8/1998 | Marshall |
| 5,815,551 A | 9/1998 | Katz |
| 5,835,576 A | 11/1998 | Katz |

FOREIGN PATENT DOCUMENTS

| | | |
|---|---|---|
| CA | 1022674 | 12/1977 |
| CA | 1025118 | 1/1978 |
| CA | 1056500 | 6/1979 |
| CA | 1059621 | 7/1979 |
| CA | 1162336 | 2/1984 |
| CA | Pub. 1225759 | 8/1987 |
| CA | 2009937-2 | 8/1990 |
| DE | OS 2929416 | 2/1981 |
| DE | 32 25 562 | 1/1984 |
| DE | OS 3726366 | 2/1988 |
| DE | 4005365 A1 | 8/1990 |
| EP | 0 120 322 | 2/1984 |
| EP | 0 217 308 A2 | 4/1987 |
| EP | 0 229 170 A | 7/1987 |
| EP | Pub. 0249575 | 12/1987 |
| EP | 0 249 795 | 12/1987 |
| EP | Pub. 0295837 | 12/1988 |
| EP | Pub. 0342295 | 11/1989 |
| EP | Pub. 0434181 | 6/1991 |
| EP | 0 451 693 A2 | 10/1991 |
| EP | 0 451 695 A2 | 10/1991 |
| EP | 0 453 831 A2 | 10/1991 |
| EP | 0 454 363 A2 | 10/1991 |
| EP | 0 568 114 A | 11/1993 |
| EP | 0 620 669 A | 10/1994 |
| EP | 0 438 860 B1 | 9/1996 |
| EP | 0 382 670 B1 | 4/1997 |

| | | |
|---|---|---|
| EP | 0 382 212 B1 | 7/1998 |
| EP | 0 917 335 A2 | 5/1999 |
| FR | 2 575 016 | 7/1986 |
| FR | 9002131 | 8/1990 |
| GB | 1162484 | 4/1967 |
| GB | 2184327 A | 6/1987 |
| GB | 2 230 403 A | 10/1990 |
| GB | 2 252 270 B | 8/1992 |
| GB | 2253542 | 9/1992 |
| JP | 52-17739 | 2/1977 |
| JP | Pub. 52-17740 | 9/1977 |
| JP | 54-62708 | 5/1979 |
| JP | Pub. 56-152365 | 11/1981 |
| JP | 59-83270 | 5/1984 |
| JP | 62-92654 | 4/1987 |
| JP | 62-98848 | 5/1987 |
| JP | Pub. 62-239757 | 10/1987 |
| JP | 500138/88 | 1/1988 |
| JP | 63-009353 | 1/1988 |
| JP | 63-114442 | 5/1988 |
| JP | 63-246067 | 10/1988 |
| JP | 1-117436 | 5/1989 |
| JP | 298158/90 | 12/1990 |
| JP | 41855/91 | 2/1991 |
| WO | WO 82/02132 | 6/1982 |
| WO | WO 87/00375 | 1/1987 |
| WO | WO88/02966 | 4/1988 |
| WO | WO88/05985 | 8/1988 |
| WO | WO89/02139 | 3/1989 |
| WO | WO89/09530 | 10/1989 |
| WO | WO 89/11768 | 11/1989 |
| WO | WO 90/10989 | 9/1990 |
| WO | WO 90/11661 | 10/1990 |
| WO | WO 91/15818 | 10/1991 |
| WO | WO 92/06548 | 4/1992 |
| WO | WO 92/09164 | 5/1992 |
| WO | WO 92/15166 | 9/1992 |
| WO | WO93/05483 | 3/1993 |

OTHER PUBLICATIONS

Confalone, D. E., et al, "Calling Card Service–TSPS Hardware, Software, and Signaling Implementation", The Bell System Technical Journal, Sep., 1982.
Eigen, D.J., et al., "Calling Card Service–Human Factors Studies", The Bell Technical Journal, Sep., 1982.
Lexis Search, Nov. 1, 1984, re: System 85 Computer Process.
Lexis Search, Jan. 28, 1985, re: Rolm Releases Four–Channel Phonemail Voice Message Unit.
Lexis Search Results (Great American Potato–Chip giveaway/Raisin Bran Game/Giants Baseball Trivia–Dial Info): "In The Chips" AdWeek, Jul. 22, 1985.
"San–Fran–Police–League", Business Wire, Aug. 2, 1985.
"Similar Campaigns", DM News, Dec. 15, 1985.
"Phone Offers Action At Push Of Button", Advertising Age, Feb. 6, 1986.
Boies Stephen J., "A Computer Based Audio Communication System", Computer Sciences Department, Thomas J. Watson Research Center, Yorktown Heights, New York, USA, pp. 701–704—(Article) (Undated).
Winckelmann, W.A., "Automatic Intercept Service", Bell Laboratories Record, May 1968, vol. 46, No. 5, pp. 138–143–(Article).
"Proposed Agreement Between National Enterprises Board (N.E.B.) and Delphi", Jan. 30. 1979.
Voysey, Hedley, "Nexos wins rights to comms engine", Computing, Sep. 6, ??, vol. 7, No. 36–(Article).

"Appraisal Of The Fair Market Value Of Delphi Communications", Apr. 30, 1980—(Study) Delphi Communications–(Charts and Exhibits).
"Voice–Response System Improves Order Entry, Inventory Control", Communication News, Aug. 1976–(Article).
"Periphonecs VOICEPAK"–(Brochure) (Undated).
"The Voice Response Peripheral That Turnes Every Touch–Tone Telephone Into A Computer Terminal", Periphonics Corporation–(Brochure) (Undated).
Rabin, Jeff, "Minorities Seek 30% Share of All Lottery Operations", Sacramento Bee, Apr. 12, 1985–(Article).
Advertisements (Dial Giants Baseball Trivia Game): San Francisco Chronicle, Jul. 3, 1984.
Curtis, Cathy, "976 numbers let you dial–a–whatever", San Francisco Business Journal, Nov. 26, 1984–(Article).
Ferrell, Jane, "Three little numbers for instant information", San Francisco Chronicle, Aug. 15 1984–(Article).
"Dallas Telephone Call–In Game Uses Computer Voice Interface", Sep. 24, 1984–(Press Release).
Rivest, R.L., et al., "A Method for Obtaining Digital Signatures and Public–Key Cryptosystems", Communications of the ACM, Feb. 1978, vol. 21, No. 2, pp. 120–126— (Article).
Finnegan, Paul F, "Audiotex: The telephone as data–access equipment", Data Communications, 1987, pp. 155–161 (Article).
Ozawa, Y., et al., "Voice Response System and Its Applications", Hitachi Review, Dec. 1979, vol. 28, No. 6, pp. 301–305–(Article).
"AT&T 2: Reaches agreement with Rockwell (ROK)", Aug. 26, 1986–(Press Release).
"AT&T: Expands Computer speech system product line", Apr. 14, 1986–(Press Release).
Adams, Cynthia, "Conversing With Computers", Computerworld on Communications, May 18, 1983, vol. 17, No. 20A, pp. 36–44–(Article).
Hester, S.D., et al., "The AT&T MultiMode Voice Systems–Full Spectrum Solutions For Speech Processing Applications", Sep. 1985, pp. 1–10–(Proceedings Of The 1985 AVIOS Conference).
Davidson, Leon, "A Pushbutton Telephone For Alphanumeric Input", Datamation, Apr. 1966, pp. 27–30–(Article).
Advertisement: Cuervo Gold Beach Chair, VoiceMail Int'l, '83.
"Digital's All–In–1 Voice Messaging", Digital–(Brochure) (Undated).
"Access Voice and Mail Messages From One Familiar Source", Insight, –(Article) (Undated).
"Get The Message . . . !" "New VoiceMail Features", Voicemail International, Inc., Oct. 1984–(Article).
Brochures (TWA Crew Scheduling/PSA's Reservation System/Universal Studios Program/Dow Phone): "AVIAR The communication system that keeps you flying", VoiceMail Int'l–(Brochure) (Undated).
"TWA Voicemail, Flight Attendants Users Guide" Aug. 1986–(Brochure).
Holtzman, Henry, "Voice Mail Soars At TWA", Modern Office Technology (Reprint), Mar. 1986–(Article).
"Bid Results via Voicemail—Flight Deck Crew Members", May 1, 1985 (Script).
Borden, W.S., "Flight Attendant Self Input Of Monthly Bids Via Touch Tone Telephone", In–Flight Services Bulletin, Sep. 15, 1985–(Memo).

"Look Ma, no operators! Automatic voice system doesmany airline jobs", *Air Transport World,* Oct. 1986–(Article).

"1,000,000 Share Common Stock", *Voicemail International, Inc.,,* Jan. 10, 1984–(Public Offering Summary).

Levinson, S.E., et al., "A Conversational–Mode Airline Information and Reservation System Using Speech Input and Output", *The Bell System Technical Journal,* Jan. 1980, vol. 59, No. 1, pp. 119–137.

Emerson, S.T., "Voice Response Systems—Technology to the Rescue for Business Users", *Speech Technology,* Jan/Feb '83, pp. 99–103–(Article).

Moslow, Jim, "Emergency reporting system for small communities", *Telephony,* Feb. 11, 1985, pp. 30–32, 34–(Article).

Rabiner, L.R., et al., "Digital Techniques for Computer Voice Response: Implementation and Applications", *Proceedings Of The IEEE,* Apr. 1976, vol. 64, No. 4, pp. 416–432–(Article).

Moosemiller, J.P., "AT&T's Conversant™ I Voice System" *Speech Technology,* Mar./Apr. 1986, pp. 88–93–(Article).

Frank, R.J., et al., "No. 4 ESS: Mass Announcement Capability", *The Bell System Technical Journal,* Jul./Aug. 1981, vol. 60, No. 6, Part 2, pp. 1049–1081–(Chapter from a Book).

"Chapter I General Description" *D.I.A.L. PRM/Release 3–Version 2* Mar. 1987 (Product Reference Manual).

"Announcing Release 3.3" *D–A–S–H– D.I.A.L. Application and Support Hints,* Jan./Feb. Mar. 1987, vol. 3, No. 1–(Brochure).

"D.I.A.L. Software Relase 4", *OPCOM,* Jan. 1988, Version 1–(Product Reference Manual).

Brady, R.L., et al., "Telephone Identifier Interface", *IBM Technical Disclosure Bulletin,* Oct. 1976, vol. 19, No. 5, pp. 1569–1571—(Article).

Corbett, A.J., "Telephone Enquiry System Using Synthetic Speech", *University of Essex,* Dec. 1974, (Thesis).

Yoshizawa, K., et al., "Voice Response System for Telephone Betting", *Hitachi Review,* Jun. 1977, vol. 26, No. 6–(Article).

Sagawa, S., et al., "Automatic Seat Reservation By Touch–Tone Telephone", *Second USA Japan Computer Conference,* 1975, vol. 2, pp. 290–294–(Article).

Smith, S.L., "Computer–Generated Speech and Man–Computer Interaction", *Human Factors,* 1970, 12(2), pp. 215–223–(Article).

Newhouse, A., et al., "On The Use Of Very Low Cost Terminals", *University of Houston,* pp. 240–249–(Paper) (Undated).

Mullen, R.W., "Telephone—home's 'friendliest' Computer", *Inside Telephone Engineer And Management,* May 15, 1985, vol. 89, No. 10–(Article).

"Telephone Computing Entering Service Bureau Business", *American Banker,* Jul. 5, 1979–(Article).

Kutler, Jeffrey, "Technology, System Sharing Improve Phone Banking Outlook", *American Banker,* Dec. 7, 1979, vol. CXLIV, No. 237–(Article).

Kutler, Jeffrey, "Phone Bill Paying Accessed by Pioneer", *American Banker,* Dec. 7, 1979, vol. CXLIV, No. 237–(Article).

"User's Guide", *Dowphone* (Undated).

"Audiotex Information From Dow Jones", *The Computer Review,* Nov. 1984, vol. 2, No. 1–(Article).

"Dow Phone Adds Innovest Systems' Technical Analysis Reports" *IDP Report,* Jan. 3, 1986–(Report).

Perdue, R.J., et al., "Conversant 1 Voice System: Architecture and Applications", *AT&T Technical Journal,* Sep./Oct. 1986–(Article).

Martin, James, "Design of Man–Computer Dialogues", *IBM System Research Institute,* Chapter 16, pp. 283–306–(Chapter from a Book) (Undated).

Kaiserman, D.B., "The Role Of Audio Response In Data Collection Systems", *Proceedings of the Technical Sessions,* Paleis des Expositions, Geneva, Switzerland, Jun. 17–19, 1980, pp. 247–251–(Article).

Boies, S.J., et al., "User Interface for Audio Communication System", *IBM Technical Disclosure Bulletin,* Dec. 1982, vol. 25, No. 7A, pp. 3371–3377–(Article).

Kramer, J.J., "Human Factors Problems in the Use of Pushbutton Telephones for Data Entry", *Bell Telephone Laboratories,* Holmdel, N.J., Apr. 74, pp. 241–258–(Paper).

Cox, Jr., Floyd, "Flor Fax", Jan. 22, 1986–(Letter and Advertisements).

Isayama, Tetsuya, "Automatic Response Processing Equipment as a Multi–media Communication Node", *Japan Telecommunications Review,* 1987, vol. 29, No. 1, pp. 29–36–(Article).

Imai, Y., et al., "Shared Audio Information System Using New Audio Response Unit" *Japan Telecommunications Review,* Oct. 1981, vol. 23, No. 4, pp. 383–390–(Article).

"Distrust of computer kills home service plan" (date and source missing).

"Automatic Call Distributor/Management Information System: Interface between 1/1AESS™ Switch Central Office and Customer Premises Equipment", *Bell Communications Research,* Dec. 1986, Technical Reference TR–TSY–000306, Issue 1–(Article).

"Comparison Of ACD Systems", *Connection,* Feb. 1990–(Chart).

"ACD Comparison", *Aspect,* Feb. 2, 1990–(Final Report).

Borison, V.S., "Transaction–telephone gets the fact at the point of sale", *Bell Laboratories Record,* Oct. 1975, pp. 377–383–(Article).

Demeautis, M., et al., "The TV 200 A Transactional Telephone", *Commutation & Transmission n 5,* 1985, pp. 71–82–(Article).

Eriksson, G., et al., "Voice and Data Workstations and Services in the ISDN", *Ericsson Review.,* May 1984, pp. 14–19–(Article).

Schrage, Michael, "A Game Von Meister in Pursuit of Profits", *Washington Post,* Sep. 23, 1985–(Article).

Svigals, J., "Low Cost Point–Of–Sale Terminal", *IBM Technical Disclosure Bulletin,* Sep. 1982, vol. 25, No. 4, p. 1835.

Turbat, A., "Telepayment An Electronic Money The Smart Card", *Commutation & Transmission n 5,* 1982, pp. 11–20–(Article).

"Voice Mail", *Sound & Communications,* Apr. 1983, vol. 28, No. 12, pp. 84–85–(Article).

Aso, Satoshi, "Trends and Applications of Voice Output Devices"*2209 J.E.E. Journal of Electronic Engineering,* Feb. 1982, vol. 19, No. 182, pp. 102–107–(Article).

Kroemer, F., "TELEBOX", Unterrichtsblätter, year 38/1985, No. 4, pp. 131–141 (Article)–no translation.

Kroemer, F., "TELEBOX", Unterrichtsblätter, year 41/1988, No. 2, pp. 67–83 (Article)–no translation.

C.R. Newson, "Merlin Voice Mail VM600," British Telecommunications Engineering, vol. 4, Apr. 1985, pp. 32–35.

A.S. Yatagai, "Telephonic Voice Synthesis Systems," Telecommunications, Aug. 1985, pp. 56h–I, 68.

A.J. Waite, "Getting Personal With New Technologies For Telemarketers," DM News, Feb. 15, 1987 at 50.

"Shopping via a network is no longer just talk," Data Communications, Aug. 1981 at 43.

"Growth–Oriented Systems," Restaurant Technology, Nation's Restaurant News Newspaper, Jul. 1, 1985 at 51.

"Let your fingers do the tapping . . . and the computer the talking," Modern Office Tech., May 1984 at 80.

"American Software unveils systems for IBM mainframes," Computerworld, Mar. 26, 1984 at 59.

"Business Units Get Order Entry," Computerworld, Jul. 12, 1982 at 36.

"AT&T's Response to Plaintiff's Second Set on Interrogatories to Defendant AT&T Corp. (Nos. 17–18)", *Ronald A. Katz Technology Licensing, L.P. and MCI Telecommunications Corp.*, Civil Action No. 97–4453 (USDC, ED PA).

Lanzeter, Ygal, "Automatic Number Identification System for Step–By–Step Exchanges", *The Ninth Convention of Electrical and Electronics Engineers in Israel*, Apr. 1975–(Paper).

Flanagan, J.L. et al., "Speech Synthesis", Chapters 1, 39, 42, 45 and 46 –(Chapter from a Book).

"Bell Atlantic's Bolger Wants to be Free", *Telephony*, Jul. 14, 1686–(Article).

"Advanced New Cable TV Technology Developed for Impulse–Pay–Per–View", Jun. 3, 1985–(Search).

Noll, M.A. "Introduction to Telephones & Telephone Systems", Second Edition, Chapter 9–(Chapter form a Book).

"Proposal for Kome Mediavoice interactive Phone/Database Marketing Systems", "Mediavoice Startup Software Package For Kome ", "Optional Mediavoice Software Packages For Kome ", "Why ATI Mediavoice is the Choice for Success"–(Proposal).

Meade, Jim, Dec., 29, 1992–(Letter).

"All About Voice Response", *Datapro Research Corporation*, Delran, N.J. Mar. 1972 and Sep. 1974–(Article).

"Voice Response in Banking Application", *Datapro Research Corporation*, Delran, N.J., Oct. 1974 and Feb. 1983–(Article).

Schiller, T.R., "Field Craft Technician Communication with a Host Computer Synthesized Voice", *Proceedings AVIOS '86 Voice I/O Systems Applications Conference*, Sep. 16–18, 1986.

Ravin, Richard, "Telephone Access Applications: the Growth Market for Voice Processing", *Proceedings AVIOS '86 Voice I/O Systems Applications Conference*, Oct. 6–8, 1987.

Schuster, E.R., "B.R.U.T.U.S. Better Registration Using Touch–Tone phones for University Students", *Proceedings AVIOS '86 Voice I/O Systems Applications Conference*, Oct. 4–6, 1988.

"Exxon's Next Prey–IBM and XEROX", *BusinessWeek*, Apr. 28, 1980, pp. 92–96 and 103–(Article).

Weinstein, S.B. "Emerging Telecommunications Needs of the Card Industry", *IEEE Communications Magazine*, vol. 22, No. 7, pp. 26–31–(Article).

"Riding Gain", *Broadcasting*, Mar. 7, 1983–(Article).

Pickup, Mike, "Bank from home, by Screen or by phone", *Building Society Gazette*, July 1988–(Article).

Rabiner, L.R., et al., "Isolated and Connected Work Recognition–Theory and Selected Applications", *IEEE Transaction Communications*, May 1981, Com. 29, No. 5, pp.621, 622, 633, 644–646, 655–659–(Article).

Takahashi, K., et al., "The Audio Response System for Telelphone Reservation", *U.D.C.*

Oka, Y. et al., "Development of Ventilating Equipment for Shinkansan Train", *U.D.C.*–(Articles In Japanese).

Pagones, M.J., et al., "New services follow increased digitization on the long–haul transmission network", *AT&T Bell Laboratories Record*, 1983, vol. 61, pp. 25–33–(Article).

"New phone service tells customer who's calling", *Bell Laboratories Record*, 1984, vol. 62, p. 9–(Article).

Hirschman, C.B., et al., "LASS: Putting the telephone customer in charge", *Bell Laboratories Record*, 1985, vol. 63, pp. 10–16–(Article).

"AT&T building communications network for Defense Department" and "AT&T inaugurates pay–per–view TV", *Bell Laboratories Record*, 1986, vol. 64, p. 2–(Article).

"Power to...", *Dialogic Corporation*, Littleton Road, –(unidentifiable Article).

"Representative Customer List For Interface Technology's Total Entry System", "Toes Solutions–Pharmaceutical Manufacturer", "The Voice Response Solution For Answering Customer/Sales Calls", "Toes Solutions–Orthopedic Equipment" and "Toes Solutions–Convenience Store"–(Articles).

Lummis, R.C., "Speaker Verification: A Step Toward the "Checkless" Society", *Bell Laboratories Record*, pp. 254–259–(Article).

Flanagan, J.L., et al., "Synthetic voices for computers", *IEEE Spectrum*, Oct. 1970, vol. 7, No. 10, pp. 22–45–(Article).

Rabiner, L.R. et al., "Computer Synthesis of Speech by Concatenation of Formant–Coded Words", *the Bell System Technical Journal*, May/Jun. 1971, pp. 1541–1558–(Chapter from a Book).

Flanagan, J.L., et al., "Wiring Telephone Apparatus form Computer–Generated Speech", *The Bell System Technical Journal*, Feb. 1972, pp. 391–397–(chapter from a Book).

Hornsby, Jr., Thomas G., "Voice Response Systems", *Modern Data*, Nov. 1972, pp. 46–50–(Article).

Diffie, W., et al., "New Directions in Cryptography", *IEEE Transactions On Information Theory*, Nov. 1976, vol. IT–22, No. 6, pp. 644–654–(Article).

Rosenthal, L.H., et al., "Automatic voice response: interfacing man with machine", *IEEE Spectrum*, Jul. 1974, vol. 11, No. 7–(Article).

Rosenthal, L.H. et al., "A Multiline Computer Voice Response System Utilizing ADPCM Coded Speech", *IEEE Transactions on Acoustics, Speech, and Signal Processing*, Oct. 1974, vol. ASSP–22, No. 5, pp. 339–352–(Article).

Flanagan, James L., "Computers that Talk and Listen: Man–Machine Communication by Voice", *Proceedings for the IEEE*, Apr. 1976, vol. 64, No. 4, pp. 405–415–(Article).

Maisel, Ivan, "To Put Your Baseball Savvy on the Line, Pick Up The Phone And Call", *Sports Illustrated*, Sep. 3, 1984–(Script).

Brown, Merrill, "Hollywood Saga: Who Bought J.R.?", *the Washington Post*, Final Edition, Oct. 14, 1984–(Script).

"SPECIAL–OLYMPICS; Teams with baseball trivia expert Brad Curtis", *Business Wire*, Sep. 30, 1985–(Script).

Lucas, W.A., et al., "The Spartanburg Interactive Cable Experiments in Home Education", *Rand Corp.*, U.S. Department of Commerce, National Technical Information Service, Feb., 1979–(Publication).

Martin, James, "Viewdata And The Information Society", –(Book).

Cummings, J.L., et al., "AT&T Network Architecture Evolution", *AT&T Technical Journal*, May/Jun. 1987, vol. 66, Issue 3, pp. 2–12–(Article).

Yates, C.E., "Telemarketing and Technology: Perfect Business Partners", *AT&T Technology*, 1987, vol. 1, No. 3, pp. 48–55–(Article).

Herr, T.J., "ISDN Application in Public Switched Networks", *AT&T Technology*, 1987, vol. 2, No. 3, pp. 56–65–(Article).

"Only the best. Only from Florafax", *Florafax*–(Advertisement).

Aldefeld, B., et al., "Automated Directory Listing Retrieval System Based on Isolated Word Recognition", *Proceedings of the IEEE*, No. 1980, vol. 68, No. 11, pp. 1364–1379–(Article).

Rabiner, L.R., et al., "On the Application of Embedded Training to Connected Letter Recognition for Directory Listing Retrieval", *AT&T Bell Laboratories Technical Journal*, Mar. 1984, vol. 63, No. 3, pp. 459–477–(chapter from a Book).

Rosenberg, A.E., et al., "Recognition of Spoken Spelled Names for Directory Assistance Using Speaker–Independent Templates", *The Bell System Technical Journal*, Apr. 1980, vol. 59, No. 4, pp. 571–592–(Chapter from a Book).

Schulman, Roger, "TeleLearning: The Computer Brings the Classroom Home"*Family Computing*, Sep. 1984, pp. 50–53–(Article).

"ICS launches new ?–home interactive video service package", *Cable Vision*, Sep. 3, 1984, pp. 71/73–(Article).

"Four–Line TeleClerk Calls, Answers, Stores, Surveys", *Hardcopy*, Jan. 1985, vol. 14, No. 1–(Article).

"The Remarketing of Prestel", *Which Computer?*Aug. 1984, pp. 106, 107 and ?–(Article).

"Peripheral Speaks On Phone", *Hardcopy*, Dec. 1984–(Article).

"The voicestar Series By Periphonics", *Periphonics*, Jan. 1986–(Publication).

"Bank–From–Home system by Periphonics Corporation", "Bill Payment Success Story", *Periphonics Corporation*, "A History of Imagination", *Periphonics*, "Banking Success Story", *Periphonics Corporation*, "DataVoice and the PDT II", *Periphonics Corporation*, "Banking Success Story", *Periphonics Corporation*–(Brochures).

Page from *What's new in Computing*, Apr. 1985–(Article).

Page from *Today*, A Compuserve Publication, Jun. 1985–(Article).

Page from *Computer Communications*, Feb. 1984, vol. 7, No. 1–(Article).

Gits, Victoria, "Interactive device doesn't interrupt telephone calls", *Cable Vision*, Jun. 17, 1985, p. 20–(Article).

Cuilwik, Tony, "Reach Out & Touch The Unix System", *Unix Review*, Jun. 1985, pp. 50, 52, 53, 56–(Article).

Blackwell, Gerry, "Dial–a–Quote: first Canadian commerical audiotex service", *Computing Canada*–(Article).

Applebaum, Simon, "Two–way television", *Cable Vision*, Aug. 8, 1983, p. 66–(Article).

Sw??ne, Michael, "Fiber–optic TV network lets viewers talk back", *Info World*–(Article).

Morrill, C.S., et al., "User Input Mode and Computer–Aided Instruction", *Human Factors*, 1968, 10(3), pp. 225–232–(Chapter from a Book).

Results of Lexis Search Request for "Dial Info or Dialinfo", Date of Search Apr. 13, 1992, pp. 1–38.

Results of Lexis Search Request for "Phone Programs or International Information Network", Date of Search Apr. 15, 1992, pp. 1–35.

Van Gieson, Jr. W.D., et al., "Machine–Generated Speech For Use With Computers, and the problem of fitting a spoken word into one half second", *Computers and Automation*, Nov. 1968, pp. 31–34–(Article).

Patel, Jay, "Utility of voice response system depends on its flexibility", *Bank Systems & Equipment*, Dec. 1988, pp. 101–103–(Article).

Buron, R.H., "Generation of a 1000–Word Vocabulary for a Pulse–Excited Vocoder Operating as an Audio Response Unit", *IEEE Transactions On Audio And Electroacoustics*, Mar. 1986, vol. AU–16, No. 1, pp. 21–25–(Article).

Gaines, B.R., et al., "Some Experience in Interactive System Development and Application", *Proceedings of the IEEE*, Jun. 1975, vol. 63, No. 6, pp. 894–911–(Article).

"Application For Registration of Equipment To Be Connected To The Telelphone Network", *Federal Communication Commission*, FCC Form 730.

Dudley, Homer, "The Vocoder", Circuit Research Department, Dec. 1939, pp. 122–128–(Chapter from a Book).

"Voice Response System Order Entry, Inventory Control".

"Vendor Index", *Audiotex Directory & Buyer's Guide*, Fall/Winter 1989/90, pp. 114–156.

Francas, M., et al., "Input Devices For Public Videotex Services", *Human–Computer Interaction INTERACT '84*, 1985, pp. 171–175–(paper).

Labrador, C., et al., "Experiments In Speech Interaction With Conventional Data Services", *Human–Computer Interaction–INTERACT '84*, 1985, pp. 225–229–(paper).

Long, J., et al., "Transaction Processing Using Videotex or: Shopping on Prestel", *Human–Computer Interaction–INTERACT '84*, 1985, pp. 251–255–(paper).

*Electrical Communication*, 1981, vol. 56, Nos. 1–4, pp. 1–110–(Paper).

Conway, R.W., et al., "Tele–CUPLA: A Telephone Time Sharing System", *Communication of the ACM*, Sep. 1967, vol 10, No. 9, pp. 538–542–(Article).

Marill, T., et al., "DATA–DIAL: Two–Way Communication with Computers From Ordinary Dial Telephones", *Communications of the ACM*, Oct. 1963, vol. 6, No. 10, pp. 622–624–(Article).

Witten, I.H., "Communicating With Microcomputers", pp. 121–158–(chapter from a Book).

"Call–It–Co. Hangs Up On Dial–It In Four Markets", *The 976 Exchange*, 1984, vol. 2, pp. 1–6 (Article).

"DECtalk Help Boston's Shawmut Bank Cut Costs And Improve Service", *Digital*–(Article).

"VTK 81 Voice Computer", *Voicetek*, 1987 (Brochure).

"How a computerized "Voice" Answers Customers' Inquiries", *Bank Automation Newsletter*, Feb. 1985, vol. 19, No. 2 (Article).

Rickman, J., et al., "Speech Synthesizers–Communications Interface–Implementing A Touch Tone Telephone Talker With DECtalk", *The DEC Professional*, May 1985, pp. 38, 39, 42–44 (Article).

"DECTALK DELIVERS", *Digital Review*, Sep. 1985–(Article).

"DECtalk turns a telephone into a terminal", "UNIX and Digital", "Legal protection for semiconductor chips", "Product safety", *–DECWORLD*, Apr. 1985, vol. 9, No. 2, pp. 1, 3, 5, 6–8–(Article).

"DECtalk: A New Text–to–Speech Product", *Digital Guideline*, Mar. 1984, vol. 8, No. 3, pp. 1–8–(Article).
*Straight Talk*, A Newsletter About the DECtalk Speech Synthesizer from Digital Equipment Corporation, vol. 1, No. 1, pp. 1–6.
*Straight Talk*, A Newsletter About the DECtalk Speech Synthesizer from Digital Equipment Corporation, vol. 1, No. 2, pp. 1–7.
*Straight Talk*, A Newsletter About the DECtalk Speech Synthesizer from Digital Equipment Corporation, vol. 1, No. 3, pp. 1–8.
*Straight Talk*, A Newsletter About the DECtalk Speech Synthesizer from Digital Equipment Corporation, vol. 1, No. 4, pp. 1–8.
*Straight Talk*, A Newsletter About the DECtalk Speech Synthesizer from Digital Equipment Corporation, vol. 2, No. 2, pp. 1–8.
*Straight Talk*, A Newsletter About the DECtalk Speech Synthesizer from Digital Equipment Corporation, vol. 2, No. 4, pp. 1–8.
Various References/Articles attached with a letter from Smithwin Associates, dated Apr. 22, 1992: Riley, A.A., "Latest: 2–way communication by computer and telephone".
??evens, W. ?., "Computer Helps Children to Add", *The New York Times*, Apr. 20, 1970.
Harvey, R.W., *Times*, The Kiplinger Magazine.
"Hardware for the 'cashless society", *Electronic Design 3*, Feb. 4, 1971, p. 26.
Tennant, R.P., "Advanced credit system smooths operation and hastens payout", *Data Processing Magazine*, Jun. 1971, vol. 13, No. 6, pp. 34–35.
"Computers that talk back to you", *Business Week*Date ??.
Smith, Gene, "Chatting Via Computer", *New York Times*, Sep. 12, 1971.
*EDP Weekly*, (unidentifiable Article).
"Did Anybody Here Call a computer", *Data Management*, Feb. 196?.
Skala, Martin, "Straight talk from a Computer"*Christian Science Monitor*, Jun. 14, 1973.
"Computer for Watergate Probe", *Science*, Jun. 15, 1973.
"Tapping AT&T for a $50–million refund", *Business Week*, Jun. 9, 1973.
"Distrust of computer kills home service plan".
Scherer, Ron, "Chitchat with a computer", *Christian Science Monitor*, Apr. 16, 1975, p. 2.
"Trying Out the Pay–By–Phone Service", *Technology Review*, Mar./Apr. 1976, p. 15.
"Pentagon seeks more control", *Electronics*, Apr. 5, 1976. p. 39.
"Everyman's Computer Terminal", *Industrial Research*, Mar./Apr. 1976, p. 14.
"DOD could save on test equipment".
"Talking computer speeds Ford parts", Apr. 25, 1976.
"Customers of Ten bAnks Paying Bills by Phone", *Computer World*, 1976, p.12.
"FAA to test computerized voice response to queries for pilots", *Electronics*, Nov. 25, 1976, p. 43.
Miller, F.W., "Voice Response Comes to Life with Order Entry", *Infosystems*, Oct. 1981. pp.62/64.
Suppes, Patrick, "University–Level Computer–Assisted Instruction At Stanford: 1968–1980", *Institute for Mathematical Studies In The Social Sciences, Stanford University*, 1981, pp. 589–716.
Lerner, E.J., "Products that talk", *IEEE spectrum*, Jul. 1982, pp. 32–37.
Carlsen, Clifford, "Megaphone plans to blare message on national scale", *Time*, Mar. 2, 1987.
Michelson, Marlene, "All kinds of information at your fingertips by phone"*Business Times*, Sep. 8, 1986, vol. 3, No. 19.
Lacter, Mark, "At Megaphone, It's Always Show Time", *San Francisco Chronicle*, Jun. 9, 1986.
Table of Contents, *Megaphone Press Book*, pp. 1–3.
"Miss Simpson, will you dial–a–joke for me please?", Cartoon.
Lacter, Mark, "At Megaphone, It's always Show Time", *San Francisco Chronicle*, Jun. 9, 1986, Year No. 123, (different perspective).
Lacter, Mark, "Narrating Fantasy Messages–It's No Dream Job", *San Francisco Chronicle*, Jun. 9, 1986.
"Megaphone Serves High–Tech Showbiz", *San Francisco Chronicle*, Jun. 9, 1986;
"Megaphone Reaches Unique Market", *San Francisco Chronicle*, Jun. 9, 1986.
Feuer, Jack, "Asher/Gould: Megaphone Dials–a–Shop", *Adweek*, May 12, 1986.
Symanovich, Steve, "Novelty over for phone porn vendors", and continuation "Big firms breathing down necks of small phone porn outfits" *San Francisco Business Journal*, May 5, 1986.
Wilke, John, "A 'Dream'Business that's Just A Phone Call Away", *Information Processing*.
Ketcham, D.E., "Dial–a–You–Name–It", *San Francisco Chronicle*, 1986.
Carter, Alan, "What?You didn't know Erica was engaged again?", *Daily News*, Mar. 12, 1986.
"Firm plugs into sales with time, temp lines", *Crain's New York Business*, Mar. 3, 1986, vol. II, No. 9.
Pitts, Gail, "Phone–in trivia games ring up profits", *The Denver Post*, Feb. 3, 1986.
"Merge Towards Success", IIN and Megaphone, *the 976 Exchange*, Winter 19?6, vol. 4.
Nelson, David, "From dating to soap operas, 976 numbers come on line", *San Jose Business Journal Magazine*, Jan. 27, 1986.
Greengard, Samuel, "Dial–A–Deluge", *Business*, Nov. 1985.
"Numbers, Please", *Business*, Nov. 1985.
"The 976 Telelease Co.", *Business Opportunities Journal*, Dec. 1985.
"One–time refund for '976'charges"*San Francisco Examiner*, Nov. 7, 1985.
Kent, Debra, "Interactive phone network stretches for calls", *Advertising Age*Oct. 17, 198?.
"Making Your Phone Talk To Computers", *U.S. News*, Sep. 23, 1985.
Mulqueen, John, "Int'l Information Network Eyes Contact With British Telecom", *Communications Week*, Sep. ??.
Moorhead, Derrol, "Humor, romance: just a call away", *Rocky Mountain Collegian*, Sep. 19, 1985, vol. 94, Iss. 32.
Keppel, Bruce, "Move Under Way to Curb Abuse of Popular Dial–It Service", *Los Angeles Times*, Sep. 1, 1985.
"Dial–a–stock", *Forbes*, Aug. 1985.
Sowa, Tom, "Games people play now include phone trivia", *Spokesman–Review*, July 1985.
Dougherty, P.H., "Advertising Telephone Is Growing As Medium", *The New York Times*, Jul. 17, 1985.

Larson, Judy, "976 numbers entice adults–and kids", *Fremont Argas*, Jul. 8, 1985.
Barbieri, Richard, "Prime Time for the Telephone", *Channels*, May/Jun. 1985, pp. 54–55.
"Bank Provides Financial Fuel To Fast Track Company", *The Financial Center Bank*, First Quarter 1985, vol. II, No. 1.
"Don't Phone Santa", *San Francisco Chronicle*, Letters to the Editor, Mar. 29, 1985.
Carvalho, Deborah, "Will Hillary find happiness with Bob?", *Contra Costa Times*, Mar. 15, 1985.
Murphy, Win, "Dial–a–romance", Mar. 13–19, 1985.
?, Martha, "Love, laughs, luck: Just a phone call away", *Burlington County Times*, Feb. 17, 1985.
Robinett, Stephen, "Blood From A Rock", Venture, Jan. 1985, pp. 38–41, 44–45.
Du Brow, Rick, "Lates hot lines for instant trivia pursuit", *Los Angeles Herald Examiner*, Dec. 6, 1984.
"Keep up with your favorite soap operas", *Contra costa Times*, Nov. 30, 1984.
Hanna, Barbara, "Inside Radio/TV".
Behr, Debra, "'Victory'makes and writes its own on–the–road news", and "Whose calling? Michael fans most likey...", *Los Angeles times*, Nov. 29, 1984.
"Newcomer MEGAPHONE Has Magnanimous Goals", *The 976 Exchange*, Fall 1984, vol. 2.
"Phone Santa", *Vecaville Reporter*, Nov. 10, 1984.
"Dial 976 for Profits", *Time*, Sep. 3, 1984.
Pendleton, Mike, "For A Fee Your Phone Can Inform", *Burrelle's*, Jul. 19, 1984.
"Phone numbers to get details about soaps", *Burrelle's*, Jul. 18, 1984
Gansberg, A.L., "976 phone prefix as new entertainment fad", *The Hollywood Reporter*, Jun. 21, 1984.
Carvalho, Deborah, "Another 'GH' actor discontented with the soap", *Contra Costa Times*, May 26, 1984, p. 4.
"Keep up with your favorite soap operas", *San Fransisco Examiner*.
Du Brow, Rick, "'Dial–a–soap'service offers daily TV summaries", *Los Angeles Herald Examiner*, Apr. 26, 1984.
News briefs, Feb. 1966.
Martin, J., et al., "The Computerized Society–An apprisal of the impact of computers on society over the next fifteen years", Chapter 10, pp. 211–226–(Chapter from a Book).
New products, *Datamation*, Jul. 1966, vol. 12, No. 7, pp.7/89–(Article).
Meacham, L.A. et al., "Tone ringing and Pushbutton Calling", *The Bell System Technical Journal*, 1958, pp. 339–360–(Book).
Suppes, Patrick, "The Uses of Computers in Education", *Scientific American*, Sep. 1966, vol. 215, No. 3, pp.–(Article).
Bruckert, E., et al., "Three–tiered software and VLSI aid developmental system to read text aloud", *Electronics*, Apr. 21, 1983, pp. 133–138–(Article).
Hochman, David, "Implementing Automatic Number Identification", *Telecommunications*, Dec. 1978, vol. 12, No. 12–(Article).
Martin, James, "Telecommunications and the Computer", 2nd Edition, Introduction, pp. 20–23, Chapter 5, pp. 94–95, Chapter 18–(Chapter from a Book).
Martin, James, "Telematic Society", Chapter 6, pp. 45–48, Chapter 9, pp. 67–69, Chapter 20, pp. 181–188–(Chapters from a Book).

Martin, James, "The Wired Society", pp. 53–55, 71–79, 99–100, 204–205, 229–231–(Chapters from a Book).
Martin, James, "Future Developments in Tele–Communications", 2nd Edition, Box A, Chapter 1, p. 5, Chapter 7, pp. 95–111, Chapter 9, pp. 149–105, Chapter 12, pp. 207–209, Chapter 18, pp. 310–311, Chapter 19, pp. 314–317, 320, Chapter 20, pp. 330, Chapter 23, pp. 379–401–(Chapters from a Book).
Ferrarini, E.M., "Infomania", pp. 59–61, 176–177, 191, 213–214, 223, 245, 250, 257, 285, 286–(Book).
Kimura, Y., et al., "Audio Response System", vol. 55, No. 10, pp. 49–54–(Article in Japanese).
Dial Infro Articles (varous articles with varios dates) (R0016101–R0016188).
Svigals, J., "Security Method for Remote Telephone Banking," IBM Technical Disclosure Bulletin, vol. 23, No. 12, May 1981, pp. 5306–5307 (pb424).
AT&T Conversant Voice Response Systems Historical Overview, Jan. 1988 (FD 023585–FD23596).
"All About Automated Attendant Systems," Datapro Research Corporation, Mar. 1987 (SM 1000682–SM 1000691).
"New Product–Dytel's Automated Switchboard Attendant," reprinted from Business Communications Review, Mar.–Apr. 1984, pp. 39–41 (SM10006976–SM1000699).
Arbogast, James G. et al., "Home Diabetes Monitoring Through Touch–Tone Computer Data Entry and Voice Synthesizer Response, " Annual Symposium on Computer Applications in Medical Care 8th Care Proceedings–Eighth Annual Symposium on Computer Applications in Medical Care, 1984 (MMI 020731).
Perdue, Robert J., et al., "AT&T Voice Processing System Architectures, ", Technical Journal, Sep./Oct. 1990, pp. 52–60 (MMI 024142–MMI 024151).
Sable, E.G., et al., "AT&T Network Services Architecture Capabilities, Administration and Performance," AT&T Technical Papers, International Switching Symposium–ISS '87, AT&T Network Systems, Mar. 15, 1987.
"The Stored Program Controlled Network", The Bell System Technical Journal, Sep. 1982.
The World's Telephones, A Statical Compilation as of Jan. 1980, AT&T Long Lines, 1981 (Book).
Engineering and Operations in the Bell System, AT&T Bell Laboratories, 1983 (Book).
Joel, A.E., "A History of Engineering and Science in the Bell System, Switching Technology (1925–1975)," Bell Telephone Laboratories, 1982 (Book).
"ISDN–Proceedings of the conference held in San Francisco, Nov. 1986," OnLine, New York: London.
Raack, G. A. et al., "Customer Control of Network Services," IEEE Communications Magazine, Oct. 1984 (A21717089) also ISS 84, Florence Italy, May 1984.
Soderberg, J.H., "Machines at your Fingertips," Bell Laboratories Record, Jul. 1969 (A21717175).
Gawrys, G.W. et al., "A New Protocol for Call Handling Functions for the SPC Network," Globecrom '82 Conference Record, Nov./Dec. 1982.
Buss, C.M., "Tuning the Human/Machine Interface for AT&T Advanced 800 Service,"IEEE, Jul. 1985.
Asmuth, R.L., et al., "Transaction Capabilities for Network Services," Globecom '85 IEEE Global Telecommunications Conference, New Orleans, Dec. 1985.

Mahood, Gerald K., "Human Factors in TOUCH–TONE Data Systems," Bell Laboratories Record, Dec. 1971 (A21717170).

"4 ESS System Evolution," Bell System Technical Journal, Aug. 1981.

Takano, H., "Characteristics of Multipair Exchange Area Telephone Cable with Cellular Polyethylene Insulation by Gas Injection Blouing", p. 55–(Article in Japanese).

Takahashi, T., et al., "SR–2000 Voice Processor and Its Application", *NEC Research and Development*, 1984, No. 73, pp. 98–105–(Paper).

"Concept Diagram Voicemail International System", "Voicemail Instruction Manual", *Televoice International*, Jun. 1981, Index.

Eckhouse, John, "Voice mail spells relief for phone frustration", *San Francisco Examiner*, Feb. 7, 1982–(Article).

Meade, Jim, "Throw away those pink Call–back slips", InterOffice, Jan./Feb. 1984, vol. 3, No. 1–(Article).

Welsh, Jack, "Everbody's Talking About Talking Bouquets", *Design for Profit*, Spring 1986, pp. 7–10–(Article).

Mosco, Vincent, "Pushbutton Fantasies", Contents, Chapter 3 and 4, pp. 67–118–(Chapters from a Book).

Bretz, Rudy, "Media for Interactive Communication", Chapter 5, pp. 110–116, Chapter 7, pp. 143–153–(Chapters from a Book).

Robinson, G., et al., ""Touch–Tone"Teletext A Combined Teletext–Viewdata System", *IEEE Transactions on Consumer Electronics*, Jul. 1979, vol. CE–25, No. 3, pp. 298–303–(Article).

Voice News, Mar. 1982.

Voice News, Jun. 1982, *William W. Creitz*.

Voice News, Oct. 1982, p. 5.

Voice News, Nov./Dec. 1983.

"Consultant Report 28?", *AIS American Bell Advanced Information Systems*, Apr. 1983, pp. 27, 118–119, 123–124–(Report).

"T–1 Board Sets Deliver High Performance All Digital T–1 Solutions", *NMS Natural MicroSystems*–(Product Bulletin).

"VBX Product Family Overview", *NMS Natural MicroSystems*pp. 1–20–(Brochure).

"Machine Opertation Manual", May 12, 1978, Issue 1, pp. 1–3, 9–10–(Manual).

Davey, J.P., "Dytel Western Region Sales Training Manual", 1985–(Manual).

Gutcho, Lynette, "DECtalk–A Year Later", *Speech Technology*, Aug./Sep. 1985, pp. 98–102–(Article).

Daniels, Richard "Automating Customer Service", *Insurance Software Review*, Aug./Sep. 1989, pp. 60–62–(Article).

Golbey, S.B., "Fingertip Flight Service", Oct. 1985–(Article).

"ARO Goes Pushbutton", *Newsletter*, Nov. 1985, p. 9–(Article).

"ROLM Centralized Attendant Service", *ROLM Corporation*, 1979.

"AIS, Versatile Efficient Information Service", Fujitsu Limited, 1972, pp. 153–162–(Brochure).

Smith, S.L., et al., "Alphabetic Data Entry Via the Touch–Tone Pad: A Comment", *Human Factors*, 1971, 13(2), pp. 189–190–(Book).

Holtzman, Henry, "Still an Infant Technology VOICE MAIL", *Modern Office Technology*, Jun. 1985, pp. 78–80, 82, 84, 90–(Article).

Leander, Monica, "Voice Response–A Technology for Solving Management Problems", Speech Technology, Mar./Apr. 1986, pp. 50–52–(Article).

Stolker, Bud, "CompuCorder speech storage and output device. (elevaluation)", *Crative Computing*, Jul. 1983, pp. 1–7.

Witten, I.H., et al., "The Telephone Enquiry Service: a man–machine system using synthetic speech", *Int. J. Man–Machine Studies*, Jul. 1977, 9, pp. 449–464–(Book).

Gould, R.L. "Fidelity's Automated Voice Response System", *Telecommunications*, Jan. 1981. pp. 27–28–(Article)

"Fidelity Automated Service Telephone", *Fidelity Group*, 4 pages–(Manual).

"Data Set 407 Interface Specification", *Manager–Data Systems & Operations,* Jun. 1975, Issue 2, pp. 1–69 plus Table of Contents–(Manual).

Fitzwilliam, J.W., et al., "Transaction Network, Telephones, and Terminals", *The Bell System Technical Journal,* Dec. 1978, vol. 57, No. 10, pp. 3325–3537–(Book).

*Inbound Outbound*, May 1988, complete issue.

Koch, Helmut, "Concord Design Services, Inc. Corporate Description", *Exacom*Federal Communications Commission, FDC Form 484, Registration, Registrant: Concord Design Services, Inc. *Exacom Telecommunication Systems*––Brochure.

General Description Installation and Operation Manual for Direct Inward Dial (DID) Trunk Interface Unit, *Exacom Telecommunication Systems*, Nov. 21, 1989, Issue 3–(Manual).

General Description Installation and Operation Manual for Answering Service Monitor System, *Concord Design Services, Inc.,* Dec. 19, 1986, Issue 1–Manual.

"Dialogic Voice Solutions", *Dialogic Corporation*, pp. 1–72.

"Why Is T–1 Important And How Can It Be Used", *Dialogic Corporation,*Application Note, pp. 1–6.

"Use of Dialogic T–1 For Telemarketing Applications", *Dialogic Corporation*, Application Note, pp.1–6.

"Use of Dialogic T–1 In Operator Service Applications", *Dialogic Corporation*, Application Note, pp. 1–6.

"Use of Dialogic T–1 In Telephone Company Networks", *Dialogic Corporation*, Application Note, pp. 1–10.

"Use of Dialogic T–1 Equipment in CPE Gateways", *Dialogic Corporation*, Application Note, pp. 1–4.

"Integrating Analog Devices into Dialogic–Based T–1 Voice Processing Systems", *Dialogic Corporation*, Application Note, pp. 1–16.

"Use of Dialogic Components in Automatic Number Identification (ANI) Systems", *Dialogic Corporation*, Application Note, pp. 1–16.

"Dialogic Unit Pricing", pp. 1–6.

"Voice '92 Spring Conference & Exposition", 1992, pp. 1–24–(Brochure).

"Telecom Developers '92", Jan. 1992–(Advertisement).

Newton, Henry, "The Sheer Thrill Of It All", *Teleconnect*, May 1991.

"AFIPS Conference Proceedings", 1987 National Computer Conference, Jun. 15–18, 1987, Chicago, Illinois "Dynamic Network Allocation".

Inquiry Letter To The F.C.C., From Attorneys For the Prior Title Holder Seeking Rulings That A Particular Game Wold Not Be Considered A Lottery Under F.C.C. Reply Letter From The F.C.C. To The Inquiry Letter Stating The Requested Rulings.

Reply Letter From The F.C.C. To The Inquiry Letter Stating The Requested Rulings.

A page (page 7) from literature on the Charles Schwab corporation, which is not dated nor identified.

A page (page 4) from an annual report dated Mar. 1, 1989, though the actual date on which the report was distributed to the public is unknown.

An early brochure based on a Mar. 1989, survey by Charles Schwab & Co, Inc.

A trademark scan (U.S. Federal) indicating a first date of use for Telebroker in Jun. 18, 1988.

Bulfer, Andrew F., "AT&T's Pay–Per–View Television Trial", published in AT&T Technical Journal, May/Jun., 1987.

Friedes, A., et al., "ISDN opportunities for large business–800 service customers," IEEE International Conference on Communications '86, Jun. 22–25, 19086, vol. 1, pp.28–32.

Allyn, Mark R. et al.,"Planning for people: Human factors in the design of a new service," Bell Laboratories Record, May 1980, pp. 155–161.

Hanson, Bruce L. et al., "No. 1A VSS New custom calling services," Bell Laboratories Record, Jun. 1980, pp. 174–180.

"Calling your computer is as easy as calling your broker, says AT&T",*Record*, Nov. 1985.

Singleton, L.A. "Telecommunications in the Information Age", Chapter 12, pp. 115–125–(Chapter from a Book).

Weitzen, H.S., "Telephone Magic", pp. 28–31, 38–39, 54–55, 62–67, 70–79, 82–85, 88–91, 106–115, 118–121, 126–127, 134–137, 176–177, Index–(Chapters from a Book).

Weitzen, H.S., et al., "Infopreneurs", pp. 18–19, 138–145, 206–209, Index–(Chapters from a Book).

Sullivan, Kathleen, "Paper firm relies on voice–based inventory system", *IDG Communications, Inc.*, Sep. 10, 1984–(Script).

"VTK Training Section" and "Disk Initialization Procedures for VTK–30/60", *Voicetek Corporation*–(Manual).

"VoiceStor Systems Integration Guide", *Voicetek Corporation*, May 2, 1983–(Manual).

"VTK 60 Voice Computer–Technical Description", *Voicetek Corporation*, Oct. 1986–(Manual).

"Voicetek VS–50 Telephone Interface System", Apr. 25, 1984, System Integration Guide–(Manual).

"VTK Voice System–Programmers Guide", *Voicetek*–(Manual).

"Disk Initialization Procedures for VTK–30/60", *Voicetek Corporation*–(Manual).

"VTK81 Voice Computer–Technical Description", *Voicetek Corporation*, Oct. 1986–(Manual).

"VTK Voice System–VTK/CE Guide", *Voicetek*, Jul. 6, 1987–(Manual).

Newton, Harry, "Newton's Telecom dictionary", *Telecom Library Inc.,* 1991–(Advertisement).

"1987 Buyers Guide", *Teleconnect*, Jul. 1987, pp. 194, 197–210–(Brochure).

Syntellect Inc.–Advertisements.

Various copies of Business cards.

Guncheon, M.C., "The Incredible Dial–A–Message Directory", *Contemporary Books, Inc.*, 1985–(Directory).

"Voice Box Maintenance Manual", *Periphonics*, 1986–(Manual).

"Voicepac Maintenance Manual", *Periphonics*, 1984–(Manual).

Dyer, Ellen, "Wichita Firm Sells 25% Share", Dec. 14, 1987, and "Spectrum Carving Role in Volatile Business", Jul. 7, 1986, Search Results.

"Don't Miss The Unique Gift Idea Of The Year", *Yam Educational Software*, 1987–(Advertisement).

"Welcome to the future of advertising", *Teleline, Inc.*, 1990–(Presentation).

"Greeting Card Project", *Teleline, Inc.*, Nov. 7, 1988–(Flow Chart).

Sharkey, Betsy, "Dialing for Dollars and Data", *Adweek*, Nov. 16, 1987, pp. 6–8–(Article).

Gay, Verne, "CBS may tie rates to buying p?", 1988–(Article).

Flanagan, J.L., et al., "Synthetic Voices For Computers", *IEEE International Conference on Communications*, 1970, pp. 45–9–45–10–(Conference Record).

Rabiner, L.R., et al., "Computer Voice Response Using Low Bit Rate Synthetic Speech", *Digest IEEE 71 International Convention*, Mar. 22–25, 1971, p. 1–2, Fig. 1–2–(Paper).

"DT1000 DIGITALKER Speech Synthesis Evaluation Board", *National Semiconductor Corp.*, Oct. 1980–(Manual).

"Data Set 407C Interface Specifications November 1977", *Bell System Technical Reference*, Nov. 1977, pp. 1–50–(Paper).

Broomfield, R.A., et al., "Making a data terminal out of the Touch–Tone telephone", *Electronics*, Jul. 3, 1980, pp. 124–129–(Paper).

Godfrey, D., et al., "The Telidon Book–Designing and Using Videotex Systems", pp. 1–103–(Book).

"Industry Marketing Bulletin", *Honeywell EDP Wellesley Hills*, Aug. 9, 1967.

"Honeywell Communications Configuration Charts And Aids In Designing", *Data Communications*, pp. 3–1 –3–7 and A.

"Burroughs Audio Response System", Reference Information for Sales Representatives, pp. 1–6, "New Product Announcement", *Burroughs Corporation*, Feb. 5, 1968.

"Stand–Alone Lockbox Application Voice Response (Slave) Communication System Functional Specification", *Cognitronics Corporation*, Feb. 19, 1982, p. 21.

"Unlock lockbox reporting. with cognitronics Voice Response Communications System/Banking.", *Speech–maker a division of Cognitronics Corporation*.

"Voice Response for Banking", *Cognitronics Corporation*-(Brochure).

"Voice response application brief", *Cognitronics Corporation*(Brochure).

"Instant credit authorization is an easy touch when any telephone is a *voice response*computer terminal", *Speech–maker a division of Cognitronics Corporation*–(Article).

Slutsker, Gary, "Relationship marketing", *Forbes*, Apr. 3, 1989–(Article).

Finnigan, P.F., "To Our Shareholders", Jun. 1985, Apr. 7, 1986, Apr. 10, 1987–(Letters).

Finnigan, P.F., "Our guest", *Radio–Schweiz AG Telekommunikation und Flugsicherung*, Jan. 1983, pp. 12–14–(Bulletin).

"International Programs" (Voicemail).

Finnigan, P.F., "Voice mail", *1983 National Computer Conference*, May 16–19, 1983, Anaheim, CA, pp. 375–377 and Abstract.

"Conversations in Your Mailbox", *Software News*, Jan. 1985–(Article).

Fredric, Paul, "Voicemail Int'l, Radio Page America To Offer A 'Pocket News Network'", *Communciations Week*, Jul. 8, 1985–(Article).

"Voice–Messaging System: Use It While You're In, Not Out", *Information WEEK*–(Article).

"Corporate Performance–Companies To Watch", *Fortune*, Sep. 30, 1985–(Article).

"Dream Weaver", *Jon Lindy*, Aug. 1986, pp. 32–35, 37–(Article).

"Turn any telephone into a complete electronic message service", *Voicemail*–(Brochure).

Pages from Company Brochure, *Televoice International, Inc.*

"VMI Big Talker", *Voicemail International, Inc.*–(Newsletter).

"Newsline", *Voicemail International, Inc.*, Oct. 1984 and Nov. 1984.

"Voiceletter No. 1, " *Voicemail International, Inc.*, Dec. 1985.

"A New, More Productive Way to Use the Telephone", *Voicemail International, Inc.*–(Brochure).

"While You Were Out..."–(Brochure).

"?For People Who Can't Afford To Miss Messages", *Voicemail International, Inc.*–(Brochure).

"Voicemail The electronic news service saves time, money and nerves", *Radio–Suisse Ltd.*, (Voicemail Agent for Europe)–(Brochure).

"Are You Being Robbed of Your Time...?", *Voicemail International, Inc.*–(Brochure).

"Voicemail Instruction Manual B–85", *Televoice International*, Nov. 1980–(Manual).

"Local Telephone Numbers", (for Voicemail) and "Televoice Is As Easy As 1, 2, 3 !", *Televoice International*–(Manual).

"Voicemail Instruction Manual C–25", *Televoice International*, Jun. 1981–(Manual).

"Telephone Numbers", (for Voicemail) and "How to Use Voicemail", *Televoice International*–(Manual).

"Message Receiving/Sending"(and others), *Voicemail International, Inc.*–(Manual).

"You Can Use Voicemanil To Send And Receive Messages At Anytime Anywhere In The World", *Voicemail International, Inc.*, 1981–(Brochure).

"Advanced User Guide", *Voicemail International, Inc.*–(Manual).

"Voicemail's Basic User's Guide", *Voicemail International, Inc.*–(Manual).

"Welcome To Dowphone",*Dowphone*, Jan. 1986–(Manual).

"Telephone 1–800 Check–PDR", *Officers of Medical Economics Company, Inc.*, 1986–(Circulation/Brochure).

"Turn your telephone into an efficient electronic "Mailbox"", *Western Union*, Jan. 1984–(Brochure).

"Western Union Voice Message Service User's Guide", *Western Union*, Jul. 1984–(Brochure).

"PSA's 24 Hour reservation system", *PSA*, Sep. 1986–(Brochure).

"To Better Serve Your Business, We're On Call Days, Nights and Weekends.", *Maryland Business Assistance Center*–(Brochure).

"Voice Response: Breaks Trough Call Blockage.", *Business Week*, Aug. 26, 1985–(Advertisement for Preception Technology Corporation).

"Tools for heavy hitters", *Forbes*, May 6, 1985.

"The Fidelity Automated Service Telephone", *Fidelity Group*–(Manual/Brochure).

"Stockquote Hotline", *Norwest Brokerage Services*–(Brochure).

"All You Need To Get The Stock Quotes And News You Want." *Dowphone*, 1984–(Advertisement).

"The Most Respected Name In Telemarketing", *West Interactive Corporation*–(2 Brochures).

Aarons, D., "The Voice of the 80's ," PC Magazine, vol. 4, No. 5, Mar. 5, 1985, p. 114 (A21707135).

"ACD 'Magic'from AT&T 's Merlin," Telecommunications Product Review, vol. 13, No. 4, Apr. 1986 (A21708371).

"Actor Promotes Phone Services," Hammond Louisiana Star, Aug. 23, 1984 (A21708860).

Allerbeck, M., "Experience with the Voice Mail System EMS 2000 Info–Results of an Acceptance Study," ISS '84 Florence, May 1984, Session 14 A, Paper 6, p. 1.

Amano, Fumio, et al., "Imagephone!!: Integrated Voice/Data Terminal With Hand–Drawing Man–Machine Interface," IEEE, 1985 (A03701430).

Ambrosio, Johanna, "Electronic and Voice Mail; They're No Match for Each Other–Yet," Computerworld, May 19, 1986, p. 53 (A21708461).

"American–Network: Files Complaint Against Pacific Northwest Bell," Business Wire, Jun. 4, 1986 (A21708495).

"American–Network: Signs Letter of Intent to Merge L D Communications Long Distance Service into the Company," Business Wire, Aug. 14, 1984 (A21708856).

Andrews, Edmund L., "Patents: Computer System Lets TV Audience Join Show," The New York Times, Dec. 24, 1988 (A01331146).

Arnst, Catherine, Press Release, Reuters, Sep. 16, 1984 (A21708908).

"AT&T Announces Major Additions to Telemarketing Products and Services," Telephone News, Dec. 14, 1987 (A21723927).

"AT&T; AT&T Announces New Software Enhancements," Business Wire, Feb. 10, 1987 (A21707782).

"AT&T Announces New Software Enhancements for its PBX," PR Newswire, Feb. 10, 1987 (A21707779).

"AT&T CPU Puts Voice Recog on Any Phone," Article Source Unknown (A01354681).

"AT&T Inaugurates Pay–Per–View TV," Bell Laboratories Record, Jan. 1986 (A21708191) repeated (A21716664).

"AT&T's Digital MERLIN," Telecommunications Product Review, vol. 13, No. 7, Jul. 1987 (A21724743).

"AT&T's Flagship System 75: A Comprehensive Analysis of the System 85's 'Little Cousin'," Telecommunications Product Review, vol. 11, No. 7, Jul. 1984 (A21724612).

"AT&T Forms Unit to Sell Synthetic Speech Systems," Wall Street Journal, Sep. 10, 1985 (A01354689).

"AT&T Plans Computer Unit," The New York Times, Sep. 10, 1985 (A01354690).

"AT&T; Showtime's Viewer's Choice, Viacom Cable and AT&T to Test Pay–Per–View Ordering System," Business Wire, Dec. 5, 1985 (A21708103).

"AT&T Sports Service," PR Newswire, Sep. 24, 1980 (A21710432).

"The AT&T System 25," Telecommunications Product Review, vol. 13, No. 8, Aug. 1986 (A21706368).

Press Release, PR Newswire, Nov. 1, 1984 (A21708963).

AT&T Technical Journal–The 5ESS Switching System, vol. 64, No. 6, Part 2, Jul.–Aug. 1985 (A21723626).

Excerpt from AT&T Technical Journal, Sep.–Oct. 1990, pp. 53–60 (A21723942).
"Automated Switchboard Attendant Helps Insuance Company Control Net Expenses," Communications News, Jul. 1985 (A21726011).
Aversano, Nina, "The Telephone as Computer," Review of Business, Fall 1989, p.5 (A21723928).
Ayres, Paul, "Voice Response Pay–By–Phone Matures," Computerworld, Nov. 9, 1979, p. 47 (A21725960).
Baker, Janet M., "Voice–Store–And–Forward: The Voice Message Medium," Speech Technology, Aug.–Sep. 1984 (A21724633).
Bakke, Bruce B., "Electronic Voice Mailbox: Potential for Fast Growth," BC Cycle, Jun. 29, 1984 (A21708785).
Bakke, Bruce, B., "GTE's 'Voice Mailboxes' Page the World," U.P.I., Apr. 11, 1983 (A21713359).
Barbetta, Frank, "AT&T Offers Digital PBX Enhancements," Electronic News, vol. 30, Nov. 5, 1984, p. 69 (A21708967).
Barbetta, Frank, "Custom Functions Offered in New AT&T Co. Package," Article Source Unknown (A21726008).
Barkauskas, B. J., et al., "Network Services Complex: A Generalized Customer Interface to the Telephone Network," IEEE International Conference on Communications, Conference Record, vol. 2, Jun. 1983, p. 805 (A21725715).
Barlin, David, "Switch–Hitter: A Data Man's Guide to the World of Voice," Data Communications, Oct. 1984, p. 114 (A21708926).
Basso, Richard J., et al., "Expanding the Capabilities of the ! Traffic Service Position System," Bell Laboratories Record, Feb. 1983, pp. 22–27 (A21724556).
Belcher, Jerry, "Earthquakes in Mexico; U.S. Relief Includes Hardware, Experts; Cash Aid Suggested," Los Angeles Times, Sep. 22, 1985 (A21708026).
"Bell Files Tariffs on CO–Based Switching System in PA.," Communications, Date Unknown (A21725944).
Bell Laboratories Record, Aug. 1984, Cover Page and Table of Contents (A21708811).
The Bell System Technical Journal, May–Jun. 1982 (A21709814).
Excerpt from The Bell System Technical Journal, Oct. 1980, pp. 1384–1395.
Bertoglio, O., et al., "An Interactive Procedure for Voice Messaging Services in a Traditional Network," CSELT Technical Reports, vol. 12, Supplement 10, No. 3, Jun. 1984 (A21708755).
Bingham, Sanford, "Groceries By Phone," Inbound/Outbound, Aug. 1988 (A21725728).
"Some Tips on Integration," Inbound/Outbound, Aug. 1988 (A21725731).
Black, Philip, "How ISDN Services Could Make or Break the Big Network,"Data Communications, Jun. 1984, p. 247 (A21708771).
"'Blast'from Data Systems Runs Under DG's AOS/VS," Computerworld, May 3, 1982, p. 38 (A21724423).
Booker, Ellis, "How to Save Big Bucks on Phone Calls," Computer Decisions, vol. 16, Nov. 15, 1984, p. 16 (A21708983).
Borchering, J. W., et al., "Customized Switching Systems," ISS '84 Florence, May 1984, Session 14 A, Paper 4, pp. 1–5 (A21725533).
Bowling, Tom, "Pay TV: A Pay–Per–Minute System Prototype," Television: Journal of the Royal Television Society, Mar.–Apr. 1984, pp. 79–83 (A21724588).
Brady, Erik, "Players, Fans Get Back in the Swing," USA Today, Date Unknown (A21706710).
Brady, Erik, "Resentful Fans Verbally Strike Back," USA Today, Date Unkown (A21706709).
Brooke, Jill, "A Hi–Tech Interactive TV Service is Planned," New York Post, Jan. 20, 1989 (A01331148).
Brown, Jim, "Contracts; Rolm Wins College Bid," Network World, Mar. 9, 1987, p. 4 (A21707859).
Brown, Jim, et al., "ICA Preview; AT&T May Steal Show," Network World, May 6, 1986, p. 1 (A21708473).
Brown, Jim, "PBX Market; Rolm Beefs up CBX Line Capacity," Network World, Feb. 9, 1987, p. 4 (A21707777).
Brown, Jim, "VMX 5000 Series; Voice Messager Debuts," Network World, Oct. 13, 1986, p.6 (A21706653).
Brown, Jim, "Voice Mail; Rohm to Accounce New Low–Cost Phonemail," Network World, Feb. 2, 1987 (A21707763).
Buckhout, Wayne, "Columbus–Born AT&T Computer Listens, Talks and Shows Promise," Article Source Unknown, Sep. 10, 1985 (A01354692).
Bulfer, Andrew F., et al., "A Trial of a National Pay–Per–View Ordering and Billing System," NCTA, 1986 (A21724669).
Burstyn, H. Paris, "Phone Features: The Next Wave," High Technology, Jun. 1986 (A21726009).
Capital Cities/ABC Video Enterprises, Inc. Teams with FDR Interactive Technologies to Explore Applications for New Telephone Technology, Capital Cities/ABC, Inc. Broadcast Group, Jan. 19, 1989 (A01331147).
Carlson, Rolf, et al., "Text–To–Speech conversion in Telecommunications," Proceedings of the Tenth International Symposium on Human Factors in Telecommunications, Jun. 1983, pp. 239–245 (A21725801).
Press Release, PR Newswire, Dec. 5, 1985 (A21708106).
Chapin, Dwight, "A Kids' Game," Article Source Unknown (A21706674).
Charlish, Geoffrey, "Telephone Message that Failed to Get Across to the U. K.," Financial Times, Jan. 16, 1986 (A21708203).
Collins, Francis R., "Reality of Equal Access: Implementation Problems," Telephone Engineer & Management, vol. 88, Sep. 1, 1984, p. 128 (A21708884).
"Company News: Phone Service to be Tested," The New York Times, Jan. 20, 1989 (A01331395).
"Components," Electronic News, 1984 (A21726007).
"Computerized Telecommunications Switching Systems," Article Source Unknown.
Connolly, James, "Republican Convention Set to Test Telecommuncations," Computerworld, Jul. 9, 1984, p. 17 (A21708804).
Conroy, Cathryn, "Audiotex Arrives," Monitor, Date Unknown (W71189).
"Corporate Preoccupation with Costs Spurs Telephone Management Sales," Computerworld Focus, May 14, 1986, p. 13 (A21708457).
Cox, John D., "Talk Into Telephone, Command a Computer," The Sacramento Bee, Sep. 10, 2985 (A01354683).
"CPU, PBX Vendors Drawings Alliances," Computerworld, Apr. 23, 1984, p. 15 (A21708674).
Crawford, K.E., et al., "4A Toll Crossbar Application," The Bell System Technical Journal, vol. 57, No. 2, Feb. 1978, pp. 283–323 (A21716223).

Croxall, L. M., et al., "Operational Experience with the 5ESS™ Switch," ISS Florence, Session 42 A, Paper 4, May 1984 (A21725550).

Cummings, Steve, "Voice–Mail Systems Attract Tentative Interest," PC Week, vol. 3, No. 49, Dec. 9, 1986, p. 140 (A21707565).

Curtis, Janice, "At a Turning Point, VMX Makes Moves to Boost Voice Messaging Business," Dallas Business Courier, vol. 2, No. 13, Section 1, Jul. 14, 1986, p. 19 (A21706328).

Daniel, Heidi C., "Inventor Battles Computer Giants," South Florida Business Journal, Aug. 12, 1985 (A21707969).

Press Release, Communications Daily, vol. 4, No. 177, Sep. 11, 1984, p. 7 (A21708903).

Danner, Patrick, "Dial Info Charges Electronics Giant Disconnected Deal," San Francisco Business Times, vol. 2, No. 33, Apr. 18, 1988 (A21724767).

Excerpt from Data Communictions, Sep. 1985, pp. 399–410 (A21707991).

Davis, Judith R., "Voice Messaging Systems," Patricia Seybold's Office Computing Report, vol. 10, No. 9, p. 1–28 (A21716964).

Day, J. F., et al., "Networking Voice and Data with a Digital PBX," AT&T Technology, Date Unknown (A21707584).

Whitten, W. B., II, "Advanced Interfaces Speed Delivery of Services," AT&T Technology, Date Unknown (A21707593).

"Definity Announcement Includes Other New Products," Telecommunications Product Review, vol. 16, No. 3, Mar. 1989 (A2172758).

DeLessio, N. X., et al., "An Integrated Operator Services Capability for the 5ESS System," ISS '84 Florence, May 1984, Session 22 C, Paper 3, pp. 1–5 (A21725538).

Desmond, Paul, "Patented Call–Routing Tool Boon for Retail Industry; Instalink Will Use ISDN for Automatic Number ID," Network World, Aug. 1, 1988 (A21712653).

"Dial–A–Drill," The New York Times, Jan. 20, 1969 (A21725951).

"Dialing for Pennies," California Living Magazine, Aug. 12, 1984 (A21708855).

"Distributed Data Processing and Messaging Systems," Data Communications, May 1986, p. 105 (A21708428).

Dix, John, "AT&T Breathes New Life into its Switch–and–Wire Beast," Network World, Oct. 27, 1986, p. 1 (A21706662).

Dix, John, "AT&T Tries Different Tack," Computerworld, Nov. 25, 1985, p. 19 (A21708097).

Dix, John, "AT&T Unleashes 'Gazelle'," Computerworld, Apr. 30, 1984, p. 2 (A21708097).

Dix, John, "Enhancements Out for AT&T's High–End PBX," Computerworld, Nov. 12, 1984, p. 99 (A21708970).

Brown, Jim, "VMX 5000 Series: Voice Messager Debuts," Network World, Oct. 13, 1986, p. 6 (A21706653).

Dix, John, "Ford Motor Co.; Driving Down Costs with Voice Mailboxes," Network World, Jul. 14, 1986, p. 32 (A21706326).

Dix, John, "Hello, This is a Voice Mail Recording.," Network World, Jul. 14, 1986, p. 1 (A21706331).

Dix, John, "Rolm; Long–Awaited Redwood to Debut at ICA Today," Network World, Jun. 2, 1986, p. 4 (A21708493).

Dix, John, "Switch Management: DEC Tools Debut at ICA," Network World, Jun. 9, 1986, p. 8 (A21708497).

Dix, John, "Unified Messaging; AT&T Reveals New Message Blueprint," Networkworld, Sep. 22, 1986, p. 1 (A21706473).

Dorros, Irwin, "Evolving Capabilities of the Public Switched Telecommunications Network," Business Communications Review, Jan.–Feb. 1981 (A21725652).

Dowd, Ann Reilly, et al., "Dollars from Dialing," Fortune, Mar. 16, 1987, p. 10 (A21707869).

Drinkwater, Larry, "Voice Processing: An Emerging Computer ? Technology," Speech Technology, Aug.–Sep. 1984, pp. 50–54 (A21708826) (illegible).

Edwards, M., "Digital PBXs Zero in on the Key Role as Hub of Office," Communications News, vol. 21, No. 12, Dec. 1984, p. 44 (A21708992).

Egly, Diana G., et al., "Mnemonic Aids for Telephone–Based Interfaces," Proceedings of the Eleventh International Symposium on Human Factors in Telecommunications, Sep. 1985 (A21725818).

Eichenwald, Kurt, "Just a Phone Call Away: More Dial–It Services," The New York Times, Apr. 16, 1988 (A21725852).

Excerpt from Electrical Communication Facilities (in Japanese), vol. 33, Nov. 9, 1981 (A21724248).

"Electronic Switching: Digital Central Office Systems of the World," Edited by Amos E. Joel, Jr., IEEE Press, 1982 (A21716673).

"Electronic Voice Mail Revolutionizing Communications," Tulsa Business Chronicle, vol. 5, No. 26, Jun. 30, 1986 (A21708510).

Press Release, PR Newswire, Mar. 20, 1984 (A21708647).

Elliot, Thomas, R., "A Voice in the Wilderness," Computerworld, Jun. 13, 1984, p. 76 (A21708779).

Emerson, Jim, "Catalog Business," DM News, Dec. 15, 1985 (A21708115).

Emerson, Jim, "Eliminating Live Operators," DM News, Dec. 15, 1985 (A21708114).

Engelbardt, Robert M., "Island Paradise Gets System Update," Telephone Engineer & Management, vol. 88, Sep. 15, 1984. p. 104 (A21708904).

Evans, S.A., et al., "Talking and Listening to the Conversant 1 Voice System," AT&T Technology, Date Unknown (A21710392).

Fantel, Hans, "Video: Movies Hot Off the Tube," The New York Times, Mar. 29, 1987 (A21707890).

"The Father of Voice Messaging," Network World, Nov. 1984, p. 57 (A21708942).

Feldman, Robert, "New AT&T Packages Designed to Spruce up Systems 75/85," MIS Week, Jun. 2, 1986, p. 30 (A21725895).

Fine, Happy, "Tavern on the Bluegrass," Eastern Basketball, Date Unknown (A21706749).

"Firm Created After Patent Suit Against First Data," Reuters, Oct. 17, 1994 (A01331388).

Fischell, David R., et al., "Interactive Voice Technology Applications," AT&T Technical Journal, Sep.–Oct. 1990 (A34100164).

Foster, Robin Harris, "In the Forefront with Integrated Call Centers," AT&T Technology, vol. 7, No. 4, 1992 (A21712913).

Froehlich, F. E., et al., "The Switched Network Transaction Telephone System," The Bell System Technical Journal, vol. 57, No. 10, Dec. 1978, pp. 3475–3485 (A21725995).

Froelich, Leopold, "Are Smart Buildings a Dumb Idea? If They're Going to Prosper, Shared Service Providers Will Have to Move from Telephony into Office Automation," Datamation, vol. 31, Oct. 1, 1985, p. 101 (A21708046).

Gates, G. W., et al., "Software," The Bell System Technical Journal, vol. 61, No. 5, May–Jun. 1982, pp. 863–883 (A21725913).

Gawron, L. J., et al., "Scanned–Image Technologies Bring New Ways to Conduct Business," AT&T Technology, vol. 6, No. 4, 1991 (A21713611).

Gawronski, Jane Donnelly, et al., "Audio Response System to Practice Mental Computation Skills," Proceedings of the Digital Equipment Computer Users Society, vol. 1, No. 2, Fall 1974, pp. 633–636 (A21725979).

Gawrys, G. W., "ISDN: Integrated Network/Premises Solutions for Customer Needs," IEEE, 1986, pp. 1.1.1–1.1.5 (A21725555).

Gaylord, D. M., "Better Health for Hospitals with DIMENSION 2000 PBX," Bell Laboratories Record, Jul.–Aug. 1981, pp. 170–173 (A21724371).

Gerald, Jeanette A., "A Voice Response System for General Aviation Pilots," Article Source Unknown (A21708877).

Gibson, Stanley,"Audix Upgrades Include Messaging, Billing, Management," Computerworld, Dec. 15, 1986, p. 29 (A21707568).

Gibson, Stanley, "Octel Links Voice Mail System to Rolm PBX, " Computerworld, Dec. 8, 1986, p. 42 (A21707564).

Gillon, A. C., et al., "Voice Power Gives You Voice Messaging–And Then Some," AT&T Technology, vol. 4, No. 2, 1989 (A21712712) repeated (A21724818).

Gitten, L. J. et al., "5ESS System Evolution," ISS Florence, Session 41 A, Paper 1, May 1984 (A21725543).

Goecke, D., et al., "Software Engineering Approach Applied to the Complete Design and Production Process of Large Communication Systems Software," ISS '84 Florence, Session 13 C, Paper 1, May 1984.

Goldstein, Mark L., "Send A Message. Now! New Digital Networks Can Give Companies a Competitive Edge," Industry Week, Jul. 21, 1986, p. 43 (A21706347).

"Gotcha!," Edited by John A. Conway, Forbes, Mar. 10, 1986, p. 9 (A21708345).

Gottleib, Dan, "Does the Bell Toll for Voice/Data Independents?," Purchasing, Dec. 13, 1984, pp. 103–108 (A21724641).

Grau, Jeff, "IBM Hints at Entering Voice Response Market in 1992," Article Source Unknown, Dec. 11, 1990 (A01346366).

Greene, James E., et al., "Voice Response System Sticks to the Script and Saves Time, Money and Tempers for University Students and Administrators," Communication Age, Jan. 1986 (A21724080).

Grumhaus, Audrey, "What's New In Telephone Service: Some Bad News for Nuisance Callers," The New York Times, Nov. 16, 1986 (A21725855) repeated (A21725857).

Grunbaum, Rami, "Genesis Electronics Heeds the Voice Mail Calling," The Business Journal—Sacramento, vol. 2, No. 49, Mar. 10, 1986 (A21708341).

Gunderson, Gary W., "Computer Consoles; Can Your Community Save Lives when Seconds Count?," Business Wire, Feb. 11, 1987 (A21707785).

Hafner, Katherine, "Hello Voice Mail, Goodbye Message Slips," Business Week, Jun. 16, 1986 (A21708507).

Hafner, Katherine, "System 85 Targets Leading–Edge Users: NBI," Computerworld, Sep. 5, 1983, p. 53 (A21724580).

Hafner, Katherine, "Temporary Telephones," Network World, May 2, 1984 (A21708739).

Hafner, Katherine, "The Venture Capital Adventure," Network World, Aug. 1, 1984 (A21708837).

Hamel, Bob, "Voice Messaging; VMX Gives Firms Edge," Network World, Mar. 16, 1987 (A21707864).

Hanson, Robert J., "The DSC–2000 VoiceServer System," Speech Technology, Aug.–Sep. 1984, pp. 55–65 (A21708818).

Herits, E., et al., "A New Look for the White Pages," Bell Laboratories Record, Jun. 1980 (A21709547).

Hardy, James O., et al., "Handling Coin Tolls Calls–Automatically," Bell Laboratories Record, Sep. 1980, pp. 256–262 (A21710422).

Harrar, George, "Interview: Ed Landry; Making Office Connections at John Hancock," Computerworld, Apr. 14, 1986, p. 63 (A21708404).

Hasui, Kouya, et al., "Man–Machine Interfaces in Office Communication Systems," IEEE Communications Magazine, vol. 24, No. 7, Jul. 1986, pp. 18–23 (A03701435).

Coover, Edwin R., "Voice–Data Integration in the Office: A PBX Approach,"IEEE Communications Magazine, vol. 24, No. 7, Jul. 1986, pp. 24–29 (A03701442).

Haszto, E. D., et al., "ALLIANCE Teleconferencing Services Boost Business Efficiency," AT&T Technology, vol 3, No. 1, 1988 (A21724796).

Heberle, W., "Accumulation of the Signals when Using the Pushbutton Telephone for Data Entry," Proceedings of the $5^{th}$ International Symposium on Human Factors in Telecommunications, Sep. 1970 (A21725766).

Heffron, W. G. et al., "Transaction Network Service," The Bell System Technical Journal, vol. 57, No. 10, Dec. 1978, pp. 3331–3347 (A21725986).

Henricks, Mark, "DSC Makes Japanese Connection," Dallas–Fort Worth Business Journal, vol. 9, No. 30, Mar. 17, 1986 (A21708347).

Hillhouse, Joseph, "PABX, the Hub: Keeping Communications on Track," Computer Decisions, vol. 16, Nov. 15, 1984, p. 84 (A21708974).

Hindlin, Eric, "PBXs Becoming Practical Alternative to LANs," PC Week, vol. 4, Mar. 17, 1987, p. C16 (A21707870).

Hird, E. V., "Party Line Cost Cutters," Telephone Engineer & Management, vol. 90, May 1, 1986, p. 51 (A21708442).

Hollitz, John, "Giving Information without Human Intervention," The Business Journal–Sacramento, vol. 3, No. 26, Section 1, Sep. 29, 1986, p. 25 (A21706505).

"Home Shopping Network Halts Talks," The Washington Post, Feb. 19, 1987 (A21707804).

"The HORIZON Call Management System Tackles High Call Volume Demands," Telecommunications Product Review, Jan. 1983 (A21724553).

Horton, L. A., et al., "AT&T Systems Link the University of Maryland," AT&T Technology, vol. 7, No. 2, 1992 (A21712897) repeated (A21725512).

Horwitt, Elisabeth, "AT&T Enchancements Fill Gaps in System 75 Digital PBX," Computerworld, Jun. 16, 1986 (A21708505).

Horwitt, Elisabeth, "Rolm to Unveil Low–End PBX: Digital System Bucks Feature–Rich Trend," Computerworld, Jun. 2, 1986, p. 8 (A21708489).

Horwitt, Doran, "Boom For Voice Mail Systems," InfoWorld, Oct. 29, 1984, pp. 37–38 (A21708940).

Hubbard, Thomas Leo, "Richardson: High–Tech Prosperity," Dallas Magazine, vol. 66, No. 2, Feb. 1987 (A21707741).

Huber, K. M., et al., "Getting the Message with UMS," AT&T Technology, vol. 1, No. 1, 1986 (A21708123).

Swann, L., "Universal Operations Systems–Integrated Building Blocks," AT&T Technology, vol. 1, No. 1, 1986 (A21708141).

Hunter, John J., "Telephone Tag Alternative: Voice Messaging Unshackles Users from Traditional Telephone Limitations," Network World, Jul. 13, 1987 (A21714278).

Hutchins, Dexter, "The Legal Battles Over Voice Messaging," Fortune, Oct. 28, 1985 p. 104 (A21708066).

"IBM CallPath DirectTalk," Brochure, Date Unknown (A01346360).

"IBM Gives Voice to PS/2, RS/5000 Platforms," Voice Processing Newsletter, vol. 10, No. 22, Aug. 1, 1991 (A01346371).

"IBM Introduces 2 Phone Systems," The New York Times, Date Unknown (A01346365).

"IBM, Inventor Reach Patent Agreement," The Washington Post, Aug. 30, 1985 (A21707976).

"IBM Reaches Patent Agreement with Inventor," U.P.I., Aug. 29, 1985 (A21707974).

"IBM–Rolm Eye CBX–SNA Link," Computerworld, Jan. 5, 1987 (A21707572).

"IBM Says New Line of Big Computers is Faster than Promised," Wall Street Journal, Date Unknown (A01346364).

"ICA Slates Huge Meeting, Exhibit; Includes Program and List of Exhibitors," Telephone Engineer & Management, vol. 88, Apr. 15, 1984, p. 96 (A21708657).

IEEE Transactions on Consumer Electronics, vol. CE–25, No. 3, Jul. 1979 (A21725141).

"Index to Theses," Edited by Geoffrey M. Paterson, et al., vol. XXVI, Part 1, 1977 (A21718028).

"Industry Leaders License Katz Interactive Technology Patents," PR Newswire, Sep. 25, 1995 (A01331383).

Press Release, Communications Daily, vol. 5, No. 126, Jun. 28, 1985, p. 5 (A21724661).

"Inside an Internetworking Voice–Mail Processor,"Data Communications, Oct. 1986, p. 158 (A21706523).

"Integratec's Niche is Collecting on Delinquent Bank Card Accounts," American Banker, Aug. 10, 1988, p. 22 (A21724771).

"Card Titan Sees Gold on Electronic Commerce," Financial Service Online, Jul. 1996, p. 8 (A21724775).

"International Communications Network Service Installed by Commercial Cable," The Magazine of Bank Management, Jun. 1984, p. 126 (A21708770).

"International Information Network Acquisition," PR Newswire, Nov. 7, 1985 (A21708093).

"International Information Network Agreement," PR Newswire, Dec. 16, 1985 (A21708117).

"International Information Network Announces Agreements," PR Newswire, Feb. 12, 1986 (A21708309).

International Information Network Contract, Article Souce Unknown, Feb. 25, 1986 (A21708117).

"International Information Network Earnings," PR Newswire, Dec. 9, 1985 (A21708110).

"International Information Sets Financing Program," PR Newswire, Oct. 22, 1985 (A21708064).

Press Release, Communications Daily, vol. 6, No. 41, Mar. 3, 1986, p. 11 (A21708337) repeated (A21706387).

"Megaphone Intl Wins Calif. Lottery Contract," PR Newswire, Aug. 4, 1986 (A21706387).

"Introducing Voice Quote," The Washington Post, Oct. 9, 1986 (A21707805).

Press Release, Communications Daily, vol. 6, No. 189, Sep. 30, 1986, p. 7 (A21706510).

Press Release, Communications Daily, vol. 6, No. 189, Sep. 30, 1986 (A21706511).

Jenkins, Avery, "Iowa State Launching Campus Wide Network," PC Week, vol. 4, Feb. 3, 1987, p. C14 (A21707767).

Jerman, Max, et al., "A CAI Program for the Home," Educational Technology, Dec. 1971, p. 49 (A21725984).

Johnson, Eric, "Analysts Say that Voice–Message Will Take up $1 Billion," Data Communications, Jan. 1984, p. 50 (A21708551).

Johnson, J. W., et al., "Integrated Digital Services in the 5ESS™ System," ISS '84 Florence, May 1984, Session 14 A, Paper 3, pp. 1–8 (A21725525).

Johnston, David, "'Pay Radio' Tunes in Charities, Turns off Some Consumer Groups," Los Angeles Times, Part 6, Aug. 24, 1986, p. 1 (A21706399).

Excerpt from Journal of Information Processing Society of Japan (in Japanese), vol. 23, 1981 (A21724246).

Kaplan, Jeff, "The Uncertain Future of Centrex," Network World, Mar. 14, 1984, p. 17 (A21708640).

Karpinski, Richard, "IBM Offers Voice Processing Line," Telephony, Aug. 5, 1991 (A01346377).

"Katz Scratch Fever," Telemedia News and Views, Date Unknown (A01331216).

Katzel, Jeanine, "Selecting and Installing a Plant PBX System," Plant Engineering, vol. 37, Mar. 3, 1993 (A21713341).

Kawakami, Tokuhiro, et al., "Speaker Independent Speech Recognition and Audio Response System and Facsimile Response System," NEC Technical Journal, vol. 39, No. 7, 1986, pp. 54–79 (A21708159).

Kelleher, Joanne, "Users; Mastering DEC," Computerworld Extra!, Sep. 24, 1986, p. 61 (A21706475).

Kemezis, Paul, "The Shared Tenant–Services Debacle and Lessons from it" Data Communications, Sep. 1986, p. 94 (A21706444).

Koike, H., et al., "An Office–Use Voice Storage System with Elaborate User's Operativity," Proceedings of the Tenth International Symposium on Human Factors in Telecommunications, Jun. 1983, pp. 197–203 (A21725793).

Koike, Tsunehiko, et al., "Parcor–Type Audio Response Unit (in Japanese)," Article Source Unknown (A21724841).

"Kokusai Voicemail to Start International Voicemail Service," COMLINE Daily News Telecommunications, Mar. 10, 1987 (A21707861).

Kolodziej, Stan, "Where is the Electronic Messaging Explosion?," Computer World, Oct. 16, 1985, p. 21 (A21708056).

Korzeniowski, Paul, "Voice Messaging; ETS Demise Hits Rolm, Octel Users," Network World, Aug. 4, 1986, p. 1 (A21706390).

Kylin, J. C. et al., "Benefits of Integrating Data Bases into the SPC Network," ICC '79 Conference Record, vol. 1, Jun. 1979 (A21726001).

Lawson, Michael, "AT&T Leaves 'Super–PBX' money on the table for Northern Telecom," Data Communications, Sep. 1987 (A21712210).

Lazarus, George, "Pepsi Also Won the Super Bowl," Chicago Tribune, Jan. 30, 1987 (A21707647).

Lee, Linda et al., "Meridian SL Information Services," Telesis, 1985, pp. 13–19.

Leibowitz, Ed, "The Wonder Years: Intriguing ACD Trends for the 1990s, " Teleconnect, vol. 8, No. 4, Apr. 1990, p. 84 (A21712064).

Levin, David, "Private Branch Exchanges: The Best Time to Shop Might Be Right Now," Data Communications, Aug. 1987, p. 100 (A21714315).

Lineback, J. Robert, "VMX Girds for a Fight in Market it Pioneered," Electronics, May 12, 1986 pp. 55–56 (A21708453).

Lukeson, David R., "CLASS: The Smart Local Telephone Network," Proceedings of the International Congress on Technology and Technology Exchange, Oct. 1984, pp. 100–103 (A21725864).

"The LUMA Visual Telephone," Telecommunications Product Review, vol. 13, No. 7, Jul. 1986 (A21706313).

Lyman, Guy C., III, "Voice Messaging Comes of Age," Speech Technology, Aug.–Sep. 1984, pp. 45–49 (A21724634).

Mankin, Eric, "Playing TV Telephone: New System Opens Door for Audience Participation," Electronic Media, Apr. 24, 1989 (A01331389).

Marino, P. J., et al., "AT&T Communications ISDN Plans," IEEE, 1985, pp. 247–251 (A2173894) repeated (A21725560).

"Marubeni to Install Voice–Box Mail System," Japan Economic Journal, Mar. 13, 1984, p. 9 (A21708639).

Mason, G. C. W., "Use of Recorded Announcements for Guidance of Users of Telecommunications Networks," Proceedings of the Eighth International Symposium on Human Factors in Telecommunications, Sep. 1977, pp. 257–262 (A21725784).

Massey, David K., "Voicetek Hears Sweet Success with Market Strategy," Boston Business Journal, vol. 7, No. 21, Section 1, Jul. 20, 1987, p. 6 (A21714290).

"The Master of Trivia,"The Sporting News, Aug. 19, 1985 (A21706671).

Matheson, David, "ISDN: The Technology has Discovered its Purpose," Telemarketing, May 1990 (A40002414).

Maxemchuk, N. F., "An Experimental Speech Storage and Editing Facility," The Bell System Technical Journal, vol. 59, No. 8, Oct. 1980 (A21724241).

Mearns, Allison B., et al., "Calling Card–Don't Tell It–Dial It," Bell Laboratories Record, May–Jun. 1982, pp. 117–119 (A21709811) repeated (A21709808).

Michaelson, Marlene, "Business, Services Use 'Dial A' Formats," Contra Costa Times, Sep. 8, 1986 (A21707858).

Mier, Edwin E., "A Big Bonanza in Little Switches," Data Communications, Jun. 1984, p. 68 (A21708764).

Miles, J. B., "AT&T System Upstages its FTS Rivals at Shows; The FTS 2000 Telecommunications Contract," Government Computer News, vol. 6, No. 4, Feb. 27, 1987, p. 1 (A21707808).

Miles, J. B., "Bypass Starts to Soar; More Businesses are Avoiding the Public Phone Network as New Technologies Surface and Telecomm Costs Rise," Computer Decisions, vol. 17, Nov. 5, 1985, p. 82 (A21708087).

Miles, J. B., "Network Control Under Control; Corporations Seeking Unified Network Management Systems May Find Hope in Several New Offerings," Computer Decisions, vol. 18, Jul. 15, 1986, p. 70 (A21706340).

Excerpt from Modern Office Technology, Jul. 1986 (A21706315).

Moore, Steve, "Project Management; Anatomy of a Cutover, Part 1" Network World, Aug. 25, 1986, p. 26 (A21706408).

Moore, Steve, "Project Management; Anatomy of a Cutover, Part 2" Network World, Sep. 1, 1986, p. 35 (A21706447).

Press Release, Data Communications, Aug. 1984, p. 58 (A21708825).

"MTV–Networks Signs with American Express Affiliate FDR Interactive Technologies," Business Wire, Mar. 28, 1989 (A01331393).

"NAB in the 'Big D.,'" Broadcasting, vol. 112, Mar. 30, 1987, p. 83 (A21707892).

"National Railways' Seat Reservation System by Touch Tone Telephone," Electrical Communication Facilities, vol. 38, No. 339, 1975 (A21724984).

"Newly Formed company Assigned Several Interactive Technology Patents Following the Settlement of Multimillion Dollar Patent Lawsuit," Business Wire, Oct. 17, 1994 (A01331386).

"New AT&T Device Made in Columbus," Columbus Citizen Journal, Sep. 7, 1985 (A01354693).

"New Products Telecommunications," Sound & Communications, vol. 28, No. 12, Apr. 1983, pp. 84–85 (A21713354).

"New Systems Stem Losses from Credit Card Debt; Technology Streamlines Phone Contacts," American Banker, Aug. 10, 1988 (A21724777).

"New Voice Processing Products Mean Improved Customer Service," Article Source Unknown, (A01346357).

Newton, Harry, "AT&T Information Systems One Year Later," Office Administration and Automation, vol. 45, Jan. 1984, p. 37 (A21708557).

Newton, Harry, "Dumb Smart Switches," Teleconnect, May 1991, pp. 14–18.

Newton, Harry, et al., "Send Us Your Pre–1989 Brochures," Computer Telephony, Oct. 1996, pp. 16–26 (A01331210).

Nishikado, Iwamasa, et al., "Voice Storage System for Centralized Extension System," Review of the Electrical Communication Laboratories, vol. 32, No. 6, 1984, pp. 1010–1018 (A21725924).

Press Release, The American Banker, Oct. 20, 1986, p. 13 (A21706658).

"Northern–Telecom–2; (NT) Northern Telecom Announces Software Feature Package," Business Wire, Feb. 18, 1997 (A21707802).

"No. Telecom Upgrades Digital PBX," Electronic News, vol. 30, Apr. 30, 1984, p. 63 (A21708708).

Nowogrocki, Jim, "City, County Spend About $ 1 Million on 911," St. Louis Business Journal, vol. 6, No. 43, Section 3, Aug. 4, 1986, p. 1C (A21706393).

"Office Automation Advances 'White Collar' Productivity," Dun's Business Month, vol. 126, Mar. 1986, p. 59 (A21708336).

The Official Proceedings of Speech Tech '85, Media Dimensions, Inc., Apr. 1985, Cover and General Information Pages.

Excerpt in Japanese, Article Reference Unknown (A21724849).

Press Release, PR Newswire, May 9, 1986 (A21708451).

Paznik, Megan Jill, "Voice Mail: Pitfalls and Promises," Administrative Management, vol. 48, Mar. 1987, p. 16 (A21707849).

"The PBX Marketplace; Private Branch Exchanges," Administrative Management, vol. 47, Jan. 1986, p. 45 (A21708194).

"Peek at Future of 'General Hospital'" Times–Picayune, Date Unknown (A21708536).

Pelline, Jeff, "AT&T System Links Voice to Computer," San Francisco Chronicle, Sep. 10, 1985 (A01354691).

"Perception Technology; (PCEP) Perception Technology Announces ANI, DID Enhancements," Business Wire, Feb. 27, 1987 (A21707811).

Petit J. C., et al., "GALAXIE: Toward Adaptive Distributed Control Systems," ISS '84 Florence, May 1984, Session 41 A, Paper 3.

Petrosky, Mary, "Interactive Speech System From AT&T's Business Unit," Infoworld, vol. 7, Issue 38, Sep. 23, 1986 (A21708029).

Pfister, George M., "The PBX: What Matters, What Doesn't," Datamation, vol. 30, Aug. 1, 1984, p. 121 (A21708831).

Plakias, Mark, "The Katz that Ate the Canary," Telemedia News and Views, vol. 2, No. 11, Nov. 1994 (A01331037).

Pollack, Andrew, "Audiotex: Data By Telephone," The New York Times, Jan. 5, 1986 (A21725850).

Portantiere, Nick, "AT&T Introduces System 25 Digital PBX," Electronic News Jul. 7, 1986, p. 34 (A21706324).

Power of Attorney for USPA 5,109,404 Inventor Ronald A. Katz.

Prell, E. M., et al., "The Changing Role of the Operator," International Switching Symposium, May 1979, pp. 697–703 (A21725933).

Prince, Terry, et al., "A Telephone for the 'Checkless' Society," Bell Laboratories Record, Sep. 1972, pp. 249–253 (A21725647).

"Profit from Impulse Pay–Per–View," Advertisement for Science Dynamics Corporation, Jul. 14, 1986 (A21706337).

"Prudential Insurance Mortgage by Phone Program," PR Newswire, Feb. 19, 1986 (A21708310).

Pulford, Jack, "Aurora System is Built to Grow," Telephone Engineer & Management, vol. 88, Aug. 1, 1984, p. 78 (A21708841).

Putnam, Jane, "Winners," Contra Costa Sun, Aug. 14, 1985 (A21706705).

"Putting an End to Telephone Tag," ABA Banking Journal, Feb. 1987, (A21707747).

Raack, G. A., et al., "Customer Control of Network Features," ISS '84 Florence, May 1984, Session 14 A, Paper 2 (A21725520) repeated (A21725717).

Raimondi, Donna, "AT&T Debuts Primary Rate for System 85," Computerworld, Feb. 23, 1987, p. 41 (A21707806).

Rappaport, David M., "Voice Mail: Key Tool or Costly Toy," Data Communications, Oct. 1986, p. 153 (A21706526).

"Redwood by Rolm," Telecommunications Product Review, vol. 13, No. 6, Jun. 1986 (A21708487).

Rees, Norm, "Flexible Voice Response Software Speeds Development for Resellers," Speech Technology, Mar.–Apr. 1988, pp. 46–49.

Results of Lexis Search Request for "Call Interactive," Date of search Aug. 5, 1996 (A01331399).

Rice, Valerie, "AT&T Enters Speech–Processing Business, Names First Customers," Investor's Daily, Sep. 10, 1985 (A01354684).

Riederer, S. A., "Conversant VIS Means Business," AT&T Technology, vol. 5, No. 4 (A21711986).

Rangnekar, S., et al., "AT&T Voice Mail Service," AT&T Technology, vol. 5, No. 4 (A21711992).

"Ring System; Provides District of Columbia with Automatic Number and Location Identification to Aid in Emergency Services Response," Business Wire, Aug. 7, 1986 (A21706396).

Press Release, PR Newswire, Mar. 3, 1986 (A21708338).

Rippeteau, Jane, "'Smart'Way to Get Message Across," Financial Times, Jun. 12, 1986 (A21708502).

Rogers, Thomas, et al., "Scouting–A Worthwhile Trivial Pursuit," The New York Times, Aug. 9, 1985 (A21707968).

"Rolm–Corp; Appoints Harvey and Zalisk as Vice President," Business Wire, May 21, 1986 (A21708472).

"Rolm–corp; Introduces Redwood for Branch Offices and Small Businesses," Jun. 2, 1986 (A21708491).

"Rolm; Links PhoneMail to IBM VM Host," Business Wire, May 5, 1986 (A21708447).

"Rolm; Rolm Announces PhoneMail Network," Business Wire, Feb. 9, 1987 (A21707775).

"Rolm; Rolm Awarded Major contract by Columbia University," Business Wire, Mar. 2, 1987 (A21707855).

"Rolm; Rolm CBX II 9000AE Offers Abundant System Power for Applications Growth," Business Wire, Feb. 3. 1987 (A21707765).

"Rolm; 15–Node Rolm System to be Installed at University of Rochester," Business Wire, Nov. 11, 1985 (A21708096).

Roman, David R., "Building Up Your Personal Computer; Part II: Data–Input Devices," Computer Decisions, vol. 16, Mar. 1984, p. 110 (A21708630).

Rosenbaum, Art,"This 'Maniac'Spreads His Loot Around," San Francisco Chronicle, Jul. 24, 1986 (A21706875).

Rosinski, R. R., "Uses of AT&T Speech Processing Technology," AT&T Technology, vol. 5, No. 4, Date Unknown, pp. 4–5 (A21723940).

Ruhl, H. W., et al., "Sprein–A Voice I/O Mail Order System with Telephone Access, " Article Source Unknown.

Salter, Stephanie, "When the 'Say Hey Kid'Met the 'Say How'Bunch," San Francisco Examiner, Date Unknown (A21706704).

Sanger, David E., "A Driving Force Leaves Rolm, " The New York Times, Jan. 15, 1986 (A21708200).

Press Release, PR Newswire, Sep. 17, 1985 (A21708022).

Schindler, Paul E., Jr., "AT&T Talking up Conversant 1 Unit," Information Week, Sep. 16, 1985 (A21723912).

Schinke, David, "Speaker Independent Recognition Applied to Telephone Access Information Systems," Speech Tech '86, 1986 (A21718178).

Schulman, Henry, "AT&T Device: Talk to Computer By Phone," The Oakland Tribune, Sep. 10, 1985 (A0354685).

Schumaker, Robert M., Jr., "Phone–Based Interfaces: Research and Guidelines," Proceedings of the Human Factors Society 36th Annual Meeting, 1992, pp. 1051–1055.

Schwartz, Jeffrey, "IBM Enhances Voice Processing," Article Source Unknown (A01346375).

Schwartz, P., et al., "JISTEL 500–Time Division Exchange Including voice and Data with Voice Messaging," ISS '84 Florence, May 1984, Session 21 A, Paper 6, pp. 1–4.

Scully, Sharon, "Product News; Saturn PBX Revamped," Network World, May 19, 1986, p. 4 (A21708470).

Seaman, John, "Voice Mail: Is Anybody Listening?," Computer Decisions, vol. 16, May 1984, p. 174 (A21708731).

"Select List of Telecommunications Providers," The Magazine of Bank Management, Aug. 1986, p. 32 (A21706373).

Semilof, Margie, "High–End Voice/Data PBXs: Voicing Doubts about Data," Network World, Mar. 31, 1986, p. 65 (A21708354).

"Senate Panel Meets Today; C&P Objects to House Decision Awarding Telephone Contract to AT&T–IS," Communications Daily, vol. 5, No. 238, Dec. 10, 1985, p. 4 (A21708112).

Session No. 13–Contemporary Developments in Addressability and Pay–Per–View, Pay–Per–View Conference, Apr. 28, 1985, p. 21 (A21707196).

Sharma, Ranjana, "PBX Users Benefit from Vitality of ACD Market," Network World, Oct. 17, 1988 (A21712686).

Shaw, Peter, "The Need for BT's Managed Information Services," British Telecommunications Engineering, vol. 11, Apr. 1992, pp. 2–6.

Shepherd, John, et al., "Managed Recorded Information Services–An Overview," British Telecommunications Engineering, vol. 11, Apr. 1992, pp. 7–13.

Shimizu, Hiroshi "Advanced Credit Call Service," Japan Telecommunications Review, Oct. 1986, pp. 247–250.

Press Release, PR Newswire, Dec. 5, 1985 (A21708108).

Siragusa, Gail, "Voice Mail Takes Off: Send and Receive Messages by Phone," Administrative Management, vol. 47, Apr. 1986, p. 43 (A21708393).

"Small Company Initial Public Offerings: Dec. 1983, " Goldhirsch Group, Inc., Mar. 1984, p. 138 (A21708624).

Smith, Tom, "Production Use of ISDN Lives up to Expectations," Network World, Feb. 26, 1990 (A21712004).

Snow, Stephen A., "Consumers Show Strong Preference for Automated Telephone Call Processing," Business Wire, Oct. 19, 1988 (A21724781).

"AT&T to Offer New Service," Reuter Newswire, Nov. 21, 1988 (A21724788).

"Soap Opera Updates Now Available in Area," Contra Costa Times/TV, May 28, 1984, p. 4 (A21708748).

"Something for Everyone at NAB's Equipment Exhibition," Broadcasting, vol. 112, Mar. 23, 1987, p. 63 (A21707873).

Song, D, et al., "System 12 Line and Trunk Testing, " ISS Florence, May 1984, Session 32 A, Paper 5, p. 1.

"Special Information Tones Provide Computer with Vital Call Data," Bell Laboratories Record, Nov. 1981 (A21710768).

Staehler, R. E., "Toward a More Automated Network–TSPS Enhancements Lead the Way," Telephony, Feb. 8, 1982, pp. 45–48 (A21725941).

"The Stamp of Approval for Voicemail," Article Source Unknown, (A21707760).

Stern, Aimee, "Cable Operators Fight Back; Pay–Per–View TV," Dun's Business Month, vol. 129, Feb. 1987 (A21707748).

Stewart, Alan, "Signaling Changes for Interconnects; NATA 86 Trade Show," Telephone Engineer and Management, vol. 90, Dec. 15, 1986, p. 72 (A21707569).

Stix, Gary, "Many Bands=Light Work," Computer Decisions, vol. 17, Sep. 10, 1985, p. 92 (A21708015).

Press Release, Communications Daily, vol. 5, No. 148, Jul. 31, 1985, p. 7 (A21708033) repeated (A21724666).

"International Information Network Earnings," PR Newswire, Sep. 30, 1985 (A21708033) repeated (A21724666).

"International Information Sets Financing Program," PR Newswire, Oct. 22, 1985 (A21708034) repeated (A21724667).

Stoffels, Bob, "REA Takes its Show on the road: Engineering and Management Seminars," Telephone Engineer & Management, vol. 88, May 15, 1984, p. 129 (A21708746).

"Strike Three," S. F. Progress, Aug. 7, 1985 (A21706708).

Strom, David, "Telephone or MIS Managers: Who Flips the PBX Switch; Management and Use of New communications Technology; Connectivity–Focus on LANs," PC Week, vol. 4, Feb. 17, 1987, p. C1 (A21707798).

Sullivan, Linda, "Ameritech Services Signs Leading National Information Provider as a Master Dealer," Business Wire, Sep. 25, 1989 (A21724794).

Susca, Paul, "Telemarketing: reach Out and Sell Someone," Network World, May 4, 1987 (A21714122).

Swan, Gary E., "Gift ot Kids Wasted if Ballplayers Strike, "San Francisco Chronicle, Date Unknown (A21706673).

"System 85 Voice Messaging Due in '85,"Data Communications, Dec. 1984, p. 204 (A21709005).

Tagg, Ed, "Automating Operator–Assisted Calls Using Voice Recognition,"Speech Technology, Mar.–Apr. 1988, pp. 22–25.

Takahashi, Y., "Technique to Use Chinese Letters for the on–Line System in Marketing Business," Packaging Technology, vol 19, No. 11, 1981 (A21724264).

Talmadge, Candace, "MetroCal Dumps Richards for K–C," Adweek, Jan. 5, 1987 (A21707728).

"Tech Deals," Phillips Business Information, vol. 7, No. 120, Jun. 25, 1996 (A01331382).

Telecommunication Technology, vol 4, No. 4, Apr. 1986, p. 68 (A21724070).

"'Teleguide'Network Gives Tourists the Answers,"ComputerData, Apr. 1983 (A21724569).

"Telephone Service Offers the Latest News on the Soaps", Augusta, GA Chronicle–Herald, Jul. 28, 1984 (A21724626).

Telephony, Sep. 29, 1980 (A217116447).

"Test Your Baseball I. Q. and Win Four Tickets to All–Star Workout Day," Contra Costa Times, Date Unknown (A21706787).

Tetschner, Walt, "PC–Based Voice Processing Software Tools," Speech Technology, Mar.–Apr. 1988, pp. 42–45.

Tetschner, Walt, "The Voicetek VTK 90 Voice Computer," Speech Technology, Mar.–Apr. 1987, pp. 102–106.

"They've Got Your Number in AT&T's first Primary–Rate Test," Data Communications, Feb. 1988, p. 15 (A21712494).

"Toshiba Telecom Introduces Universal Instrumentation for Entire Line of Key and PBX Systems," Telecommunications Product Review, vol. 11, No. 2, Feb. 1984 (A21708573).

"Tracking the Trucks," Network World, Sep. 5, 1984, p. 55 (A21708897).

Excerpt from Transportation Technology (in Japanese), vol. 30, No. 7, 1975 (A21725045).

"Trivia Promo Chips Away for Frito–Lay," Advertising Age, Date Unknown (A21707650).

"Trivial Tickets," The fort Wayne Journal–Gazette, Aug. 11, 1985 (A21706713).

"Two Firms Introduce FMS Products," Energy User News, vol. 9, Aug. 6, 1984, p. 12 (A21708848).

Tyson, David O., "Voice Mail Technology Streamlines Bank Telephone Messaging Services," The American Banker, Oct. 15, 1986, p. 13 (A21706655).

Upton, Molly, "No Clear Winner in War of Mails," Computerworld, May 19, 1986, p. 60 (A21708459).

Vanandel, M. A., "While You're Away, AUDIX Will Answer," AT&T Technology, vol. 3, No. 3, 1988 (A21724808).

"Vendor Support Eases GOP Costs," Computerworld, Aug. 27, 1984 (A21708865).

"View from Silicon Valley: Silicon Valley Companies Battle for Advantage, Compatibility," Communications Daily, vol. 4, No. 90, May 8, 1984, p. 1 (A21708743).

Virzi, Robert A., "Skip and Scan Telephone Menus: User Performance as a Function of Experience," Proceedings of the Human Factors Society 36th Annual Meeting–1992, p. 211–215.

Vizcarrondo, John, et al., "HOBIS: New Designs on Hotel Billing," Bell Laboratories Record, Jan. 1980 (A21709392).

"VMX Announces InfoLink: New capability in Voice Messaging Arena," Business Wire, Jun. 16, 1987 (A21714159).

"VMX/Honneywell; (VMXI) (HON) Take Voice Messaging 'Down under'After Signing Distribution/OEM Agreement for Australia and Pacific Basin," Business Wire, Sep. 3, 1986 (A21724699) repeated (A21706451).

"VMX, Inc. Adds Internal Revenue Service to Voice Message (SM) Users," Southwest Newswire, Feb. 8, 1984 (A21708587).

"VMX, Inc. Announces Another Good Quarter," Southwest Newswire, Aug. 1, 1984 (A21708846).

"VMX, Inc. Announces First Quarter Results," Southwest Newswire, Oct. 18, 1985 (A21708063).

"VMX, Inc. Announces Landmark Approval of first Voice Message System in Japan," Southwest Newswire, Jun. 1, 1984 (A21708776).

"VMX; (VMXI) AT&T Tops List of Seven License Agreements Granted in Third Quarter," Business Wire, Sep. 9, 1986 (A21706457).

"VMX–Inc; (VMXI) Hosts First International Networking Seminar," Business Wire, Jul. 18, 1986 (A21706345).

"VMX, Inc. Provides First Voice Message (SM) Systems to Three Bell Operating Companies," Southwest Newswire, Dec. 11, 1984 (A21709007).

"VMX, Inc. Releases Audited Fiscal 1984 Financials–It was a Very Good Year," Southwest Newswire, Aug. 7, 1984 (A21708852).

"VMX; (VMXI) Voice Messaging Leader VMX, Inc. Launches New Generation Technology with VMX(R) 5000 Series," Business Wire, Oct. 7, 1986 (A21706650).

"VMX; (VMXI) Voice Messaging Patent–Holder VMX Inc. Moves into France after Signing Distribution Agreement with Jeumont–Schneider," Business Wire, Sep. 15, 1986 (A2170659).

"VMX; (VMXI) VMX 5000 Series Voice Messaging System Scores High Sales During First Quarter" Business Wire, March 10, 1987 (A21707862).

Press Release, Communications Daily, vol. 4, No. 209, Oct. 26, 1984, p. 6 (21708939).

Press Release, Computerworld, Oct. 7, 1985, p. 68 (A21708055).

Press Release, PR Newswire, Jan. 18, 1984 (A21708570).
Press Release, PR Newswire, Apr. 10, 1984 (A21708655).
Press Release, PR Newswire, Oct. 16, 1984 (A21708935).
Press Release, PR Newswire, Jan. 24, 1986 (A21708207).

Voice Mail Brochure, Radio–Suisse Ltd., Date Unknown (W70172).

"Voice Messaging Capability from VMX," The Magazine of Bank Management, Oct. 1985, p. 86 (A21708037).

Voice Processing International Conference Program, Jul. 1986 (A21723351).

Voice Processing–The New revolution, Proceedings of the International Conference, Jul. 1986 (A21722980).

"Voice System Tunes up Automaker's Communications," Computerworld, Nov. 12, 1984, p. 35 (A21708972).

Press Release, Communications Daily, vol. 4, No. 110, Jun. 6, 1984, p. 9 (A21708778).

"Votrax Announces Centrum 9000, Model 5," Source Unknown, Oct. 16, 1987 (A21724763).

Waite, Andrew J. "Applying IVR Systems", Inbound/Outbound, Sep. 1988, pp. 30–39 (A21725733).

Walker, Murt, "CCS7 Offers New Paths to Revenue Generating Services," AT&T Technology, vol. 6, No. 2, 1991, pp. 8–19 (A21713600).

Wallace, Bob, "All Voice Systems Are Not Alike," Network World, Sep. 14, 1987 (A21712240).

Wallace, Bob, "Comnet '87; AT&T Announces ISDN Interface for System 85," Feb. 16, 1987 (A21707796).

Walters, R.E., et al., "Voice Processing Systems in British Telecom,"British Telecommunications Engineering, vol. 9, Jul. 1990, pp. 88–97.

Warner, Edward, "Bank's Speech Synthesizers Greet Financiers'Calls with Daily Balance," Computerworld, Oct. 22, 1984, p. 6 (A21708937).

Watt, Peggy, "Local Phone Companies Eyeing Mrket for Voice Mail Services," Computerworld, Mar. 24, 1986, p. 23 (A21708350).

Watt, Peggy, "Republicans Ready for High–Tech: GOP Convention will Feature Voice Message System," InfoWorld, Aug. 27, 1984 (A21708862).

Weinstein, Bob, "Stock Exchange Gets News by Phone," Inbound/Outbound, Oct. 1988, pp. 39–46 (A21725744).

Weinstein, Bob, "Stopping the Broker's Bottleneck," Inbound/Outbound, Nov. 1988, pp. 22–23 (A21725753).

West Interactive Settles with FDR: Patnet Suit Settlement Could Have Major Industry Impact, Enterprise Communications, Nov. 1994 (A01331040).

Whalen, Bernie, "Marketers Expand Applications of Dial–It 900 Technology,"Marketing News, Nov. 26, 1982 (A21725861).

"What's An 'Automated' Attendant," Inbound/Outbound, Jul. 1989, pp. 40–42 (A21724789).

"Whether to Answer the Phone,"The Washington Post, Dec. 7, 1986 (A21707563).

Whitten, W. B., "Advanced Interfaces Speed Delivery of Services,"AT&T Technologies, vol. 2, No. 3, (A21707593).

"Who Switches Data Along with Voice?PBX Users, Increasingly," Data Communications, Feb. 1987, p. 77, (A21707751).

Wilpon, Jay G., et al., "Speech Recongnition: From the Laboratory to the Real World," AT&T Technical Journal, Sep.–Oct. 1990, pp. 14–24 (A21723481).

Wise, Deborah C. "This computer Even Deciphers Noo Yawk Talk," Business Week, Sep. 23, 1985, pp. 40–42 (A01354687).

Witten, Ian H., "Making Computers Talk: An Introduction to Speech Synthesis," Prentice–Hall, 1986 (A21708148).

Witten, Ian H., "Principles of Computer Speech," Academic Press, 1982 (A21709597).

Wolfe, R. M., et al., "telecommunications Data Base Application with the 3B™20 Processor," ISS '84 Florence, May 1984, Session 22 A, Paper 2 (A21725518).

Wollenberg, Skip, "American Express Affiliate Plans Interactive Phone Service," the Associated Press, Jan. 19, 1989 (A0131396).

Wong, Stephanie Lam, "Just a Phone Call Away," San Francisco Chronicle, Date Unknown (A21707649).

Wood, Lamont, "Stretching the Workday; Corporate Users Find that Voice Mail Saves them Time in Transmitting Important Messages," computer Decisions, vol. 18, Dec. 2, 1986, p. 44 (A21707561).

Wood, Lamont, "Will New Alliances Forge better Links?Private Branch Exchange Vendors Merge with Computer Firms," Computer Decisions, vol. 18, Jul. 29, 1986, p.40 (A21706353).

Worrall, D. P., "New Custom Calling Services,"The Bell System Technical Journal, vol. 61, No. 5, May–Jun. 1982 pp. 821–839 (A21725897).

"Worthwhile Trivia," The New York Times, Date Unknown (A21706711).

"Yes! Songs For You,"Advertisement, Source Unknown (W73764).

Youngs, E. A., "The Changing Role of Human Factors Work Supporting New Telecommunications Products and Service," Proceedings of the Tenth International Symposium on Human Factors in Telecommunications, Jun. 1983 (A21725809).

Youngs, E. A., "Effects of Automating Operator Services on Customers and Operators," Proceedings of the Eighth International Symposium on Human Factors in Telecommunications, Sep. 1977, pp. 251–255 (A21725776).

"Zenith; Centel Plans Zenith Phonevision Pay–Per–View Cable TV System," Business Wire, Dec. 5, 1985 (A21708105).

Zeno, Charlie, "Trivia Buff's Special Party for 678 Kids," Contra Costa Times, Date Unknown (A21706788).

Zuckerman, Steve, "Ogilvy & Mather/Dallas Looks for Partner to Go After Bigger Accounts," Dallas Business Courier, vol. 2, No. 21, Section 1, Sep. 8, 1986, p. 12 (A21706454).

Complete Issue of Bell Labs News, vol. 21, No. 40, Oct. 5, 1981 (A21710762).

Complete Issue of Bell Labs News, vol. 25, No. 36, Sep. 30, 1985 (A21724662).

Complete Issue of Bell Labs News, vol. 26, No. 31, Aug. 18, 1986 (A21706398).

Complete Issue of Bell Labs News, vol. 27, No. 33, Aug. 17, 1989 (A21710741).

Bell of Pennsylvania Press Release, Mar. 13, 1984 (A21725876).

Dorros, Irwin et al., "Reaching into the Future with Stored Program Control," Bell Laboratories Record, Dec. 1980, pp. 387–393 (A2170507).

Complete Issue of Voice News, vol. 4, No. 9, Oct. 1984 (A21708913).

Complete Issue of Voice News, vol. 6, No. 7, Jul./Aug. 1986 (A21706303).

Complete Issue of Voice News, vol. 7, No. 2, Feb. 1987 (A21707730).

Complete Issue of Voice News, vol. 7, No. 3, Mar. 1987 (A21707834).

Complete Issue of Voice News, vol. 7, No. 5, May 1987 (A21714110).

Complete Issue of Voice News, vol. 7, No. 10, Oct. 1987 (A21724749).

"Network Communications Applications and Services," AT&T Communications Consultant Liaison Program, Issue 1, Jun. 1984.

* cited by examiner

TELEPHONIC-INTERFACE GAME CONTROL SYSTEM

RELATED CASES

This is a continuation of application Ser. No. 09/128,936 filed Aug. 5, 1998, and entitled "Telephonic-Interface Game Control System," now U.S. Pat. No. 6,151,387 which is a continuation of application Ser. No. 08/559,538 filed Nov. 16, 1995, and entitled "Telephonic-Interface Game Control System," now U.S. Pat. No. 5,793,846, which was a continuation of application Ser. No. 08/073,585 filed Jun. 7, 1993, and entitled "Telephonic-Interface Game Control System," now U.S. Pat. No. 5,553,120, which was a continuation of application Ser. No. 07/534,907 filed Jun. 8, 1990, and entitled "Telephonic-Interface Game Control System," now U.S. Pat. No. 5,218,631, which was a continuation-in-part of application Ser. No. 07/335,923 filed Apr. 10, 1989, and entitled "Telephonic-Intetface Statistical Analysis System U.S. Pat. No. 6,016,344," which was a continuation of application Ser. No. 07/194,258 filed May 16, 1988, and entitled "Telephonic-Interface Statistical Analysis System," now U.S. Pat. No. 4,845,739, which was a continuation-in-part of application Ser. No. 07/018,244 filed Feb. 24, 1987, and entitled "Statistical Analysis System For Use With Public Communication Facility," now U.S. Pat. No. 4,792,968, which was a continuation-in-part of application Ser. No. 06/753,299 filed Jul. 10, 1985, and entitled "Statistical Analysis System For Use With Public Communication Facility," now abandoned.

BACKGROUND AND SUMMARY OF THE INVENTION

Also, application Ser. No. 08/559,538 is directly a continuation-in-part of application Ser. No. 07/335,923 filed Apr. 10, 1989, and entitled "Telephonic-Interface Statistical Analysis System," which was a continuation of application Ser. No. 07/194,258 filed May 16, 1988, and entitled "Telephonic-Interface Statistical Analysis System," now U.S. Pat. No. 4,845,739, which was a continuation-in-part of application Ser. No. 07/018,244 filed on Feb. 24, 1987, and entitled "Statistical Analysis System For Use With Public Communication Facility," now U.S. Pat. No. 4,792,968, which was a continuation-in-part of application Ser. No. 06/753,299 filed on Jul. 10, 1985, and entitled "Statistical Analysis System For Use With Public Communication Facility," now abandoned,. The benefit of the earlier filing dates in the United States is claimed under 35 U.S.C. § 120.

PRIOR-ART CONSIDERATIONS

To efficiently accomplish various functions, it has been proposed to interface persons at telephone calling terminals directly with a computer facility. In accordance with such arrangements, computer-generated voice messages prompt callers to provide digital data by actuating the numeric buttons that are conventionally employed for dialing from one telephone terminal to another. Such techniques have been widely used; however, a need exists for expanded operating capabilities, as to accommodate various game formats.

INVENTION SUMMARY

In general, the present invention comprises a telephonic-interface system and related processes for selectively utilizing both analog (voice) and digital telephonic communication in a variety of different game formats or programs, as to accommodate a vast number of participants. For example, after approval of a caller (based on telephone number signals) calls are accepted, designations are provided and a voice generator prompts individual callers to provide digital data for a game record. An information acquisition phase may be concurrent or consecutive with respect to an information processing phase. In accordance with various game formats, acquired data is processed to accomplish the functional operations, as for a contest, a lottery, and so on.

In specific implementations or formats, the system may use various criteria as a basis for awarding credits or points to callers, e.g. interrelated processing or processing with external data, source or random. Formats may make awards for proper responses, as question answers. Also, time may be introduced as a factor in relation to awards. Questions to callers may be variously selected, as from memory banks classified with varying orders of difficulty. Also, progressive stages of play may be invoked in a format to selectively access certain awards during a single call or a series of calls to isolate subsets and sub-subsets of callers. In that regard, award points may be tallied and accessible in a cache memory for prompt accounting reports. Thus, point accounts may be reported, individually or relatively.

BRIEF DESCRIPTION OF THE DRAWINGS

In the drawings, which constitute a part of this specification, exemplary embodiments exhibiting various objectives and features hereof are set forth, specifically.

DESCRIPTION OF THE ILLUSTRATIVE EMBODIMENT

As required, a detailed illustrative embodiment of the present invention is disclosed herein. However, physical communication systems, data formats, and operating structures in accordance with the present invention may be embodied in a wide variety of forms, some of which may be quite different from those of the disclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
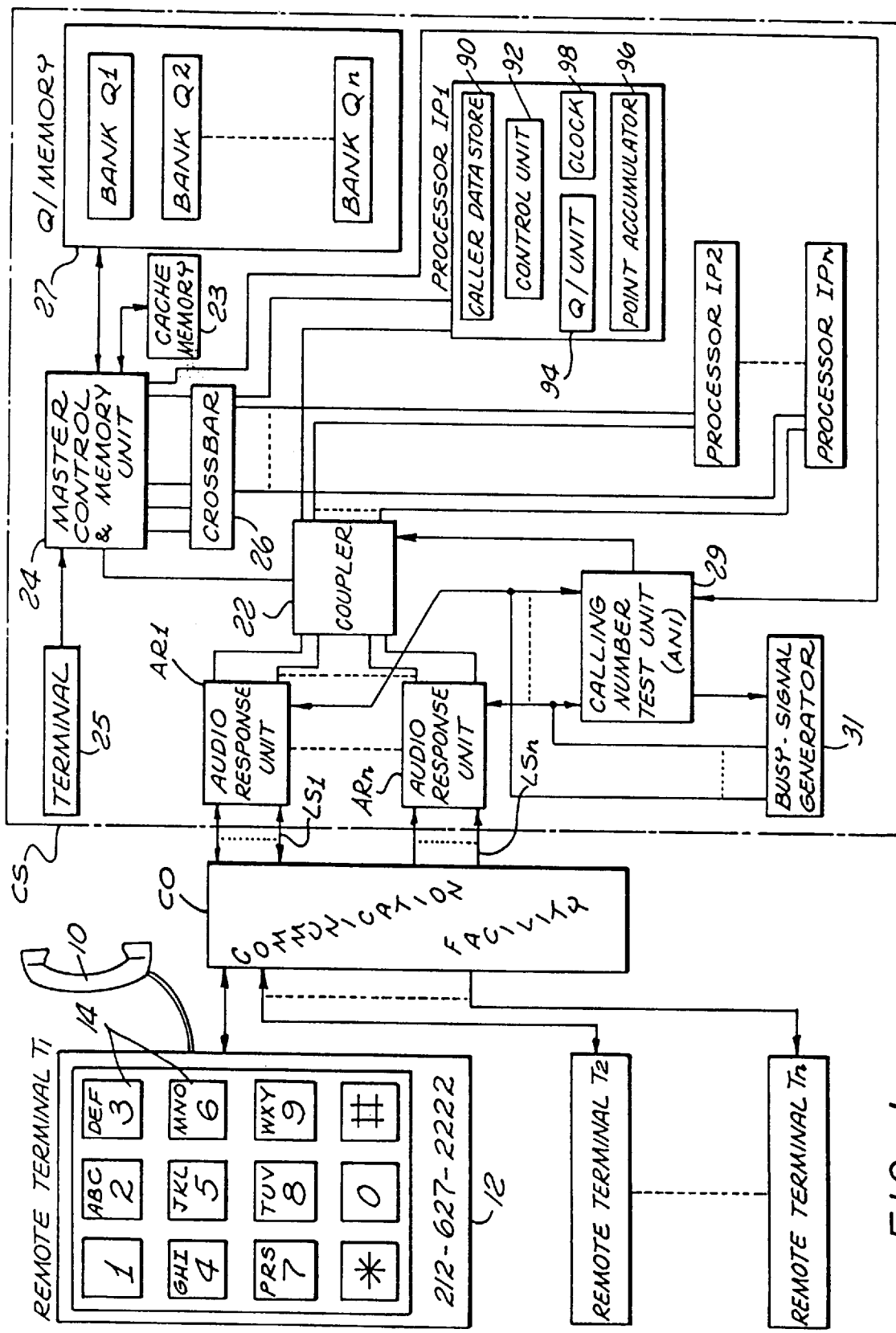
FIG. 1 is a block diagram of a system constructed in accordance with the present invention.

Referring initially to FIG. 1, a series of remote telephone-instrument terminals T1 through Tn are represented (left). The terminals are generally similar, and accordingly, only the terminal T1 is shown in any detail. The exemplary telephone terminal T1 is represented to include a hand piece 10 (microphone and earphone) and a panel 12 provided with a rectangular array of push buttons 14 in the conventional configuration. Of course, the hand piece 10 accommodates analog signals while the panel 12 is a digital apparatus. Generally in accordance herewith, the hand piece 10 serves to manifest vocal prompts or cues to the caller.

In accordance with conventional telephone practice, alphabetic and numeric designations are provided on the buttons 14. For example, several of the buttons 14 carry three letters along with a decimal digit. Specifically, the button designated with the numeral "2 " also carries the letters "A", "B " and "C". In that manner, the buttons 14 encompass the numerals "0–9", two symbols, and the alphabet except for the letters "Q" and "Z". Consequently, the buttons 14 accommodate the entry of decimal data, and to some extent alphabetic data.

The buttons 14, designated with symbols and "*" and "#", along with the numeral "0 " can be used by predetermined assignment to represent the letters "Q" and "Z" or any of a variety of other data or command components.

The remote terminals T1 through Tn represent a multitude of conventional telephone terminals coupled to a communication facility CO that may take the form of a comprehensive public telephone system. In accordance with the present system, the terminals T1–Tn operate through the telephone communication facility CO to be coupled with a central station CS.

Generally in accordance with the present development, individual callers use the individual telephone terminals T1 through Tn to interface the station CS (in a game format) through the communication facility CO. Depending on individual formats, the data of individual callers may be collected, correlated and tested by the station CS according to programs and external data. As a result, a select subset of the callers may be isolated and identified.

At any instant of time, the collective interface involving the communication system CO and the processing station CS may involve calls from several thousand of the terminals T1–Tn. Accordingly, the station CS may take the form of a sizable computer or mainframe. Although numerous possible configurations are available, for purposes of convenient illustration and explanation, the central station CS of the disclosed embodiment includes a plurality of audio response units AR1–ARn (left) and cooperating individual processors IP1–IPn (lower right) coupled to receive call data, as through a call distributor (not shown).

At this stage, some specific aspects of the communication interface are noteworthy. Generally, by telephonic dialing, the communication facility CO couples select terminals T1–Tn to select of the audio response units AR1–ARn. For example, as a result of dialing a specific telephone number at the remote terminal unit T1, the communication facility CO might couple the terminal unit through one of several sets of lines LS1-LSn to the audio response unit AR1. The caller at the terminal T1 accordingly is ultimately interfaced in a game format with the processor IP1.

From the audio response units AR1–ARn, lines LS1–LSn pass through a switch coupler 22 for select communication with the individual interface format processors IP1–IPn. As indicated above, while the interface processors IP1–IPn are illustrated as separate and distinct units, it is to be understood that various structural processing combinations based on time sharing, parallel processing, compiler techniques, bus technologies and other well known computer techniques may be employed variously to accomplish the objective processing as explained in detail below. As the processors IP1–IPn are similar, only the processor IP1 is shown in any detail in FIG. 1. Note also that various of the structures and functions of the processors IP1–IPn may be incorporated in the units AR1–ARn. Of course, specific arrangements and configurations will likely be implemented based on currently available hardware and software.

The coupler 22 also is connected to a master control and memory unit 24 which incorporates substantial memory and programmable computing capability. The unit 24 is associatively coupled to: a cache memory 23 (right), a manual terminal 25 (upper left), a question memory bank 27 (upper right), a calling number test unit 29 (lower left) and through a crossbar 26 (below) to the processors P1–IPn. Note that both the function and structure of cache memories for storing current data and crossbars for selectively interconnecting multiple parallel structures are well known in the computer arts. For a detailed description of cache memories and crossbars, see the book, "High-Performance Computer Architecture" by Harold S. Stone, published by Addison-Wesley Publishing Company, 1987.

The calling-number test unit 29 (lower left) essentially is a comparator or coincidence device. For example, the unit 29 may take the form of a look-up table for storing negative telephone numbers that are unacceptable. The number received in conjunction with a call, as by automatic number identification (ANI) equipment is supplied through a receiving unit AR1–ARn before the call is "answered". If addressing the look-up table (negative list) in the test unit 29 with the calling number indicates registration of the number, a busy signal generator 31 is actuated and the involved unit AR1–ARn supplies a busy signal to the caller, declining the call.

Accordingly, as described in detail below, disqualified calling numbers are rejected before being "answered".

As indicated above, the coupler 22 functions as a switch as well known in the prior art to establish line couplings from one of the audio response units (AR1–ARn) to one of the interface processors IP1–IPn. The operation of the coupler 22 is implemented in association with the unit 24 which may be programmed to execute specific control and memory functions as detailed below. Again the division of functions between the unit 24, the units AR1–ARn and the processors IP1–IPn may vary considerably depending on available structures and techniques. Accordingly, the disclosed system is deemed to be merely exemplary.

Generally, the interface processors IP1–IPn receive basic record data from the unit 24 and current data from the terminals T1–Tn. In a multiple format configuration, operating program data either may be initially developed in the processors IP1–IPn or supplied from the unit 24. In any exemplary format, a packet of data is assembled in one of the processors IP1–IPn during an interface with one of the terminal units T1–Tn. After being organized in a cell, the data packet may be stored in the unit 24 for subsequent use. Accordingly, an inventory of game participants is developed with their data cells available for repeated use. Concurrently, significant data, as for example data relating to the highest current game scores, may be abstracted in the cache memory 23 for prompt reporting.

Of the wide variety of operating formats and game applications accommodated by the present system, it will be apparent that certain elements have reoccurring significance in various combinations. Specifically, such elements include: (1) utilizing the called telephone number to select a specific operating format, (2) screening or selecting callers who will be accepted based on various criteria including received telephone numbers (ANI, DNIS) for screening before call acceptance (going off hook), (3) designating callers, as with manually or automatically provided telephone number data or computer-generated designations to enable subsequent positive identification, (4) providing a selection of cues (questions) for callers as from data banks of various difficulty levels, (5) enabling callers to specify degrees of risk (points), (6) relating response data (answers) to time as a further criterion, (7) using external data (random or source) for processing caller data to isolate a subset (or series of subsets) as by interrelated or independent processing, and (8) accumulating caller scores over a substantial period with key data abstracted for easy access (cache).

With respect to the data processing aspects, exemplary elemental features include the utilization of external data not available during the interval of gathering data, the utilization of an interrelationship between the composite data collected during a data acquisition period, and the utilization of time or sequence as a criterion to determine a subset.

In the development of data cells, current data is provided from the master control and memory unit 24 and the question memory 27 for interfacing a caller. Specifically, as indicated above, the unit 24 incorporates a memory for storing individual caller cells addressed by caller identification. Accordingly, records are created and maintained on individual callers indicative of identification, qualification and the results of participation in a game of games.

For use in association with various games, the question memory 27 incorporates a plurality of question banks Q1–Qn, each storing questions of different classification as with respect to difficulty. For example, the question bank Q1 may store relatively easy questions, with the level of difficulty progressively increasing through the question banks to the bank Qn. Accordingly, the master control and memory unit 24 may be actuated in accordance with a format to select questions of a predetermined character by designating a specific one of the banks Q1–Qn. Consider some specific operations as may be implemented with respect to the question memory 27. A telephone number alone may designate a specific question bank Q1–Qn, for example, the number being either "called" or "calling" and provided automatically (ANI, DNIS) or manually.

In a more elaborate example, telephone numbers provided automatically may be compared with telephone numbers provided manually to access a select question bank Q1–Qn only in the event of coincidence. Also, telephone numbers may be used in logic combinations with other data to select a question bank Q1–Qn. To consider some examples, a simple application might eliminate a bank of questions used previously in an interface with a calling number. Alternatively, banks may be eliminated if used previously for either or both of an automatically provided number and a manually provided number. Of course, inconsistent numbers might also prompt further programmed inquiries.

The selection of a question bank also may be based on other data, as data generated during an interface. For example, questions of progressive orders of difficulty may be propounded as a sequence interrupted by a incorrect answer.

Figure 2:
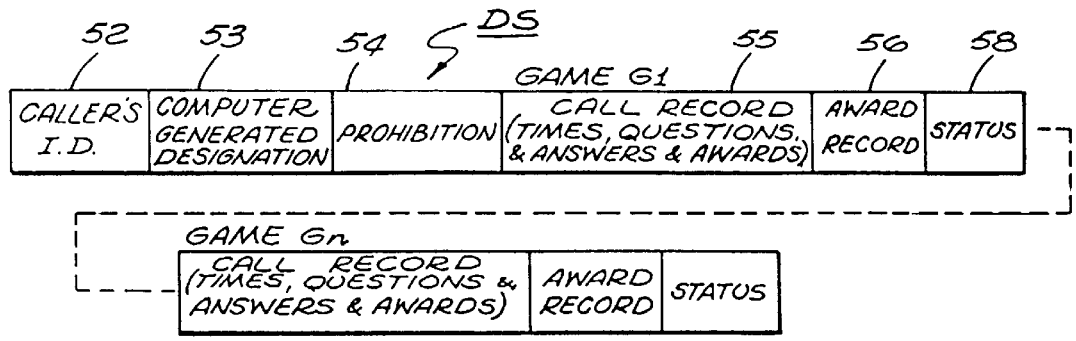
FIG. 2 is a fragmentary diagrammatic representation of a storage cell format as may be developed in the system of FIG. 1.

Returning to the structure of the master control and memory unit 24 and its related operations, data cells DS are stored for each caller and may involve a format as illustrated in FIG. 2. Specifically, a block 52 is indicated to represent a field for a caller's established identification. A block 53 carries a computer-generated designation for the caller. A block 54 indicates a prohibition field designating a caller either as being totally prohibited or prohibited with respect to certain game formats. As indicated above, a negative list of prohibited callers may alternatively or also be stored as a look-up table.

The balance of the data cell DS is dedicated to game format sections G1–Gn. In FIG. 2, three exemplary game sections are illustrated. Specifically, in a game section GI, designated field 55 carries a call record (times, questions, answers and awards), a field 56 indicates a caller's current award record, and a field 58 indicates a caller's status. Generally, variations or duplicates of the fields 55, 56 and 58 are provided in game sections G2–Gn for alternative game formats. Games may vary widely with caller data processed accordingly. For example, caller data may be processed individually or in interrelated patterns, as with reference to external data (random or source) to establish winners as subsets or progressive subsets.

To consider a specific example, a format now will be described wherein television viewers participate in a game show for prizes. Along with expanding participation of television viewers in a program, the format also has the potential of expanding general program interest.

Game shows for the exemplary format may take any of a wide variety of different forms in which studio contestants compete for prizes. However, in utilizing the system of the present invention to involve remote participants, it may be desirable to preliminarily qualify and designate callers. Specifically, prior to participating in a game, interested participants might interface the system as depicted in FIG. 1. In the course of an exchange, a data cell is initiated for each caller in the unit 24. The initial fields 52, 53 and possibly 54 are accordingly loaded.

With preregistration, at the time of participation, callers are qualified, initially by avoiding a negative list then by presence on a positive list, as by reference to an assigned memory cell. Thereafter, the interface data is received to supplement prior data. For example, a caller might select a studio audience participant with whom the caller is to be allied. The interface operation essentially may involve a voice generator in the associated audio response unit, e.g. unit ARI (FIG. 1) receiving cue signals from the processor IP1 to activate the remote telephone unit T1 to speak an instruction: "If you wish to play with Player No. 1, please push button No. 1; if you wish to play with Player No. 2, please push button No. 2. . . and so on". The caller also may be instructed to indicate the extent of a wager (points at risk). For example, "Push the number button indicating the points you wish to risk".

The received participant data or computed result data is stored in the active processor IP1 for return to an assigned cell in the unit 24. Scores are compared or otherwise interrelated between individual processors IP1–IPn to provide an abstract of key data in the cache memory 23. For example, the highest scores may be stored so that caller reports may cover a participant's score as well as indicating the significance of that score to others. A report message might state: "Your score is now 537. The highest score is 641 and the average score is 316. Good luck." Thus, individual accounts can be given for each of the calling participants dependent upon their success in association with a studio player. Thus, after an interval of play, the processing units, as the unit 92 (FIG. 4), may isolate a subset of scores in the cache memory 23. Of course, various arrangements may be provided ultimately for rewarding a select subset of winners or persons qualified for play at a higher level.

As explained, the above format generally involves a real-time game show with an on-line operating format. A somewhat similar format may involve non-real-time operation and in that sense, callers may interface the system of the present invention before and after the show; however, not primarily during the show. As examples, such a game format might involve: a quiz for callers based on their ability to perceive and remember occurrences within the show, a word game (Scrabble) or any of a multitude of games involving knowledge, time, random events and so on.

Figure 3:
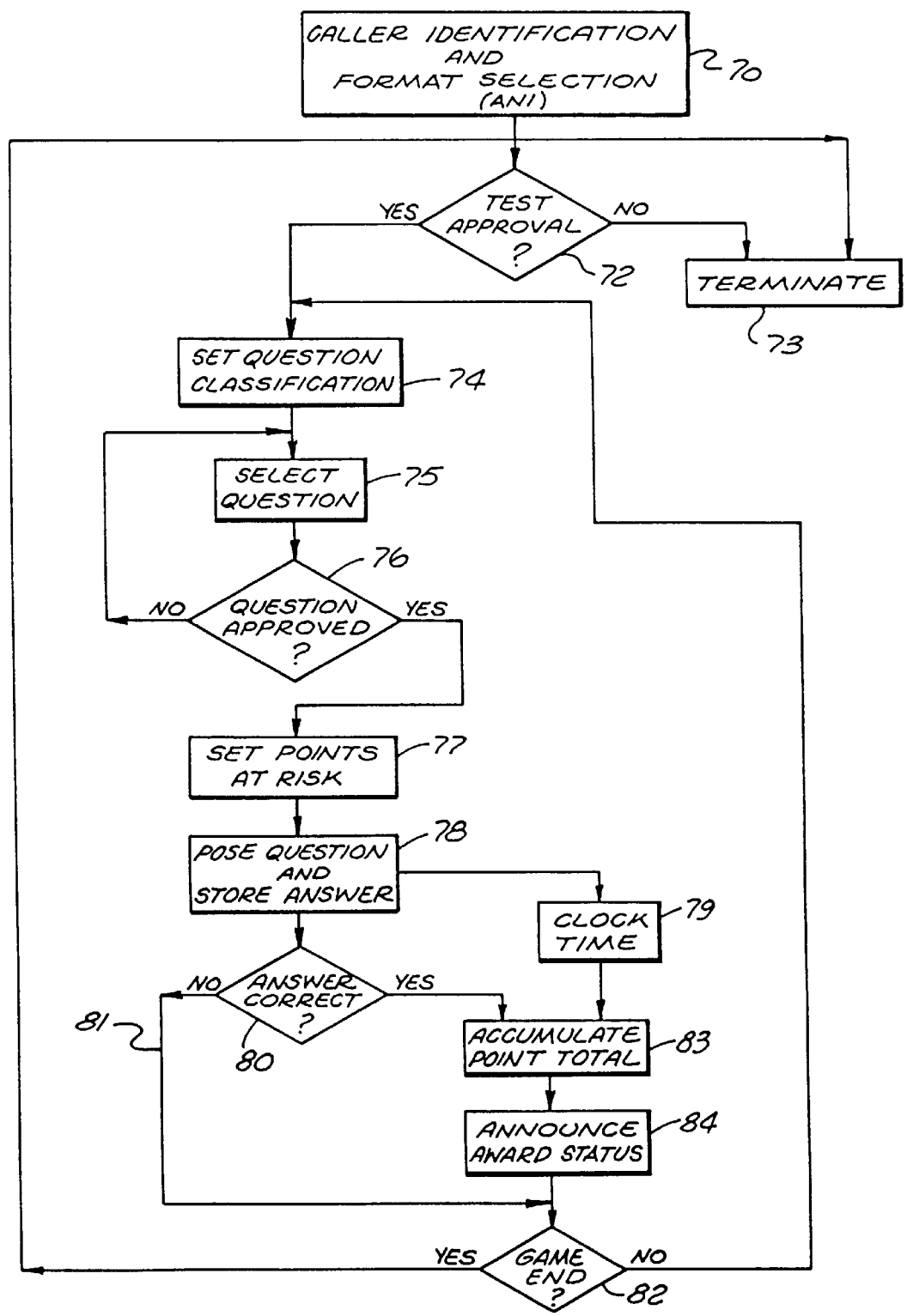
FIG. 3 is a flow diagram of one operating format of the system of FIG. 1.

As indicated above, a multitude of game formats may be executed based on an elemental operating process hereof as will now be considered with reference to FIG. 3. An initial operation involves caller identification and format selection. As indicated above, caller identification may have been previously established or may be established preliminarily in the course of a call to participate in a game. Caller identification may involve telephone terminal data as provided by ANI telephone equipment. Also, the designation of a specific format at the central station CS may be commanded on the basis of the called telephone number (may be provided by DNIS telephonic equipment). Thus, in certain instances, the caller identification and the format selection may occur with no conscious involvement by the caller. These operations are represented by the block 70 in FIG. 3.

With the identification of a caller, as represented in FIG. 3, the next step involves approving the caller for participation as represented by the query block 72. For example, callers might be tested in relation to negative or positive lists, personal identification numbers may be checked, a use-rate calculator may be involved or a caller may be tested or qualified with respect to various payment schemes. Accordingly, individual callers are ultimately either approved or disapproved.

As indicated above, calls that are determined to be unqualified based on ANI signals may be rejected without completing a communication circuit, i.e. "answering". Otherwise, callers disapproved from the test block 72 receive a termination message as represented by the block 73. The termination procedure may be variously formed, as with a spoken message or signals prompting the caller to hang up.

Approved callers encounter the next step in the process as represented by the block 74 involving the selection of a desired class of questions. Of course, specific formats may vary widely; however, as a simple example, with correct answers, a caller might be given questions in an increasing order of difficulty. Alternatively, orders of difficulty may be related to individual calls for participation in the game. As still another possibility, orders of difficulty may be related to a scale of risk, reward or be the choice of the caller. In any event, determining an order of difficulty prompts the master control and memory unit 24 (FIG. 1) to draw a stored question from a select one of the memory banks Q1–Qn. Thus, a question is selected in a process step as indicated by a block 75 (FIG. 3).

Selected questions are tested as indicated by a query block 76. For example, selected questions may be compared with previous questions propounded to a caller (stored in the field 55) so as to avoid duplications. If a question is determined to be duplicative, or otherwise inappropriate, the process returns to the step of block 75 for the selection of another question.

With the selection of an approved question, the process proceeds to the next step of determining the risk to be undertaken by the caller (block 77). For example, a caller may be instructed to indicate the extent of a wager. Specifically, the Q might be: "Please push the number button indicating the points you wish to risk". As represented in FIG. 3 by the block 77, the step establishes a degree of risk for the caller.

With the degree of risk determined and the question selected, the question is vocalized to the caller as indicated by block 78. Typically, the question may be answered by depressing a button or buttons 14 (FIG. 1) at the remote terminal T1. For example, "What are the initials of the fourth President of the United States?"

With the posing of a question, a time clock is checked as indicated by the block 79 for determining the interval between question and correct answer. A query block 80 represents the determination of whether or not a correct answer is received. If a correct answer is not received, the operation advances to a query block 82: "Game End?" as discussed below.

A correct answer advances the process from the step of the block 80 to a step represented by a block 83, i.e. of accumulating the award points. The step of the block 83 involves the determination of a correct answer (block 80) and the time required for the correct answer (block 79). A combination of time and the correct answer resolves the award points that are accumulated with any prior or existing point total as represented by the block 83. The resulting total is announced to the caller in a step illustrated by block 84. As explained above, the announcement may refer to comparative significant scores. As a part of a winning step in the process, the caller may be placed in direct vocal communication with an operator. Specifically, the unit 24 (FIG. 1) couples the call to the terminal 25 and supplies related prompting data for display.

The step of announcing a total point count to a caller advances the process to the query represented by block 82, i.e. determine whether or not the game phase has ended. If the game phase has ended, the process proceeds to the termination step as indicated by the block 73 (upper right). If the game phase has not ended, the process returns to the block 74, involving the preliminary step of selecting a question. Of course, the game may involve one or several questions during the course of each telephone call. At the end of a game phase, the data is returned to the unit 24 as for processing or future retrieval during another game phase.

The process as illustrated in FIG. 3 is executed in the system of FIG. 1 by an association between one of the processors IP1–IPn and the master control and memory unit 24 along with the question memory 27. Considering the processor IP1 generally, with the qualification of a call, a data cell for the caller is established in a data store 90 in the processor IP1. Somewhat similarly, the game format for the call is set in a control unit 92 within the processor IP1.

Also, with the operation of setting up the processor IP1, the master control and memory unit 24 functions with the question memory 27 and a specific one of the question banks Q1–Qn to isolate an operative question that is stored in a question unit 94 of the processor IP1. The select question is propounded to the caller through the coupler 22 and an audio response unit, e.g. unit AR1. Cued by the question (audio), the caller is expected to key in an answer to provide digital response data. Upon the occurrence of a correct answer, a point accumulator 96 (processor IP1) in combination with a clock 98 (processor IP1) determines a point award that is accumulated in the caller data store 90. Thus, the process proceeds until the call is terminated with the possibility of the caller acquiring points according to the predetermined operating format.

Figure 4:
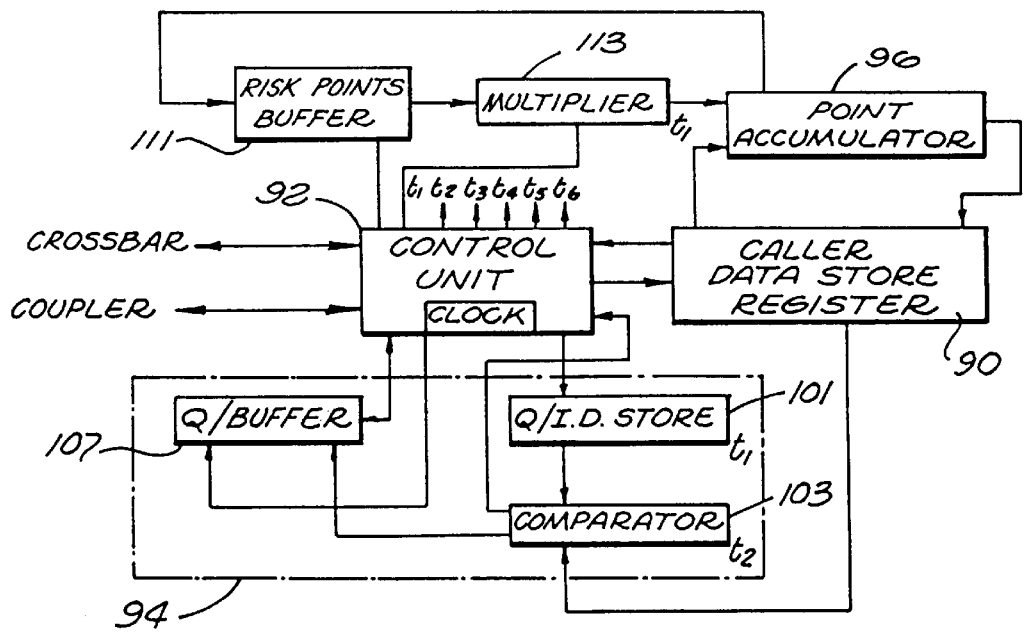
FIG. 4 is a block diagram of a processor or function unit as may be employed in the system of FIG. 1.

The components of the processor IP1 are shown in FIG. 4 arranged and inter coupled for operation. Note that similar identification numerals appear in FIGS. 1 and 4.

To treat an illustrative operation comprehensively with reference to FIGS. 1 and 4, again assume an exemplary format that is associated with a television broadcast. Specifically, after watching the broadcast of a television show (possibly a serial episode) the participant actuates the push buttons 14 at one of the remote terminals T1–Tn to accomplish an interface communication with the select operating format. For example, the caller may actuate the buttons 14 for the station number "1-900-555-7777" to identify the game format of current description.

With the responsive operation of the communication facility CO, the caller is coupled to an audio response unit, e.g. unit AR1. A further connection is made from the audio response unit AR1 through the coupler 22 to the unit 24.

Operating through the communication facility CO, one of the audio response units AR1–ARn, the coupler 22 and the master unit 24, the initial contact may be variously implemented. For example, a call signal as provided to a select audio response unit ARI may include representations of the caller's number and, accordingly, access a data cell on the caller. A general negative file may be carried in the master unit 24.

Recognizing the various possibilities, assume that at the outset of the interface, a voice generator in the audio response unit AR1 is actuated by the unit 24 to greet the caller. For example, the caller might be greeted: "Thank you for calling XYZ Company to participate in the XYZ Game".

As explained above, the caller may be variously qualified, for example, in a format to determine if the caller is registered, has a proper identification or has a key number. In any event, at some stage of operation, the master unit 24 provides the data cell for the caller to the processor IP1 which is stored in the caller register 90 (FIG. 4). As suggested above, if no data exists on the caller, the operating format may variously qualify or condition the caller with the result that data is established for the caller as indicated in FIG. 2.

In executing the specific process of a format, the control unit 92 (FIG. 4) provides timing signals t1–t6 to sequence specific components. Generally, the individual operations attendant each of the timing intervals (manifest by the high level of a binary signal) are as follows:

| Interval or Signal | Function |
| --- | --- |
| t1 | store tentative question |
| t2 | check tentative question |
| t3 | register question and determine risk points |
| t4 | operative question exchange interval (cue and response) |
| t5 | award points |
| t6 | accumulate points-and store |

To consider the overall operation as related to structure, the master unit 24 (FIG. 1) operates with one of the audio response units AR1–ARn initially to establish criterion for selecting a question. The criterion may involve the status of the caller, the sequence of the format, the nature of the game, or any of various other considerations. However, it is important to appreciate that the question memory 27 (FIG. 1) incorporates a multitude of banks Q1–Qn each of which contains questions serving different criteria, e.g. different levels of difficulty. Essentially, each question within each of the banks Q1–Qn is addressed by a specific designation which also indicates a class of question.

Upon the selection of a class of question, a specific tentative question is identified and an identification code is placed in a question identification storage 101 (FIG. 4) contained within the question unit 94. Accordingly, the identified question is tested against previous questions posed to the caller. Specifically, the record of the caller's data cell (FIG. 2) includes identification of prior questions posed. The identifications of those questions are sequentially supplied from the register 90 (FIG. 4) to a comparator 103 that is also coupled to the store 101. If a coincidence occurs, a signal is provided from the comparator 103 to the control unit 92 commanding the master unit 24 (FIG. 1) to select another tentative question. The test operation is then repeated as indicated by the block 76 in FIG. 3.

If no coincidence is detected between the prior and the tentative question, the comparator 103 (FIG. 4) provides a signal to a buffer 107 for accepting the question. Specifically, upon approval of a question, the master unit 24 (FIG. 1) addresses the select memory bank (Q1–Qn) to supply the selected question through the crossbar 26 and the control unit 92 (FIG. 4) to be registered in the buffer 107.

Concurrently with the operation of selecting a question for a specific interface, the system determines the degree of risk involved with the question. Specifically, as explained above, the caller may interface the master unit 24 through one of the audio response units AR1–ARn to establish points at risk, the value of which is represented by signals supplied through the crossbar 26 (FIG. 1) to the control unit 92 (FIG. 4) and set in a risk points buffer 111. Accordingly, with the degree of risk established (buffer 111) and the question established (buffer 107) the system proceeds to cue the caller with the select question.

The caller's answer is reduced to a digital format as a result of actuating the keys 14 at the remote terminal. Accordingly, digital signals are provided through the communication facility CO and the audio response unit ARI to the coupler 22 interfacing the processor IP1. Within the processor IP1, the control unit 92 tests the answer while metering the time required for the answer. Typically, the timing will be in terms of seconds. The control unit determines whether or not the answer is correct and if so, the amount of time required for the answer. As a result, factors may be determined as by the use of a simple look-up table. For example, if a correct answer is provided within two seconds, a factor of "3.0" may be formulated. A correct answer within five seconds might produce a factor of "2.5" while a correct answer within seven seconds produces a multiplier factor of "2.0".

Signals representative of the multiplier factor are provided from the control unit 92 to a multiplier 1 13 that is also coupled to receive signals representative of the risk points from the buffer 11. Accordingly, the value of the risk points is multiplied by the determined factor to produce a product supplied to the point accumulator 96 to be added to the residual value. Accordingly, a fresh accumulation is determined. Of course, if the correct answer is not provided, the multiplier 113 is dormant with the consequence that the caller is left with the residue of points in the accumulator 96 remaining after withdrawing the points-at-risk.

After each cycle of processing a question, the accumulated points may be announced to the caller simply by actuating the audio response unit ARI. As indicated above with respect to FIG. 3, when the game is concluded, the call is terminated in accordance with a predetermined subformnat.

In relation to the disclosed embodiment, it may be seen that the system affords certain distinct features important with respect to interface operation. Specifically, the provision of a plurality of data banks within a question memory accommodates various formats for question selection, e.g. order of difficulty, format state, geographic location and so on. Also, the feature allowing a caller to determine the points at risk affords considerable flexibility of operation with attendant caller participation. The feature incorporating time as a criterion for awards also affords considerable flexibility in formulating effective game formats.

Furthermore, depending on the detailed operation of the system, individual data packets for cells of callers afford an effective technique for accumulating data over a progressive game period. In a related context, qualification of callers is significant in general and particularly noteworthy in relation to declining select calls before "answering".

In view of the above description, it will be apparent that the system of the present invention may be effectively used in telephonic interfaces to accommodate flexibility and control by a caller in accordance with a predetermined format. Although the disclosed embodiment is directed to a game operation, it will be apparent that the system may be variously embodied to accommodate a wide variety of telephonic interface operations. Furthermore, it will be apparent that while the disclosed embodiment comprises specific elements and configurations, any of a variety of structures might well be utilized. Accordingly, the scope hereof is deemed to be as set forth in the claims below.

What is claimed is:

1. A process for determining the acceptability of calls and executing formats in association with a communication facility including remote terminal apparatus for individual callers, wherein said remote terminal apparatus includes a telephonic instrument with voice communication means and digital input means in the form of an array of alphabetic, numeric buttons for providing data, said process including the steps of:
   receiving associated telephone number signals upon the instance of a call from one of said remote terminal apparatus;
   testing said associated telephone number signals with respect to stored negative data to determine the acceptability of said call from said one of said remote terminal apparatus as indicated by an acceptability signal;
   accepting said call from said one of said remote terminal apparatus conditioned on said acceptability signal;
   interfacing via said communication facility to accepted calls to provide voice signals for cueing callers and receiving responsive digital data in accordance with a select format; and
   testing at least certain of the responsive digital data against stored positive data to determine if further voice signals for cueing callers should be provided.

2. A process according to claim 1 wherein said step of receiving associated telephone number signals includes receiving data represented by number identification signals provided automatically by said communication facility to indicate called or calling numbers.

3. A process according to claim 1 wherein said step of testing is accomplished prior to accepting said call whereby audio communication is not established for calls that are not accepted.

4. A process according to claim 1, further comprising the step of:
   transferring calls for which no acceptability signal is received to a manual terminal for direct communication.

5. A process according to claim 1, wherein the select format is selected from plurality of formats based on dialed number identification signals automatically received from the communication facility.

6. A process according to claim 1, wherein the stored negative data includes a list of unacceptable numbers.

7. A process according to claim 6, wherein the responsive digital data include identification data entered by the callers and the callers are further qualified based on the caller identification data.

8. A process according to claim 7, wherein the identification data includes social security number data for the callers.

9. A process according to claim 4, wherein an operator enters data at the manual terminal.

10. A process according to claim 4, further comprising the step of:
    storing at least a portion of the data entered by the operator.

11. A system for determining the acceptability of calls and executing certain operations of telephonic formats in association with a communication facility including remote terminal apparatus for individual callers, wherein said remote terminal apparatus includes a telephonic instrument with voice communication means and digital input means in the form of an array of alphabetic, numeric buttons for providing data, said system comprising:
    mean for receiving associated telephone number signals upon the instance of a call from one of said remote terminal apparatus;
    means for testing said associated telephone number signals with respect to stored negative data to determine the acceptability of said call from said one of said remote terminal apparatus as indicated by an acceptability signal;
    means for accepting said call from said one of said remote terminal apparatus conditioned on said acceptability signal;
    means for interfacing said communication facility to provide voice signals for cueing callers and receiving responsive digital data in accordance with a select format to accepted calls; and
    testing at least certain of the responsive digital data against stored positive data to determine if further voice signals for cueing callers should be provided.

12. A system according to claim 11, further comprising:
    a manual terminal to which calls are transferred for which no acceptability signal is received.

13. A system according to claim 11, wherein the select format is selected from a plurality of formats based on dialed number identification signals automatically received from the communication facility.

14. A system according to claim 11, wherein the stored negative data includes a list of unacceptable numbers.

15. A system according to claim 14, wherein the responsive digital data includes identification data entered by the callers and the callers are further qualified based on the caller identification data.

16. A system according to claim 15, wherein the identification data includes social security number data for the callers.

17. A system according to claim 12, wherein an operator enters data at the manual terminal.

18. A system according to claim 12, further comprising:
    storing at least a portion of the data entered by the operator.

19. A system according to claim 16, wherein the associated telephone number signals are received automatically from the communication facility (ANI).

20. A method for determining the acceptability of calls and executing certain operations of telephonic formats in association with a communication facility including remote terminal apparatus for the individual callers, wherein said remote terminal apparatus includes a telephonic instrument with voice communication means and digital input means in the form of an array of alphabetic, numeric buttons for providing data, including the steps of:

receiving associated telephone number signals automatically provided by the communication facility upon the instance of a call from one of said remote terminal apparatus;

testing said associated telephone number signals with respect to stored data to determine the acceptability of said call from said one of said remote terminal apparatus; and selectively providing one or more cues to said one of said remote terminal apparatus and providing at least one cue depending upon the associated telephone number signals for said call from said one of said remote terminal apparatus in accordance with a select format.

21. A method according to claim 20, further comprising the step of:

testing said associated telephone number signals against stored negative telephone numbers that are unacceptable.

22. A method according to claim 20, further comprising the step of:

transferring said call to a manual terminal based on a condition and displaying data relating to said caller.

23. A method according to claim 20, wherein the select format is identified from one of a plurality of formats based on dialed number identification signals automatically provided by the communication facility.

24. A method according to claim 20, wherein at least one cue indicates on-going accounting data during said call.

25. A method according to claim 20, further comprising the step of:

receiving digital data in accordance with the select format responsive to at least one cue.

26. A method according to claim 25, further comprising the step of:

further testing and qualifying callers based on a one time use test.

27. A method according to claim 25, wherein the callers are further qualified based on the associated telephone number signals or caller identification data entered as digital data responsive to the cue or both.

28. A method according to claim 27, wherein the caller identification data is social security data.

29. A method according to claim 27, further comprising the step of:

transferring said call to a manual terminal for direct communication.

30. A method according to claim 29, wherein data for a caller is entered at the manual terminal.

31. A method according to claim 22, wherein the displaying of the data relating to the caller is based on the associated telephone number signals relating to the call.

32. A method according to claim 22, wherein the data relating to the caller includes caller entered data.

* * * * *

UNITED STATES PATENT AND TRADEMARK OFFICE
CERTIFICATE OF CORRECTION

| | |
|---|---|
| PATENT NO. | : 6,512,415 C1 |
| APPLICATION NO. | : 90/010046 |
| DATED | : November 10, 2009 |
| INVENTOR(S) | : Ronald A. Katz |

It is certified that error appears in the above-identified patent and that said Letters Patent is hereby corrected as shown below:

Title Page,
Please change (73) "General Electric Capital Corporation, Atlanta, GA (US)" to read
-- Ronald A. Katz Technology Licensing L.P., Los Angeles, CA (US) --

Signed and Sealed this
Sixth Day of March, 2012

David J. Kappos
*Director of the United States Patent and Trademark Office*

(12) EX PARTE REEXAMINATION CERTIFICATE (7151st)
United States Patent
Katz

(10) Number: US 6,512,415 C1
(45) Certificate Issued: *Nov. 10, 2009

(54) TELEPHONIC-INTERFACE GAME CONTROL SYSTEM

(75) Inventor: Ronald A. Katz, Los Angeles, CA (US)

(73) Assignee: General Electric Capital Corporation, Atlanta, GA (US)

Reexamination Request:
No. 90/010,046, Nov. 6, 2007

Reexamination Certificate for:
Patent No.: 6,512,415
Issued: Jan. 28, 2003
Appl. No.: 09/340,618
Filed: Jun. 28, 1999

(*) Notice: This patent is subject to a terminal disclaimer.

Related U.S. Application Data

(63) Continuation of application No. 09/128,936, filed on Aug. 5, 1998, now Pat. No. 6,151,387, which is a continuation of application No. 08/559,538, filed on Nov. 16, 1995, now Pat. No. 5,793,846, which is a continuation of application No. 08/073,585, filed on Jun. 7, 1993, now Pat. No. 5,553,120, which is a continuation of application No. 07/534,907, filed on Jun. 8, 1990, now Pat. No. 5,218,631, which is a continuation-in-part of application No. 07/335,923, filed on Apr. 10, 1989, now Pat. No. 6,016,344, which is a continuation of application No. 07/194,258, filed on May 16, 1988, now Pat. No. 4,845,739, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned.

(51) Int. Cl.
*H04Q 3/64* (2006.01)
*H04Q 3/00* (2006.01)
*H04Q 3/66* (2006.01)
*H04Q 3/74* (2006.01)
*H04M 3/51* (2006.01)
*H04M 3/50* (2006.01)
*H04M 11/00* (2006.01)
*H04M 3/46* (2006.01)
*H04M 3/487* (2006.01)
*H04M 3/38* (2006.01)
*G07C 15/00* (2006.01)
*G07C 11/00* (2006.01)
H04M 3/493 (2006.01)
H04M 3/36 (2006.01)
H04M 3/436 (2006.01)
H04M 3/42 (2006.01)
H04Q 3/545 (2006.01)
H04Q 3/72 (2006.01)
A63F 3/08 (2006.01)

(52) U.S. Cl. .................................. 379/88.22; 379/93.13
(58) Field of Classification Search ........................ None
See application file for complete search history.

(56) References Cited

U.S. PATENT DOCUMENTS 2,902,541 A    9/1959  Singleton (Continued)

FOREIGN PATENT DOCUMENTS

AU    66113/81    7/1981

(Continued)

OTHER PUBLICATIONS

Want to Buy It? Call Tootie: HSC's VRU Keeps Phones Ringing, Chain Store Age Executive, May 1988.

(Continued)

*Primary Examiner*—James Menefee

(57) ABSTRACT

A control system CS interfaces a multiplicity of individual terminals T1-Tn through a telephone network facility CO to accommodate game formats. At the terminals T1-Tn, callers are prompted by voice-generated instructions to provide digital data that is identified for positive association with a caller and stored, as for processing. Calls are conditionally accepted based on a test of preliminary identification data (ANI or DNIS). Computer generated designations are assigned to callers and stored. Questions for game use are stored in banks, classified by order of difficulty for selection according to various formats. Specific game formats accommodate various time criteria and caller selection of degree of risk. Caller data is stored in cells along with statistical and identification data; also, key contest data is held accessible in a cache memory for reporting. Caller data may be processed individually or in interrelated formats as with reference to random or source data as to establish progressive subsets. A break-off control circuit may terminate the computer interface aborting to a manual terminal for direct communication with an operator. Real-time operation processing is an alternative to subsequently processing stored data.

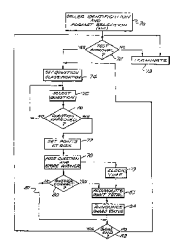

U.S. PATENT DOCUMENTS

| | | | |
|---|---|---|---|
| 2,941,161 A | 6/1960 | Scantlin | |
| 3,022,381 A | 2/1962 | Pferd | |
| 3,060,275 A | 10/1962 | Meacham et al. | |
| 3,076,059 A | 1/1963 | Meacham et al. | |
| 3,082,402 A | 3/1963 | Scantlin | |
| 3,128,349 A | 4/1964 | Boesch et al. | |
| 3,159,818 A | 12/1964 | Scantlin | |
| 3,189,687 A | 6/1965 | Miller | |
| 3,194,892 A | 7/1965 | Glenner | 179/18 |
| 3,243,514 A | 3/1966 | Moore et al. | 179/17 |
| 3,246,082 A | 4/1966 | Levy | |
| 3,249,919 A | 5/1966 | Scantlin | |
| 3,299,210 A | 1/1967 | Bandy | |
| 3,337,847 A | 8/1967 | Olsson et al. | |
| 3,347,988 A | 10/1967 | Marill et al. | |
| 3,371,162 A | 2/1968 | Scantlin | |
| 3,381,276 A | 4/1968 | James | |
| 3,393,272 A | 7/1968 | Hanson | |
| 3,394,246 A | 7/1968 | Goldman | |
| 3,482,057 A | 12/1969 | Abbott et al. | |
| 3,515,814 A | 6/1970 | Morgan | |
| 3,544,769 A | 12/1970 | Hedin | |
| 3,553,378 A | 1/1971 | Solomon et al. | |
| 3,555,198 A | 1/1971 | Stepan | |
| 3,556,530 A | 1/1971 | Barr | |
| 3,557,311 A | 1/1971 | Goldstein | |
| 3,564,210 A | 2/1971 | Presti | |
| 3,568,157 A | 3/1971 | Downing et al. | |
| 3,569,939 A | 3/1971 | Doblmaier et al. | |
| 3,571,799 A | 3/1971 | Coker, Jr. et al. | |
| 3,573,747 A | 4/1971 | Adams et al. | |
| 3,581,072 A | 5/1971 | Nymeyer | |
| 3,594,004 A | 7/1971 | Barr | |
| 3,617,638 A | 11/1971 | Jochimsen et al. | |
| 3,618,038 A | 11/1971 | Stein | |
| 3,622,995 A | 11/1971 | Dilks | |
| 3,624,292 A | 11/1971 | Guzak, Jr. | |
| 3,644,675 A | 2/1972 | Waltington | |
| 3,647,973 A | 3/1972 | James et al. | |
| 3,651,480 A | 3/1972 | Downing et al. | |
| 3,651,503 A | 3/1972 | Kono | 340/174.1 |
| 3,652,795 A | 3/1972 | Wolf et al. | |
| 3,656,113 A | 4/1972 | Lince | |
| 3,665,107 A | 5/1972 | Kopec et al. | |
| 3,675,513 A | 7/1972 | Flanagan et al. | |
| 3,676,597 A | 7/1972 | Peterson | |
| 3,688,126 A | 8/1972 | Klein | |
| 3,689,703 A | 9/1972 | Allen et al. | |
| 3,696,335 A | 10/1972 | Lemelson | |
| 3,697,702 A | 10/1972 | Bounsante et al. | |
| 3,702,392 A | 11/1972 | St. Jean | 235/61.7 |
| 3,725,596 A | 4/1973 | Maxon et al. | |
| 3,725,597 A | 4/1973 | Streisand | |
| 3,727,186 A | 4/1973 | Stephenson | |
| 3,752,904 A | 8/1973 | Waterbury | |
| 3,769,463 A | 10/1973 | Graham et al. | |
| 3,778,553 A | 12/1973 | Rackman | 379/93.27 |
| 3,781,810 A | 12/1973 | Downing | |
| 3,787,632 A | 1/1974 | Male et al. | |
| 3,792,446 A | 2/1974 | McFiggins et al. | |
| 3,794,774 A | 2/1974 | Kemmerly et al. | |
| 3,798,360 A | 3/1974 | Feistel | 380/37 |
| 3,800,283 A | 3/1974 | Gropper | |
| 3,829,628 A | 8/1974 | Tripsas | |
| 3,833,885 A | 9/1974 | Gentile et al. | 235/379 |
| 3,858,032 A | 12/1974 | Scantlin | |
| 3,870,821 A | 3/1975 | Steury | |
| 3,870,866 A | 3/1975 | Halpern | |
| 3,881,160 A | 4/1975 | Ross | |
| 3,889,050 A | 6/1975 | Thompson | |
| 3,909,553 A | 9/1975 | Marshall | |
| 3,912,874 A | 10/1975 | Botterell et al. | |
| 3,914,747 A | 10/1975 | Barnes et al. | |
| 3,918,174 A | 11/1975 | Miller et al. | |
| 3,920,908 A | 11/1975 | Kraus | |
| 3,928,724 A | 12/1975 | Byram et al. | |
| 3,929,278 A | 12/1975 | Balavoine et al. | |
| 3,934,095 A | 1/1976 | Matthews et al. | |
| 3,938,091 A | 2/1976 | Atalla et al. | |
| 3,940,569 A | 2/1976 | Schonbrun | |
| 3,947,972 A | 4/1976 | Freeman | |
| 3,950,618 A | 4/1976 | Bloisi | |
| 3,959,603 A | 5/1976 | Nilssen et al. | 377/42 |
| 3,974,338 A | 8/1976 | Luzier et al. | |
| 3,982,103 A | 9/1976 | Goldman | |
| 3,985,998 A | 10/1976 | Crafton | |
| 3,987,252 A | 10/1976 | Vicari | |
| 3,989,899 A | 11/1976 | Norwich | |
| 3,991,406 A | 11/1976 | Downing et al. | |
| 3,998,465 A | 12/1976 | Mascola | |
| 4,007,336 A | 2/1977 | Hutton, Sr. | 179/18 |
| 4,009,342 A | 2/1977 | Fahrenschon et al. | |
| 4,012,599 A | 3/1977 | Meyer | |
| 4,017,835 A | 4/1977 | Randolph | |
| 4,024,345 A | 5/1977 | Kochem | |
| 4,028,494 A | 6/1977 | Zarouni | |
| 4,054,756 A | 10/1977 | Comella et al. | |
| 4,068,099 A | 1/1978 | Mikkola | |
| 4,071,698 A | 1/1978 | Barger, Jr. et al. | |
| 4,078,316 A | 3/1978 | Freeman | |
| 4,087,638 A | 5/1978 | Hayes et al. | |
| 4,088,838 A | 5/1978 | Nakata et al. | |
| 4,090,034 A | 5/1978 | Moylan | |
| 4,090,038 A | 5/1978 | Biggs | |
| 4,097,923 A | 6/1978 | Eckert, Jr. | |
| 4,108,361 A | 8/1978 | Krause | |
| 4,117,278 A | 9/1978 | Ehrlich et al. | |
| 4,121,052 A | 10/1978 | Richard | |
| 4,122,308 A | 10/1978 | Weinberger et al. | |
| 4,139,739 A | 2/1979 | von Meister | |
| 4,145,578 A | 3/1979 | Orriss | |
| 4,150,255 A | 4/1979 | Theis et al. | |
| 4,152,547 A | 5/1979 | Theis | |
| 4,160,125 A | 7/1979 | Bower et al. | |
| 4,160,129 A | 7/1979 | Peyser et al. | |
| 4,162,377 A | 7/1979 | Mearns | |
| 4,187,498 A | 2/1980 | Creekmore | |
| 4,191,376 A | 3/1980 | Goldman | |
| 4,191,860 A | 3/1980 | Weber | |
| 4,192,972 A | 3/1980 | Bertoglio et al. | |
| 4,194,089 A | 3/1980 | Hashimoto | |
| 4,200,770 A | 4/1980 | Hellman et al. | |
| 4,201,887 A | 5/1980 | Burns | |
| 4,204,113 A | 5/1980 | Giraud et al. | |
| 4,221,933 A | 9/1980 | Cornell et al. | |
| 4,223,183 A | 9/1980 | Peters, Jr. | |
| 4,232,199 A | 11/1980 | Boatwright et al. | |
| 4,241,942 A | 12/1980 | Bachman | |
| 4,242,539 A | 12/1980 | Hashimoto | |
| 4,243,844 A | 1/1981 | Waldman | |
| 4,255,618 A | 3/1981 | Danner et al. | |
| 4,255,619 A | 3/1981 | Saito | |
| RE30,580 E | 4/1981 | Goldman et al. | |
| 4,260,854 A | 4/1981 | Kolodny et al. | |
| 4,264,924 A | 4/1981 | Freeman | |
| 4,264,925 A | 4/1981 | Freeman et al. | |
| 4,270,024 A | 5/1981 | Theis et al. | |
| 4,277,649 A | 7/1981 | Sheinbein | |
| 4,290,141 A | 9/1981 | Anderson et al. | |
| 4,299,637 A | 11/1981 | Oberdeck et al. | |
| 4,302,810 A | 11/1981 | Bouricius et al. | |

| | | | | | |
|---|---|---|---|---|---|
| RE30,821 E | 12/1981 | Goldman | 4,577,067 A | 3/1986 | Levy et al. |
| 4,303,804 A | 12/1981 | Johnson et al. | 4,578,700 A | 3/1986 | Roberts et al. |
| 4,307,266 A | 12/1981 | Messina | 4,580,011 A | 4/1986 | Glaser |
| 4,313,035 A | 1/1982 | Jordan et al. | 4,580,012 A | 4/1986 | Matthews et al. |
| 4,314,103 A | 2/1982 | Wilson | 4,581,486 A | 4/1986 | Matthews et al. |
| 4,317,961 A | 3/1982 | Johnson | 4,582,956 A | 4/1986 | Doughty |
| 4,320,256 A | 3/1982 | Freeman | 4,584,602 A | 4/1986 | Nakagawa |
| 4,323,770 A | 4/1982 | Dieulot et al. | 4,585,903 A | 4/1986 | Schiller et al. |
| 4,328,396 A | 5/1982 | Theis | 4,585,906 A | 4/1986 | Matthews et al. |
| 4,338,494 A | 7/1982 | Theis | 4,586,707 A | 5/1986 | McNeight et al. |
| 4,339,798 A | 7/1982 | Hedges et al. | 4,587,379 A | 5/1986 | Masuda |
| 4,345,315 A | 8/1982 | Cadotte et al. | 4,591,190 A | 5/1986 | Clark |
| 4,348,554 A | 9/1982 | Asmuth | 4,591,664 A | 5/1986 | Freeman |
| 4,355,207 A | 10/1982 | Curtin | 4,591,665 A | 5/1986 | Foster et al. |
| 4,355,372 A | 10/1982 | Johnson et al. | 4,592,546 A | 6/1986 | Fascenda et al. |
| 4,360,827 A | 11/1982 | Braun | 4,594,476 A | 6/1986 | Freeman |
| 4,360,875 A | 11/1982 | Behnke | 4,595,983 A | 6/1986 | Gehalo et al. |
| 4,367,402 A | 1/1983 | Giraud et al. | 4,598,367 A | 7/1986 | DeFrancesco et al. |
| 4,371,752 A | 2/1983 | Matthews et al. | 4,599,493 A | 7/1986 | Cave |
| 4,376,875 A | 3/1983 | Beirne | 4,600,809 A | 7/1986 | Tatsumi et al. |
| 4,389,546 A | 6/1983 | Glisson et al. | 4,603,232 A | 7/1986 | Kurland et al. |
| 4,393,277 A | 7/1983 | Besen et al. | 4,611,094 A | 9/1986 | Asmuth et al. |
| 4,398,708 A | 8/1983 | Goldman et al. | 4,611,096 A | 9/1986 | Asmuth et al. |
| 4,401,856 A | 8/1983 | Curtin et al. | 4,612,416 A | 9/1986 | Emerson et al. |
| 4,405,829 A | 9/1983 | Rivest et al. | 4,614,367 A | 9/1986 | Breen |
| 4,410,765 A | 10/1983 | Hestad et al. | 4,616,852 A | 10/1986 | Cash |
| 4,420,656 A | 12/1983 | Freeman | 4,625,079 A | 11/1986 | Castro et al. |
| 4,427,848 A | 1/1984 | Tsakanikas | 4,625,081 A | 11/1986 | Lotito et al. |
| 4,428,296 A | 1/1984 | Scheuchzer et al. | 4,625,276 A | 11/1986 | Benton et al. |
| 4,438,824 A | 3/1984 | Mueller-Schloer | 4,630,200 A | 12/1986 | Ohmae et al. |
| 4,439,635 A | 3/1984 | Theis et al. | 4,630,201 A | 12/1986 | White |
| 4,439,636 A | 3/1984 | Newkirk et al. | 4,634,809 A | 1/1987 | Paulsson et al. |
| 4,445,001 A | 4/1984 | Bertoglio | 4,635,251 A | 1/1987 | Stanley et al. |
| 4,449,040 A | 5/1984 | Matsuoka et al. | 4,640,991 A | 2/1987 | Matthews et al. |
| 4,451,700 A | 5/1984 | Kempner et al. | 4,645,873 A | 2/1987 | Chomet |
| 4,467,424 A | 8/1984 | Hedges et al. | 4,649,563 A | 3/1987 | Riskin |
| 4,468,528 A | 8/1984 | Reece et al. | 4,652,998 A | 3/1987 | Koza et al. |
| 4,468,529 A | 8/1984 | Samuel et al. | 4,654,482 A | 3/1987 | DeAngelis |
| 4,475,189 A | 10/1984 | Herr et al. | 4,656,624 A | 4/1987 | Collins et al. |
| 4,484,031 A | 11/1984 | Gray et al. | 4,658,417 A | 4/1987 | Hashimoto et al. |
| 4,489,438 A | 12/1984 | Hughes | 4,663,777 A | 5/1987 | Szeto |
| 4,490,583 A | 12/1984 | Bednarz et al. | 4,665,502 A | 5/1987 | Kreisner |
| 4,494,197 A | 1/1985 | Troy et al. | 4,669,730 A | 6/1987 | Small |
| 4,501,958 A | 2/1985 | Glize et al. | 4,671,512 A | 6/1987 | Bachman et al. |
| 4,511,764 A | 4/1985 | Nakayama et al. | 4,672,660 A | 6/1987 | Curtin |
| 4,513,175 A | 4/1985 | Smith | 4,673,802 A | 6/1987 | Ohmae et al. |
| 4,517,410 A | 5/1985 | Williams et al. | 4,674,044 A | 6/1987 | Kalmus et al. |
| 4,517,412 A | 5/1985 | Newkirk et al. | 4,677,552 A | 6/1987 | Sibley, Jr. |
| 4,518,824 A | 5/1985 | Mondardini | 4,677,553 A | 6/1987 | Roberts et al. |
| 4,518,827 A | 5/1985 | Sagara | 4,680,785 A | 7/1987 | Akiyama et al. |
| 4,521,643 A | 6/1985 | Dupuis et al. | 4,685,123 A | 8/1987 | Hsia et al. |
| 4,523,055 A | 6/1985 | Hohl et al. | 4,685,127 A | 8/1987 | Miller et al. |
| 4,531,023 A | 7/1985 | Levine | 4,688,170 A | 8/1987 | Waite et al. |
| 4,532,378 A | 7/1985 | Nakayama et al. | 4,689,742 A | 8/1987 | Troy et al. |
| 4,539,435 A | 9/1985 | Eckmann | 4,692,817 A | 9/1987 | Theis |
| 4,539,436 A | 9/1985 | Theis | 4,694,490 A | 9/1987 | Harvey et al. |
| 4,541,087 A | 9/1985 | Comstock | 4,696,028 A | 9/1987 | Morganstein et al. |
| 4,544,804 A | 10/1985 | Herr et al. | 4,696,029 A | 9/1987 | Cohen |
| 4,547,851 A | 10/1985 | Kurland | 4,697,282 A | 9/1987 | Winter et al. |
| 4,549,047 A | 10/1985 | Brian et al. | 4,704,725 A | 11/1987 | Harvey et al. |
| 4,549,291 A | 10/1985 | Renoulin | 4,706,275 A | 11/1987 | Kamil |
| 4,555,594 A | 11/1985 | Friedes et al. | 4,710,955 A | 12/1987 | Kauffman |
| 4,556,970 A | 12/1985 | Flanagin et al. ............... 370/58 | 4,715,061 A | 12/1987 | Norwich |
| 4,559,415 A | 12/1985 | Bernard et al. | 4,716,583 A | 12/1987 | Groner et al. |
| 4,559,416 A | 12/1985 | Theis et al. | 4,719,647 A | 1/1988 | Theis et al. |
| 4,562,342 A | 12/1985 | Solo | 4,722,526 A | 2/1988 | Tovar et al. |
| 4,565,903 A | 1/1986 | Riley | 4,734,858 A | 3/1988 | Schlafly |
| 4,566,030 A | 1/1986 | Nickerson et al. | 4,737,983 A | 4/1988 | Frauenthal et al. |
| 4,567,359 A | 1/1986 | Lockwood | 4,745,468 A | 5/1988 | Von Kohorn |
| 4,570,930 A | 2/1986 | Matheson | 4,747,124 A | 5/1988 | Ladd |
| 4,577,062 A | 3/1986 | Hilleary et al. | 4,748,668 A | 5/1988 | Shamir et al. |

| Patent | Date | Name |
|---|---|---|
| 4,750,199 A | 6/1988 | Norwich |
| 4,755,872 A | 7/1988 | Bestler et al. |
| 4,756,020 A | 7/1988 | Fodale |
| 4,757,267 A | 7/1988 | Riskin |
| 4,759,056 A | 7/1988 | Akiyama |
| 4,761,684 A | 8/1988 | Clark et al. |
| 4,761,807 A | 8/1988 | Matthews et al. |
| 4,761,808 A | 8/1988 | Howard |
| 4,763,191 A | 8/1988 | Gordon et al. |
| 4,763,353 A | 8/1988 | Canale et al. |
| 4,764,666 A | 8/1988 | Bergeron |
| 4,766,604 A | 8/1988 | Axberg |
| 4,768,222 A | 8/1988 | Kalfon |
| 4,768,223 A | 8/1988 | Kinoshita et al. |
| 4,769,834 A | 9/1988 | Billinger et al. |
| 4,774,655 A | 9/1988 | Kollin et al. |
| 4,781,377 A | 11/1988 | McVean et al. |
| 4,782,508 A | 11/1988 | Borchering et al. |
| 4,782,510 A | 11/1988 | Szlam |
| 4,782,519 A | 11/1988 | Patel et al. |
| 4,783,796 A | 11/1988 | Ladd |
| 4,783,800 A | 11/1988 | Levine |
| 4,785,408 A | 11/1988 | Britton et al. |
| 4,785,473 A | 11/1988 | Pfeiffer et al. |
| 4,788,682 A | 11/1988 | Vij et al. |
| 4,788,715 A | 11/1988 | Lee |
| 4,788,716 A | 11/1988 | Zebe |
| 4,788,718 A | 11/1988 | McNabb et al. |
| 4,789,928 A | 12/1988 | Fujisaki |
| 4,791,640 A | 12/1988 | Sand |
| 4,791,664 A | 12/1988 | Lutz et al. |
| 4,791,666 A | 12/1988 | Cobb et al. |
| 4,792,968 A | 12/1988 | Katz |
| 4,792,973 A | 12/1988 | Gilhousen et al. |
| 4,796,293 A | 1/1989 | Blinken et al. |
| 4,797,818 A | 1/1989 | Cotter |
| 4,797,910 A | 1/1989 | Daudelin |
| 4,797,911 A | 1/1989 | Szlam et al. |
| 4,797,913 A | 1/1989 | Kaplan et al. |
| 4,799,156 A | 1/1989 | Shavit et al. |
| 4,799,255 A | 1/1989 | Billinger |
| 4,800,583 A | 1/1989 | Theis |
| 4,805,207 A | 2/1989 | McNutt et al. |
| 4,805,209 A | 2/1989 | Baker, Jr. et al. |
| 4,812,843 A | 3/1989 | Champion, III et al. |
| 4,815,031 A | 3/1989 | Furukawa |
| 4,815,121 A | 3/1989 | Yoshida |
| 4,815,741 A | 3/1989 | Small |
| 4,827,500 A | 5/1989 | Binkerd et al. |
| 4,829,563 A | 5/1989 | Crockett et al. |
| 4,832,341 A | 5/1989 | Muller |
| 4,835,630 A | 5/1989 | Freer |
| 4,842,278 A | 6/1989 | Markowicz |
| 4,845,739 A | 7/1989 | Katz |
| 4,847,890 A | 7/1989 | Solomon et al. |
| 4,850,007 A | 7/1989 | Marino et al. |
| 4,852,154 A | 7/1989 | Lewis et al. |
| 4,853,882 A | 8/1989 | Marshall |
| 4,856,050 A | 8/1989 | Theis et al. |
| 4,856,066 A | 8/1989 | Lemelson |
| 4,866,756 A | 9/1989 | Crane et al. |
| 4,870,679 A | 9/1989 | Hanna et al. |
| 4,876,592 A | 10/1989 | Von Kohorn |
| 4,876,717 A | 10/1989 | Barron et al. |
| 4,878,240 A | 10/1989 | Lin et al. |
| 4,879,744 A | 11/1989 | Tasaki et al. |
| 4,881,261 A | 11/1989 | Oliphant et al. |
| 4,882,473 A | 11/1989 | Bergeron et al. |
| 4,893,325 A | 1/1990 | Pankonen et al. |
| 4,893,328 A | 1/1990 | Peacock |
| 4,893,330 A | 1/1990 | Franco |
| 4,894,857 A | 1/1990 | Szlam et al. |
| 4,896,345 A | 1/1990 | Thorne |
| 4,896,346 A | 1/1990 | Belfield et al. |
| 4,897,867 A | 1/1990 | Foster et al. |
| 4,897,870 A | 1/1990 | Golden |
| 4,899,373 A | 2/1990 | Lee et al. |
| 4,899,375 A | 2/1990 | Bauer et al. |
| 4,907,079 A | 3/1990 | Turner et al. |
| 4,908,761 A | 3/1990 | Tai |
| 4,908,850 A | 3/1990 | Masson et al. |
| 4,908,852 A | 3/1990 | Hird et al. |
| 4,916,726 A | 4/1990 | Morley, Jr. et al. |
| 4,922,519 A | 5/1990 | Daudelin |
| 4,922,520 A | 5/1990 | Bernard et al. |
| 4,922,522 A | 5/1990 | Scanlon |
| 4,926,462 A | 5/1990 | Ladd et al. |
| 4,926,996 A | 5/1990 | Eglise et al. |
| 4,932,021 A | 6/1990 | Moody |
| 4,932,042 A | 6/1990 | Baral et al. |
| 4,933,965 A | 6/1990 | Hird |
| 4,937,853 A | 6/1990 | Brule et al. |
| 4,942,598 A | 7/1990 | Davis |
| 4,942,599 A | 7/1990 | Gordon et al. |
| 4,942,616 A | 7/1990 | Linstroth et al. |
| 4,943,995 A | 7/1990 | Dandelin et al. |
| 4,951,307 A | 8/1990 | Willard |
| 4,951,310 A | 8/1990 | Honda et al. |
| 4,955,047 A | 9/1990 | Morganstein et al. |
| 4,959,783 A | 9/1990 | Scott et al. |
| 4,959,855 A | 9/1990 | Daudelin |
| 4,961,217 A | 10/1990 | Akiyama |
| 4,964,157 A | 10/1990 | Aoshima |
| 4,965,825 A | 10/1990 | Harvey et al. |
| 4,969,183 A | 11/1990 | Reese |
| 4,969,185 A | 11/1990 | Dorst et al. |
| 4,972,461 A | 11/1990 | Brown et al. |
| 4,974,252 A | 11/1990 | Osborne |
| 4,975,945 A | 12/1990 | Carbullido |
| 4,985,913 A | 1/1991 | Shalom et al. |
| 4,989,233 A | 1/1991 | Schakowsky et al. |
| 4,989,234 A | 1/1991 | Schakowsky et al. |
| 4,992,940 A | 2/1991 | Dworkin |
| 4,996,705 A | 2/1991 | Entenmann et al. |
| 5,000,486 A | 3/1991 | Rua, Jr. et al. |
| 5,001,710 A | 3/1991 | Gawrys et al. |
| 5,003,574 A | 3/1991 | Denq et al. |
| 5,003,585 A | 3/1991 | Richer |
| 5,003,595 A | 3/1991 | Collins et al. |
| 5,014,298 A | 5/1991 | Katz |
| 5,017,917 A | 5/1991 | Fisher et al. |
| 5,018,736 A | 5/1991 | Pearson et al. |
| 5,023,904 A | 6/1991 | Kaplan et al. |
| 5,029,196 A | 7/1991 | Morganstein |
| 5,033,076 A | 7/1991 | Jones et al. |
| 5,033,088 A | 7/1991 | Shipman |
| 5,036,535 A | 7/1991 | Gechter et al. |
| 5,046,183 A | 9/1991 | Dorst et al. |
| 5,048,075 A | 9/1991 | Katz ................ 379/92.03 |
| 5,054,059 A | 10/1991 | Stern et al. |
| 5,068,891 A | 11/1991 | Marshall |
| 5,083,272 A | 1/1992 | Walker et al. |
| 5,097,528 A | 3/1992 | Gursahaney et al. |
| 5,109,414 A | 4/1992 | Harvey et al. |
| 5,125,024 A | 6/1992 | Gokcen et al. |
| 5,127,003 A | 6/1992 | Doll, Jr. et al. |
| 5,128,984 A | 7/1992 | Katz |
| 5,146,491 A | 9/1992 | Silver et al. |
| 5,148,474 A | 9/1992 | Haralambopoulos et al. |
| 5,153,906 A | 10/1992 | Akiyama |
| 5,164,981 A | 11/1992 | Mitchell et al. |
| 5,168,548 A | 12/1992 | Kaufman et al. |

| | | | | | | |
|---|---|---|---|---|---|---|
| 5,179,585 A | 1/1993 | MacMillan, Jr. et al. | EP | 0060643 A2 | 3/1982 | |
| 5,181,236 A | 1/1993 | LaVallee et al. | EP | 0066823 A1 | 5/1982 | |
| 5,181,238 A | 1/1993 | Medamana et al. | EP | 0088639 A2 | 3/1983 | |
| 5,186,471 A | 2/1993 | Vancraeynest | EP | 0 217 308 A2 | 4/1987 | |
| 5,199,062 A | 3/1993 | Von Meister et al. | EP | 0 229 170 A | 7/1987 | |
| 5,214,689 A | 5/1993 | O'Sullivan | EP | 0249575 | 12/1987 | |
| 5,222,120 A | 6/1993 | McLeod et al. | EP | 0295837 | 12/1988 | |
| 5,233,654 A | 8/1993 | Harvey et al. | EP | 0342295 | 11/1989 | |
| 5,236,199 A | 8/1993 | Thompson, Jr. | EP | 0434181 | 6/1991 | |
| 5,243,643 A | 9/1993 | Sattar et al. | EP | 0 451 693 A2 | 10/1991 | |
| 5,251,252 A | 10/1993 | Katz | EP | 0 451 695 A2 | 10/1991 | |
| 5,255,183 A | 10/1993 | Katz | EP | 0 453 831 A2 | 10/1991 | |
| 5,263,723 A | 11/1993 | Pearson et al. | EP | 0 454 363 A2 | 10/1991 | |
| 5,289,531 A | 2/1994 | Levine | EP | 0 568 114 A | 11/1993 | |
| 5,299,260 A | 3/1994 | Shaio | EP | 0 620 669 A | 10/1994 | |
| RE34,587 E | 4/1994 | Crane et al. | EP | 0 438 860 B1 | 9/1996 | |
| 5,303,298 A | 4/1994 | Morganstein | EP | 0 382 670 B1 | 4/1997 | |
| 5,303,299 A | 4/1994 | Hunt et al. | EP | 0 382 212 B1 | 7/1998 | |
| 5,327,554 A | 7/1994 | Palazzi, III et al. | EP | 0 917 335 A2 | 5/1999 | |
| 5,333,185 A | 7/1994 | Burke et al. | FR | 9002131 | 8/1990 | |
| 5,335,277 A | 8/1994 | Harvey et al. | GB | 1162484 | 4/1967 | |
| 5,351,276 A | 9/1994 | Doll, Jr. et al. | GB | 1124945 | 9/1968 | |
| 5,351,285 A | 9/1994 | Katz | GB | 1352600 | 5/1974 | |
| 5,353,335 A | 10/1994 | D'Urso et al. | GB | 1400654 | 7/1975 | |
| 5,354,069 A | 10/1994 | Guttman et al. | GB | 1442883 | 7/1976 | |
| 5,361,295 A | 11/1994 | Solomon et al. | GB | 1505718 | 3/1978 | |
| 5,365,575 A | 11/1994 | Katz ........................ 379/93.13 | GB | 1520529 | 8/1978 | |
| 5,369,685 A | 11/1994 | Kero | GB | 1544542 | 4/1979 | |
| 5,402,472 A | 3/1995 | MeLampy et al. | GB | 2046556 B | 11/1980 | |
| 5,403,999 A | 4/1995 | Entenmann et al. | GB | 2057740 | 4/1981 | |
| 5,415,416 A | 5/1995 | Scagnelli et al. | GB | 2065353 A | 6/1981 | |
| 5,416,830 A | 5/1995 | MacMillan, Jr. et al. | GB | 2118341 A | 10/1983 | |
| 5,418,844 A | 5/1995 | Morrisey et al. | GB | 2120507 | 11/1983 | |
| 5,475,205 A | 12/1995 | Behm et al. | GB | 2141309 A | 12/1984 | |
| 5,490,207 A | 2/1996 | Schorr | GB | 2184327 A | 6/1987 | |
| 5,511,112 A | 4/1996 | Szlam | GB | 2 230 403 A | 10/1990 | |
| 5,537,143 A | 7/1996 | Steingold et al. | GB | 2 252 270 B | 8/1992 | |
| 5,561,710 A | 10/1996 | Helms | GB | 2253542 | 9/1992 | |
| 5,599,046 A | 2/1997 | Behm et al. | IL | 74048 | 1/1985 | |
| 5,623,536 A | 4/1997 | Solomon et al. | IL | 76993 | 12/1995 | |
| 5,651,048 A | 7/1997 | Leeuw | JP | 52-016941 | 2/1977 | |
| 5,709,603 A | 1/1998 | Kaye | JP | 52-021738 | 2/1977 | |
| 5,768,348 A | 6/1998 | Solomon et al. | JP | 52-17740 | 9/1977 | |
| 5,787,156 A | 7/1998 | Katz | JP | 53-039808 | 4/1978 | |
| 5,790,636 A | 8/1998 | Marshall | JP | 53-115109 | 10/1978 | |
| 5,815,551 A | 9/1998 | Katz | JP | 54-061807 | 5/1979 | |
| 5,835,576 A | 11/1998 | Katz | JP | 55-010246 | 1/1980 | |
| 5,841,837 A | 11/1998 | Fuller et al. | JP | 55-107375 | 8/1980 | |
| 5,898,762 A | 4/1999 | Katz | JP | 56-004969 | 1/1981 | |
| 5,917,893 A | 6/1999 | Katz | JP | 56-020371 | 2/1981 | |
| | | | JP | 56-044958 | 4/1981 | |
| | FOREIGN PATENT DOCUMENTS | | JP | 56-098966 | 8/1981 | |
| CA | 1022674 | 12/1977 | JP | 57-045767 | 3/1982 | |
| CA | 1025118 | 1/1978 | JP | 57-073471 | 5/1982 | |
| CA | 1056500 | 6/1979 | JP | 57-125567 | 8/1982 | |
| CA | 1059621 | 7/1979 | JP | 57-125569 | 8/1982 | |
| CA | 1143494 | 1/1980 | JP | 57-125570 | 8/1982 | |
| CA | 1162336 | 2/1984 | JP | 57-127903 | 8/1982 | |
| CA | 1225759 | 8/1987 | JP | 57-162867 | 10/1982 | |
| CA | 2009937-2 | 8/1990 | JP | 58-003367 | 1/1983 | |
| DE | 2351949 A1 | 4/1975 | JP | 58-165473 | 9/1983 | |
| DE | 2903450 A1 | 8/1980 | JP | 58-221559 | 12/1983 | |
| DE | 2903479 A1 | 8/1980 | JP | 59-016068 | 1/1984 | |
| DE | OS 2929416 | 2/1981 | JP | 59-108446 | 6/1984 | |
| DE | 32 25 562 | 1/1984 | JP | 59-190771 | 10/1984 | |
| DE | 3406615 A1 | 8/1984 | JP | 59-208973 | 11/1984 | |
| DE | OS 3726366 | 2/1988 | JP | 60-010868 | 1/1985 | |
| DE | 4005365 A1 | 8/1990 | JP | 60-035868 | 2/1985 | |
| EP | 0009684 A1 | 8/1979 | JP | 60-220655 | 11/1985 | |
| EP | 0015120 A1 | 2/1980 | JP | 61-210754 | 9/1986 | |
| EP | 0041261 A1 | 6/1981 | JP | 62-038933 | 2/1987 | |

| | | |
|---|---|---|
| JP | 500138/88 | 1/1988 |
| JP | 01-098362 | 4/1989 |
| JP | 298158/90 | 12/1990 |
| JP | 41855/91 | 2/1991 |
| WO | WO 08101664 A1 | 6/1981 |
| WO | WO 82/02132 | 6/1982 |
| WO | WO 08401073 A1 | 3/1984 |
| WO | 00370/87 | 1/1987 |
| WO | WO 87/00375 | 1/1987 |
| WO | WO 08702208 A1 | 4/1987 |
| WO | WO88/02966 | 4/1988 |
| WO | WO88/05985 | 8/1988 |
| WO | WO89/02139 | 3/1989 |
| WO | WO89/09530 | 10/1989 |
| WO | WO 89/11768 | 11/1989 |
| WO | WO 90/10989 | 9/1990 |
| WO | WO 90/11661 | 10/1990 |
| WO | WO 91/15818 | 10/1991 |
| WO | WO 92/06548 | 4/1992 |
| WO | WO 92/09164 | 5/1992 |
| WO | WO 92/15166 | 9/1992 |
| WO | WO93/05483 | 3/1993 |

OTHER PUBLICATIONS

Lexis Search Results (Great American Potato–Chip giveaway/Raisin Bran Game/Giants Baseball Trivia—Dial Info): "In The Chips" AdWeek, Jul. 22, 1985.

"San–Fran–Police–League", Business Wire, Aug. 2, 1985.

"Similar Campaigns", DM News, Dec. 15, 1985.

"Phone Offers Action At Push Of Button", Advertising Age, Feb. 6, 1986.

Winckelmann, W.A., "Automatic Intercept Service", *Bell Laboratories Record*, May 1968, vol. 46, No. 5, pp. 138–143—(Article).

"Proposed Agreement Between National Enterprises Board (N.E.B) and Delphi", Jan. 30, 1979.

"Appraisal Of The Fair Market Value Of Delphi Communications", Apr. 30, 1980—(Study) Delphi Communications—(Charts and Exhibits).

"Voice–Response System Improves Order Entry, Inventory Control", *Communication News*, Aug. 1976—(Article).

"The Voice Response Peripheral That Turnes Every Touch–Tone Telephone Into A Computer Terminal", Periphonics Corporation—(Brochure) (Undated).

Rabin, Jeff, "Minorities Seek 30% Share of All Lottery Operations", *Sacramento Bee*, Apr. 12, 1985—(Article).

Advertisements (Dial Giants Baseball Trivia Game): *San Francisco Chronicle*, Jul. 3, 1984.

Curtis, Cathy, "976 numbers let you dial–a–whatever", *San Francisco Business Journal*, Nov. 26, 1984—(Article).

Ferrrell, Jane, "Three little numbers for instant information", *San Francisco Chronicle*, Aug. 15, 1984—(Article).

"Dallas Telephone Call–In Game Uses Computer Voice Interface", Sep. 24, 1984—(Press Release).

Rivest, R.L., et al., "A Method for Obtaining Digital Signatures and Public–Key Cryptosystems", *Communications of the ACM*, Feb. 1978, vol. 21, No. 2, pp. 120–126—(Article).

Finnigan, Paul F, "Audiotex: The telephone as data–access equipment", *Data Communications*, 1987, pp. 155–161 (Article).

Ozawa, Y., et al., "Voice Response System and Its Applications", *Hitachi Review*, Dec. 1979, vol. 28, No. 6, pp. 301–305—(Article).

"AT&T 2: Reaches agreement with Rockwell (ROK)", Aug. 26, 1986—(Press Release), "AT&T: Expands Computer speech system product line", Apr. 14, 1986—(Press Release).

Adams, Cynthia, "Conversing With Computers", *Computerworld on Communications*, (May 18, 1983, vol. 17, No. 20A, pp. 36–44—(Article).

Hester, S.D., et al., "The AT&T Multi–Mode Voice Systems—Full Spectrum Solutions For Speech Processing Applications", Sep. 1985, pp. 1–10—(Proceedings Of The 1985 AVIOS Conference).

Davidson, Leon, "A Pushbutton Telephone For Alphanumeric Input", *Datamation*, Apr. 1966, pp. 27–30—(Article).

Advertisement: Cuervo Gold Beach Chair, VoiceMail Int'l, '83.

"Get The Message . . . !" "New VoiceMail Features", *Voicemail International, Inc.*, Oct. 1984—(Article).

Brochures (TWA Crew Scheduling/PSA's Reservation System/Universal Studios Program/Dow Phone): "AVIAR The communication system that keeps you flying", VoiceMail Int'l,—(Brochure) (Undated).

"TWA Voicemail, Flight Attendants Users Guide" Aug. 1986,—(Brochure).

Holtzman, Henry, "Voice Mail Soars At TWA", *Modern Office Technology* (Reprint), Mar. 1986,—(Article).

"Bid Results via Voicemail—Flight Deck Crew Members", May 1, 1985 (Script).

Borden, W.S., "Flight Attendant Self Input Of Monthly Bids Via Touch Tone Telephone", *In–Flight Services Bulletin*, Sep. 15, 1985—(Memo).

"Look Ma, no operators! Automatic voice system does many airline jobs", *Air Transport World*, Oct. 1986—(Article).

"1,000,000 Shares Common Stock" *Voicemail International, Inc.*, Jan. 10, 1984—(Public Offering Summary).

Levinson, S.E., et al., "A Conversational–Mode Airline Information and Reservation System Using Speech Input and Output", *The Bell System Technical Journal*, Jan. 1980, vol. 59, No. 1, pp. 119–137.

Emerson, S.T., "Voice Response Systems—Technology to the Rescue for Business Users", *Speech Technology*, Jan./Feb. '83, pp. 99–103—(Article).

Moslow, Jim, "Emergency reporting system for small communities", *Telephony*, (Feb. 11, 1985, pp. 30–32, 34—(Article).

Rabiner, L.R., et al., "Digital Techniques for Computer Voice Response: Implementation and Applications", *Proceedings Of The IEEE*, Apr. 1976, vol. 64, No. 4, pp. 416–432—(Article).

Moosemiller, J.P., "AT&T's Conversant™ I Voice System" *Speech Technology*, Mar./Apr. 1986, pp. 88–93—(Article).

Frank, R.J., et al., "No. 4 ESS: Mass Announcement Capability", *The Bell System Technical Journal*, Jul./Aug. 1981, vol. 60, No. 6, Part 2, pp. 1049–1081—(Chapter from a Book).

"Chapter I General Description" *D.I.A.L. PRM/Release 3—Version 2* Mar. 1987 (Product Reference Manual).

"Announcing Release 3.3" *D–A–S–H–D.I.A.L. Application and Support Hints*, Jan./Feb. Mar. 1987, vol. 3, No. 1—(Brochure).

"D.I.A.L. Software Release 4", *OPCOM*, Jan. 1988, Version 1—(Product Reference Manual).

Brady, R.L., et al., "Telephone Identifier Interface", *IBM Technical Disclosure Bulletin*, Oct. 1976, Vol. 19, No. 5, pp. 1569–1571—(Article).

Corbett, A.J., "Telephone Enquiry System Using Synthetic Speech", *University of Essex*, Dec. 1974, (Thesis).

Yoshizawa, K., et al., "Voice Response System for Telephone Betting", *Hitachi Review*, Jun. 1977, vol. 26, No. 6—(Article).

Sagawa, S., et al., "Automatic Seat Reservation By Touch–Tone Telephone", *Second USA Japan Computer Conference*, 1975, vol. 2, pp. 290–294—(Article).

Smith, S.L., "Computer–Generated Speech and Man–Computer Interaction", *Human Factors*, 1970, 12(2), pp. 215–223—(Article).

Mullen, R.W., "Telephone—home's 'friendliest' Computer", *Inside Telephone Engineer And Management*, May 15, 1985, vol. 89, No. 10,—(Article).

"Telephone Computing Entering Service Bureau Business", *American Banker*, Jul. 5, 1979—(Article).

Kutler, Jeffrey, "Technology, System Sharing Improve Phone Banking Outlook", *American Banker*, Dec. 7, 1979, vol. CXLIV, No. 237—(Article).

Kutler, Jeffrey, "Phone Bill Paying Accessed by Pioneer", *American Banker*, Dec. 7, 1979, vol. CXLIV, No. 237—(Article).

"Audiotex Information From Dow Jones", *The Computer Review*, Nov. 1984, vol. 2, No. 1—(Article).

"Dow Phone Adds Innovest Systems' Technical Analysis Reports" *IDP Report*, Jan. 3, 1986—(Report).

Perdue, R.J., et al., "Conversant 1 Voice System: Architecture and Applications", *AT&T Technical Journal*, Sep./Oct. 1986—(Article).

Kaiserman, D.B., "The Role Of Audio Response In Data Collection Systems", *Proceedings of the Technical Sessions*, Palais des Expositions, Geneva, Switzerland, Jun. 17–19, 1980, pp. 247–251—(Article).

Boies, S.J., et al., "User Interface for Audio Communication System", *IBM Technical Disclosure Bulletin*, Dec. 1982, vol. 25, No. 7A, pp. 3371–3377—(Article).

Kramer, J.J., "Human Factors Problems in the Use of Pushbutton Telephones for Data Entry", *Bell Telephone Laboratories*, Holmdel, N.J., Apr. 1974, pp. 241–258—(Paper).

Cox, Jr., "Flora Fax", Jan. 22, 1986—(Letter and Advertisements).

Isayama, Tetsuya, "Automatic Response Processing Equipment as a Multi–media Communication Node", *Japan Telecommunications Review*, 1987, vol. 29, No. 1, pp. 29–36—(Article).

Imai, Y., et al., "Shared Audio Information System Using New Audio Response Unit" *Japan Telecommunications Review*, Oct. 1981, vol. 23, No. 4, pp. 383–390—(Article).

"Automatic Call Distributor/Management Information System: Interface between 1/1AESS™ Switch Central Office and Customer Premises Equipment", *Bell Communications Research*, Dec. 1986, Technical Reference TR–TSY–000306, Issue 1—(Article).

"Comparison Of ACD Systems", *Connection*, Feb. 1990—(Chart).

"ACD Comparison", *Aspect*, Feb. 2, 1990—(Final Report).

Lanzeter, Ygal, "Automatic Number Identification System For Step–By–Step Exchanges", *The Ninth Convention of Electrical and Electronics Engineers In Israel*, Apr. 1975—(Paper).

"Bell Atlantic's Bolger Wants To Be Free", *Telephony*, Jul. 14, 1986—(Article).

"Advanced New Cable TV Technology Developed For Impulse–Pay–Per–View", Jun. 3, 1985—(Search).

Meade, Jim, Dec. 29, 1992—(Letter).

"All About Voice Response", *Datapro Research Corporation*, Delran, N.J., Mar. 1972 and Sep. 1974—(Article).

"Voice Response in Banking Applications", *Datapro Research Corporation*, Delran, N.J., Oct. 1974 and Feb. 1983—(Article).

Schiller, T.R., "Field Craft Technician Communication With A Host Computer Synthesized Voice", *Proceedings AVIOS '86 Voice I/O Systems Applications Conference*, Sep. 16–18, 1986, Rabin, Richard, "Telephone Access Applications: The Growth Market For Voice Processing", *Proceedings AVIOS '86 Voice I/O Systems Applications Conference*, Oct. 6–8, 1987, Schuster, E.R., "B.R.U.T.U.S. Better Registration Using Touch–Tone phones for University Students", *Proceedings AVIOS '86 Voice I/O Systems Applications Conference*, Oct. 4–6, 1988.

"Exxon's Next Prey. IBM and XEROX", *BusinessWeek*, Apr. 28, 1980, pp. 92–96 and 103—(Article).

Weinstein, S.B., "Emerging Telecommunications Needs of the Card Industry", *IEEE Communications Magazine*, Jul. 1984, vol. 22, No. 7, pp. 26–31—(Article).

"Riding Gain", *Broadcasting*, Mar. 7, 1983—(Article).

Pickup, Mike, "Bank from home, by screen or by phone", *Building Society Gazette*, Jul. 1988—(Article).

Pickup, Mike, "Voice Response", *Computer Systems*, Sep. 1986—(Article).

Rabiner, L.R., et al., "Isolated and Connected Word Recognition—Theory and Selected Applications", *IEEE Transaction Communications*, May 1981, Com. 29, No. 5, pp. 621, 622, 633, 644–646, 655–659—(Article).

Pagones, M.J., et al., "New services follow increased digitization on the long–haul transmission network", *AT&T Bell Laboratories Record*, 1983, vol. 61, pp. 25–33—(Article).

"New phone service tells customer who's calling", *Bell Laboratories Record*, 1984, vol. 62, p. 9—(Article).

Hirschman, C.B., et al., "LASS: Putting the telephone customer in charge", *Bell Laboratories Record*, 1985, vol. 63, pp. 10–16—(Article).

"AT&T building communications network for Defense Department" and "AT&T inaugurates pay–per–view TV", *Bell Laboratories Record*, 1986, vol. 64, p. 2—(Article).

"Representative Customer List For Interface Technology's Total Entry System", "Toes Solutions—Pharmaceutical Manufacturer", "The Voice Response Solution For Answering Customer/Sales Calls", "Toes Solutions—Orthopedic Equipment" and "Toes Solutions—Convenience Store"—(Articles).

Flanagan, J.L., et al., "Synthetic voices for computers", *IEEE Spectrum*, Oct. 1970, vol. 7, No. 10, pp. 22–45—(Article).

Rabiner, L.R., et al., "Computer Synthesis of Speech by Concatenation of Formant–Coded Words", *The Bell System Technical Journal*, May/Jun. 1971, pp. 1541–1558—(Chapter from a Book).

Flanagan, J.L., et al., "Wiring Telephone Apparatus from Computer–Generated Speech", *The Bell System Technical Journal*, Feb. 1972, pp. 391–397—(Chapter from a Book).

Hornsby, Jr., Thomas G., "Voice Response Systems", *Modern Data*, Nov. 1972, pp. 46–50—(Article).

Diffie, W., et al., "New Directions in Cryptography", *IEEE Transactions On Information Theory*, Nov. 1976, vol. IT–22, No. 6, pp. 644–654—(Article).

Rosenthal, L.H., et al., "Automatic voice response: interfacing man with machine", *IEEE Spectrum*, Jul. 1974, vol. 11, No. 7—(Article).
Rosenthal, L.H., et al., "A Multiline Computer Voice Response System Utilizing ADPCM Coded Speech", *IEEE Transactions on Acoustics, Speech, and Signal Processing*, Oct. 1974, vol. ASSP–22, No. 5, pp. 339–352—(Article).
Flanagan, James L., "Computers that Talk and Listen: Man–Machine Communication by Voice", *Proceedings for the IEEE*, Apr. 1976, vol. 64, No. 4, pp. 405–415—(Article).
Maisel, Ivan, "To Put Your Baseball Savvy On The Line, Pick Up The Phone And Call", *Sports Illustrated*, Sep. 3, 1984—(Script), Brown, Merrill, "Hollywood Saga: Who Bought J.R.?", *The Washington Post*, Final Edition, Oct. 14, 1984—(Script), "Special–Olympics; Teams with baseball trivia expert Brad Curtis", *Business Wire*, Sep. 30, 1985—(Script).
Lucas, W.A., et al., "The Spartanburg Interactive Cable Experiments In Home Education", *Rand Corp.*, U.S. Department of Commerce, National Technical Information Service, Feb. 1979—(Publication).
Gawrys, G.W., "Ushering In The Era Of ISDN", *AT&T Technology*, 1986, vol. 1, No. 1, pp. 2–9—(Article).
Cummings, J.L., et al., "AT&T Network Architecture Evolution", *AT&T Technical Journal*, May/Jun. 1987, vol. 66, Issue 3, pp. 2–12—(Article).
Yates, C.E., "Telemarketing And Technology: Perfect Business Partners", *AT&T Technology*, 1987, vol. 1, No. 3, pp. 48–55—(Article).
Herr, T.J., "ISDN Applications In Public Switched Networks", *AT&T Technology*, 1987, vol. 2, No. 3, pp. 56–65—(Article).
Aldefeld, B., et al., "Automated Directory Listing Retrieval System Based on Isolated Word Recognition", *Proceedings of the IEEE*, Nov. 1980, vol. 68, No. 11, pp. 1364–1379—(Article).
Rabiner, L.R., et al., "On the Application of Embedded Training to Connected Letter Recognition for Directory Listing Retrieval", *AT&T Bell Laboratories Technical Journal*, Mar. 1984, vol. 63, No. 3, pp. 459–477—(Chapter from a Book).
Rosenberg, A.E., et al., "Recognition of Spoken Spelled Names for Directory Assistance Using Speaker–Independent Templates", *The Bell System Technical Journal*, Apr. 1980, vol. 59, No. 4, pp. 571–592—(Chapter from a Book).
"The Voicestar Series By Periphonics", *Periphonics*, Jan. 1986—(Publication).
Schulman, Roger, "TeleLearning: The Computer Brings the Classroom Home", *Family Computing*, Sep. 1984, pp. 50–53—(Article).
"ICS launches new ?–home interactive video service package", *Cable Vision*, Sep. 3, 1984, pp. 71/73—(Article).
"The Remarketing of Prestel", *Which Computer?*, Aug. 1984, pp. 106, 107 and ?—(Article).
"Four–Line TeleClerk Calls, Answers, Stores, Surveys", *Hardcopy*, Jan. 1985, vol. 14, No. 1—(Article).
"Peripheral Speaks On Phone", *Hardcopy*, Dec. 1984—(Article).
Page from *What's new in Computing*, Apr. 1985—(Article).
Page from *Today*, A Compuserve Publication, Jun. 1985—(Article).
Page from *Computer Communications*, Feb. 1984, vol. 7, No. 1—(Article).

Gits, Victoria, "Interactive device doesn't interrupt telephone calls", *Cable Vision*, Jun. 17, 1985, p. 20—(Article).
Cuilwik, Tony, "Reach Out & Touch The Unix System", *Unix Review*, Jun. 1985, pp. 50, 52, 53, 56—(Article).
Applebaum, Simon, "Two–way television" *Cable Vision*, Aug. 8, 1983, p. 66—(Article).
Morrill, C.S., et al., "User Input Mode and Computer–Aided Instruction", *Human Factors*, 1968, 10(3), pp. 225–232—(Chapter from a Book).
Results of Lexis Search Request for "Dial Info or Dialinfo", Date of Search Apr. 13, 1992, pp. 1–38.
Results of Lexis Search Request for "Phone Programs or International Information Network", Date of Search Apr. 15, 1992, pp. 1–35.
Van Gieson, Jr. W.D., et al., "Machine–Generated Speech For Use With Computers, and the problem of fitting a spoken word into one half second", *Computers and Automation*, Nov. 1968, pp. 31–34—(Article).
Patel, Jay, "Utility of voice response system depends on its flexibility", *Bank Systems & Equipment*, Dec. 1988, pp. 101/103—(Article).
Buron, R.H., "Generation of a 1000–Word Vocabulary for a Pulse–Excited Vocoder Operating as an Audio Response Unit", *IEEE Transactions On Audio And Electroacoustics*, Mar. 1986, vol. AU–16, No. 1, pp. 21–25—(Article).
Gaines, B.R., et al., "Some Experience in Interactive System Development and Application", *Proceedings of the IEEE*, Jun. 1975, vol. 63, No. 6, pp. 894–911—(Article).
Dudley, Horner, "The Vocoder", Circuit Research Department, Dec. 1939, pp. 122–128—(Chapter from a Book).
"Vendor Index", *Audiotex Directory & Buyer's Guide*, Fall/Winter 1989/90, pp. 114–156.
Francas, M., et al., "Input Devices For Public Videotex Services", *Human–Computer Interaction—Interact '84*, 1985, pp. 171–175—(Paper).
Labrador, C., et al., "Experiments In Speech Interaction With Conventional Data Services", *Human–Computer Interaction—Iinteract '84*, 1985, pp. 225–229—(Paper).
Long, J., et al., "Transaction Processing Using Videotex or Shopping on Preste!", *Human–Computer Interaction—Interact '84*, 1985, pp. 251–255—(Paper).
*Electrical Communication*, 1981, vol. 56, Nos. 1–4, pp. 1–110—(Paper).
Conway, R.W., et al., "Tele–CUPL: A Telephone Time Sharing System", *Communication of the ACM*, Sep. 1967, vol. 10, No. 9, pp. 538–542—(Article).
Marill, T., et al., "Data–Dial: Two–Way Communication with Computers From Ordinary Dial Telephones", *Communications of the ACM*, Oct. 1963, vol. 6, No. 10, pp. 622–624—(Article).
"Call–It–Co. Hangs Up On Dial–It In Four Markets", *The 976 Exchange*, 1984, vol. 2, pp. 1–6 (Article).
"VTK 81 Voice Computer", *Voicetek*, 1987 (Brochure).
"How a Computerized "Voice" Answers Customers' Inquiries", *Bank Automation Newsletter*, Feb. 1985, vol. 19, No. 2 (Article).
Rickman, J., et al., "Speech Synthesizers—Communications Interface—Implementing A Touch Tone Telephone Talker With DECtalk", *The DEC Professional*, May 1985, pp. 38, 39, 42–44 (Article).
"DECtalk Delivers", *Digital Review*, Sep. 1985—(Article), "Product safety", DECWorld, Apr. 1985, vol. 9, No. 2, pp. 1, 3, 5, 6–8—(Article).

"DECtalk: A New Text–to–Speech Product" *Digital Guideline*, Mar. 1984, vol. 8, No. 3, pp. 1–8—(Article).
News briefs, Feb. 1966.
Martin, J., et al., "The Computerized Society—An apprisal of the impact of computers on society over the next fifteen years", Chapter 10, pp. 211–226—(Chapter from a Book).
New products, *Datamation*, Jul. 1966, vol. 12, No. 7, pp. 7/89—(Article).
Meacham, L.A., et al., "Tone Ringing and Pushbutton Calling", *The Bell System Technical Journal*, 1958, pp. 339–360—(Book).
Suppes, Patrick, "The Uses of Computers in Education", *Scientific American*, Sep. 1966, vol. 215, No. 3, pp.—(Article).
Bruckert, E., et al., "Three–tiered software and VLSI aid developmental system to read text aloud", *Electronics*, Apr. 21, 1983, pp. 133–138—(Article).
Hochman, David, "Implementing Automatic Number Identification", *Telecommunications*, Dec. 1978, vol. 12, No. 12—(Article).
Takahashi, T., et al., "SR–2000 Voice Processor and Its Application", *NEC Research and Development*, 1984, No. 73, pp. 98–105—(Paper).
"Concept Diagram Voicemail International System", "Voicemail Instruction Manual", *Televoice Itnernational*, Jun. 1981, Index.
Eckhouse, John, "Voice mail spells relief for phone frustration", *San Francisco Examiner*, Feb. 7, 1982—(Article).
Meade, Jim, "Throw away those pink Call–back slips", *InterOffice*, Jan./Feb. 1984, vol. 3, No. 1—(Article).
Welsh, Jack, "Everybody's Talking About Talking Bouquets", *Design for Profit*, Spring 1986, pp. 7–10—(Article).
Robinson, G., et al., "Touch–Tone Teletext A Combined Teletext–Viewdata System", *IEEE Transactions on Consumer Electronics*, Jul. 1979, vol. CE–25, No. 3, pp. 298–303—(Article).
Voice News, Mar. 1982, Voice News, Jun. 1982, *William W. Creitz*, Voice News, Oct. 1982, p. 5, Voice News, Nov./Dec. 1983.
"Consultant Report 28?", *AIS American Bell Advanced Information Systems*, Apr. 1983, pp. 27, 118–119, 123–124—(Report).
"Machine Operation Manual", May 12, 1978, Issue 1, pp. 1–3, 9–10—(Manual).
Gutcho, Lynette, "DECtalk—A Year Later", *Speech Technology*, Aug./Sep. 1985, pp. 98–102—(Article).
Daniels, Richard, "Automating Customer Service", *Insurance Software Review*, Aug./Sep. 1989, pp. 60–62—(Article).
Golbey, S.B., "Fingertip Flight Service", Oct. 1985—(Article).
"ARO Goes Pushbutton", *Newsletter*, Nov. 1985, p. 9—(Article).
"ROLM Centralized Attendant Service", *ROLM Corporation*, 1979.
"AIS, Versatile Efficient Information Service", *Fujitsu Limited*, 1972, pp. 153–162—(Brochure).
Smith, S.L., et al., "Alphabetic Data Entry Via the Touch–Tone Pad: A Comment", *Human Factors*, 1971, 13(2), pp. 189–190—(Book).
Holtzman, Henry, "Still an Infant Technology Voice Mail", *Modern Office Technology*, Jun. 1985, pp. 78–80, 82, 84, 90—(Article).

Leander, Monica, "Voice Response—A Technology for Solving Management Problems", *Speech Technology*, Mar./Apr. 1986, pp. 50–52—(Article).
Stolker, Bud, "CompuCorder speech storage and output device. (evaluation)", *Creative Computing*, Jul. 1983, pp. 1–7.
Witten, I.H., et al., "The Telephone Enquiry Service: a man–machine system using synthetic speech", *Int. J. Man–Machine Studies*, Jul. 1977, 9, pp. 449–454—(Book).
Gould, R.L., "Fidelity's Automated Voice Response System", *Telecommunications*, Jan. 1981, pp. 27–28—(Article), "Fidelity Automated Service Telephone", *Fidelity Group*, 4 pages—(Manual).
"Data Set 407 Interface Specification", *Manager—Data Systems & Operations*, Jun. 1975, Issue 2, pp. 1–69 plus Table of Contents—(Manual).
Fitzwilliam, J.W., et al., "Transaction Network, Telephones, and Terminals", *The Bell System Technical Journal*, Dec. 1978, vol. 57, No. 10, pp. 3325–3537—(Book).
*Inbound Outbound*, May 1988, complete issue.
General Description Installation and Operation Manual for Direct Inward Dial (DID) Trunk Interface Unit, *Exacom Telecommunication Systems*, Nov. 21, 1989, Issue 3—(Manual), General Description Installation and Operation Manual for Answering Service Monitor System, *Concord Design Services, Inc.*, Dec. 19, 1986, Issue 1—Manual.
"Voice '92 Spring Conference & Exposition", 1992, pp. 1–24—(Brochure).
"Telecom Developers '92", Jan. 1992—(Advertisement).
Newton, Henry, "The Sheer Thrill Of It All", *Teleconnect*, May 1991.
"AFIPS Conference Proceedings", 1987 National Computer Conference, Jun. 15–18, 1987, Chicago, Illinois "Dynamic Network Allocation".
"Calling your computer is as easy as calling your broker, says AT&T", *Record*, Nov. 1985.
Singleton, L.A., "Telecommunications in the Information Age", Chapter 12, pp. 115–125—(Chapter from a Book).
Sullivan, Kathleen, "Paper firm relies on voice–based inventory system", *IDG Communications, Inc.*, Sep. 10, 1984—(Script).
"VoiceStor Systems Integration Guide", *Voicetek Corporation*, May 2, 1983—(Manual).
"VTK 60 Voice Computer—Technical Description", *Voicetek Corporation*, Oct. 1986—(Manual).
"Voicetek VS–50 Telephone Interface System", Apr. 25, 1984, System Integration Guide—(Manual).
"VTK81 Voice Computer—Technical Description", *Voicetek Corporation*, Oct. 1986—(Manual).
"VTK Voice System—VTK/CE Guide", *Voicetek*, Jul. 6, 1987—(Manual).
Newton, Harry, "Newton's Telecom dictionary", *Telecom Library Inc.*, 1991—(Advertisement).
"1987 Buyers Guide", *Teleconnect*, Jul. 1987, pp. 194, 197–210—(Brochure).
Guncheon, M.C., "The Incredible Dial–A–Message Directory", *Contemporary Books, Inc.*, 1985—(Directory).
"Voice Box Maintenance Manual", *Periphonics*, 1986—(Manual).
"Voicepac Maintenance Manual", *Periphonics*, 1984—(Manual).
Dyer, Ellen, "Wichita Firm Sells 25% Share", Dec. 14, 1987, and "Spectrum Carving Role In Volatile Business", Jul. 7, 1986, Search Results.

"Don't Miss The Unique Gift Idea Of The Year", *Yam Educational Software*, 1987—(Advertisement).

"Welcome to the future of advertising.", *Teleline, Inc.,* 1990—(Presentation).

"Greeting Card Project", *Teleline, Inc.,* Nov. 7, 1988—(Flow Chart).

Sharkey, Betsy, "Dialing for Dollars and Data", *Adweek,* Nov. 16, 1987, pp. 6–8—(Article).

Gay, Verne, "CBS may tie rates to buying p?", 1988—(Article).

Flanagan, J.L., et al., "Synthetic Voices For Computers", *IEEE International Conference on Communications,* 1970, pp. 45–9–45–10—(Conference Record).

Rabiner, L.R., et al., "Computer Voice Response Using Low Bit Rate Synthetic Speech", *Digest IEEE 71 International Convention,* Mar. 22–25, 1971, p. 1–2, Fig. 1–2—(Paper).

"DT1000 Digitalker Speech Synthesis Evaluation Board", *National Semiconductor Corp.,* Oct. 1980—(Manual).

"Data Set 407C Interface Specifications Nov. 1977", *Bell System Technical Reference,* Nov. 1977, pp. 1–50—(Paper).

Broomfield, R.A., et al., "Making a data terminal out of the Touch–Tone telephone", *Electronics,* Jul. 3, 1980, pp. 124–129—(Paper).

"Industry Marketing Bulletin," *Honeywell EDP Wellesley Hills,* Aug. 9, 1967.

"Burroughs Audio Response System", Reference Information for Sales Representatives, pp. 1–6, "New Product Announcement", *Burroughs Corporation,* Feb. 5, 1968.

"Stand–Alone Lockbox Application Voice Response (Slave) Communication System Functional Specification", *Cognitronics Corporation,* Feb. 19, 1982, p. 21.

Slutsker, Gary, "Relationship marketing", *Forbes,* Apr. 3, 1989—(Article).

Finnigan, P.F., "To Our Shareholders", Jun. 1985, Apr. 7, 1986, Apr. 10, 1987—(Letters), "International Programs" (Voicemail).

Finnigan, P.F., "Our guest", *Radio–Schweiz AG Telekommunikation und Flugsicherung,* Jan. 1983, pp. 12–14—(Bulletin).

Finnigan, P.F., "Voice mail", *1983 National Computer Conference,* May 16–19, 1983, Anaheim, CA, pp. 375–377 and Abstract.

"Conversations in Your Mailbox", *Software News,* Jan. 1985—(Article).

Fredric, Paul, "Voicemail Int'l, Radio Page America To Offer A 'Pocket News Network'", *Communications Week,* Jul. 8, 1985—(Article).

"Corporate Performance—Companies To Watch", *Fortune,* Sep. 30, 1985—(Article).

"Dream Weaver", *Jon Lindy,* Aug. 1986, pp. 32–35, 37—(Article).

"Newsline", *Voicemail International, Inc.,* Oct. 1984 and Nov. 1984, "Voiceletter No. 1", *Voicemail International, Inc.,* Dec. 1985.

"Voicemail Instruction Manual B –85", *Televoice International,* Nov. 1980—(Manual).

"Welcome To Dowphone", *Dowphone,* Jan. 1986—(Manual).

"Telephone 1–800 Check–PDR", *Officers of Medical Economics Company, Inc.,* 1986—(Circulation/Brochure).

"Turn your telephone into an efficient electronic "mailbox"", *Western Union,* Jan. 1984—(Brochure), "Western Union Voice Message Service User's Guide", *Western Union,* Jul. 1984,—(Brochure).

"PSA's 24 hour reservation system", *PSA,* Sep. 1986—(Brochure).

"Voice Response: Breaks Trough Call Blockage.", *Business Week,* Aug. 26, 1985—(Advertisement for Preception Technology Corporation).

"Tools for heavy hitters", *Forbes,* May 6, 1985.

"All You Need To Get The Stock Quotes And News You Want." *Dowphone,* 1984—(Advertisement).

Borison, V.S., "Transaction—telephone gets the fact at the point of sale", *Bell Laboratories Record,* Oct. 1975, pp. 377–383—(Article).

Demeautis, M., et al., "The TV 200 A Transactional Telephone", *Commutation & Transmission n 5,* 1985, pp. 71–82—(Article).

Eriksson, G., et al., "Voice and Data Workstations and Services in the ISDN", *Ericsson Review,* May 1984, pp. 14–19—(Article).

Schrage, Michael, "A Game Von Meister in Pursuit of Profits", *Washington Post,* Sep. 23, 1985—(Article).

Svigals, J., "Low Cost Point–Of–Sale Terminal", *IBM Technical Disclosure Bulletin,* Sep. 1982, vol. 25, No. 4, p. 1835.

Turbat, A., "Telepayment And Electronic Money The Smart Card", *Commutation & Transmission n 5,* 1982, pp. 11–20—(Article).

"Voice Mail", *Sound & Communications,* Apr. 1983, vol. 28, No. 12, pp. 84–85—(Article).

Aso, Satoshi, "Trends and Applications of Voice Output Devices", *2209 J.E.E. Journal of Electronic Engineering,* Feb. 1982, vol. 19, No. 182, pp. 102–107—(Article).

C.R. Newson, "Merlin Voice Mail VM600," British Telecommunications Engineering, vol. 4, Apr. 1985, pp. 32–35.

A.S. Yatagai, "Telephonic Voice Synthesis Systems," Telecommunications, Aug. 1985, pp. 55h–I, 68.

A.J. Waite, "Getting Personal With New Technologies For Telemarketers," DM News, Feb. 15, 1987 at 50.

"Shopping via a network is no longer just talk," Data Communications, Aug. 1981 at 43.

"Growth–Oriented Systems," Restaurant Technology, Nation's Restaurant News Newspaper, Jul. 1, 1985 at 51.

"Let your fingers do the tapping . . . and the computer the talking," Modem Office Tech., May 1984 at 80.

"American Software unveils systems for IBM mainframes," Computerworld, Mar. 26, 1984 at 59.

"Business Units Get Order Entry," Computerworld, Jul. 12, 1982 at 36.

Svigals, J., "Security Method For Remote Telephone Banking," IBM Technical Disclosure Bulletin, vol. 23, No. 12, May 1981, pp. 5306–5307 (pb424).

AT&T Conversant Voice Response Systems Historical Overview, Jan. 1988 (FD 023585–FD023596).

"All About Automated Attendant Systems," Datapro Research Corporation, Mar. 1987 (SM 1000682–SM 1000691).

"New Product—Dytel's Automated Switchboard Attendant," reprinted from Business Communications Review, Mar.–Apr. 1984, pp. 39–41 (SM10006976–SM1000699).

Arbogast, James G. et al., "Home Diabetes Monitoring Through Touch–Tone Computer Data Entry and Voice Synthesizer Response," Annual Symposium on Computer Applications in Medical Care 8th Care Proceedings—Eigthh Annual Symposium on Computer Applications in Medical Care, 1984 (MMI 020731).

Perdue, Robert J., et al., "AT&T Voice Processing System Architectures," AT&T Technical Journal, Sep./Oct. 1990, pp. 52–60 (MMI 024142–MMI 024151).

Sable, E.G., et al., "AT&T Network Services Architecture Capabilities, Administration and Performance," AT&T Technical Papers, International Switching Symposium–ISS '87, AT&T Network Systems, Mar. 15, 1987.

"The Stored Program Controlled Network" The Bell System Technical Journal, Sep. 1982.

The World's Telephones, a Statistical Compilation as of Jan. 1980, AT&T Long Lines, 1981 (Book).

Engineering and Operations in the Bell System, AT&T Bell Laboratories, 1983 (Book).

Joel, A.E., "A History of Engineering and Science in the Bell System, Switching Technology (1925–1975)," Bell Telephone Laboratories, 1982 (Book).

"ISDN—Proceedings of the conference held in San Francisco, Nov. 1986," OnLine, New York: London.

Raack, G.A., et al., "Customer Control of Network Services," IEEE Communications Magazine, Oct. 1984 (A21717089) also ISS 84, Florence Italy, May 1984.

Soderberg, J.H., "Machines at your Fingertips," Bell Laboratories Record, Jul. 1969 (A21717175).

Gawrys, G.W. et al., "A New Protocol for Call Handling Functions for the SPC Network," Globecrom '82 Conference Record, Nov./Dec. 1982.

Buss, C.M., "Tuning the Human/Machine Interface for AT&T Advanced 800 Service," IEEE, Jul. 1985.

Asmuth, R.L., et al., "Transaction Capabilities for Network Services," Globecom '85 IEEE Global Telecommunications Conference, New Orleans, Dec. 1985.

Mahood, Gerald K., "Human Factors in Touch–Tone Data Systems," Bell Laboratories Record, Dec. 1971 (A21717170).

"4 ESS System Evolution," Bell System Technical Journal, Aug. 1981.

Basinger, R. G., et al., "Calling Card Service—Overall Description and Operational Characteristics", The Bell System Technical Journal, Sep. 1982.

Confalone, D. E., et al., "Calling Card Service—TSPS Hardware, Software, and Signaling Implementation", The Bell System Technical Journal, Sep. 1982.

Eigen, D.J., et al., "Calling Card Service—Human Factors Studies", The Bell Technical Journal, Sep. 1982.

Lexis Search, Nov. 1, 1984, re: System 85 Computer Process.

Lexis Search, Jan. 28, 1985, re: Rolm Releases Four–Channel Phonemail Voice Message Unit.

A page (p. 4) from an annual report dated Mar. 1, 1989, though the actual date on which the report was distributed to the public is unknown.

An early brochure based on a Mar. 1989, survey by Charles Schwab & Co., Inc.

A trademark scan (U.S. Federal) indicating a first date of use for Telebroker in Jun. 18, 1988.

Bulfer, Andrew F., "AT&T's Pay–Per–View Television Trial", published in AT&T Technical Journal, May/Jun. 1987.

Friedes, A., et al., "ISDN opportunities for large business—800 service customers," IEEE International Conference on Communications '86, Jun. 22–25, 1986, vol. 1, pp. 28–32.

Allyn, Mark R. et al., "Planning for people: Human factors in the design of a new service," Bell Laboratories Record, May 1980, pp. 155–161.

Hanson, Bruce L., et al., "No. 1A VSS New custom calling services," Bell Laboratories Record, Jun. 1980, pp. 174–180.

Aarons, D., "The Voice of the 80's," PC Magazine, vol. 4, No. 5, Mar. 5, 1985, p. 114 (A21707135).

"ACD 'Magic' from AT&T's Merlin," Telecommunications Product Review, vol. 13, No. 4, Apr. 1986 (A21708371).

"Actor Promotes Phone Services," Hammond Louisiana Star, Aug. 23, 1984 (A21708860).

Allerbeck, M., "Experience with the Voice Mail System EMS 2000 Info—Results of an Acceptance Study," ISS '84 Florence, May 1984, Session 14 A, Paper 6, p. 1.

Allyn, Mark R., et al., "Human Factors in the Design of a New Service," Bell Laboratories Record, vol. 58, No. 8, May 1980 (A21709530).

Amano, Fumio, et al., "Imagephone!!: Integrated Voice/Data Terminal With Hand–Drawing Man–Machine Interface," IEEE, 1985 (A03701430).

Ambrosio, Johanna, "Electronic and Voice Mail; They're No Match for Each Other–Yet," Computerworld, May 19, 1986, p. 53 (A21708461).

"American–Network: Files Complaint Against Pacific Northwest Bell," Business Wire, Jun. 4, 1986 (A21708495).

"American–Network: Signs Letter of Intent to Merge L D Communications Long Distance Service into the Company," Business Wire, Aug. 14, 1984 (A21708856).

Andrews, Edmund L., "Patents: Computer System Lets TV Audience Join Show," The New York Times, Dec. 24, 1988 (A01331146).

Arnst, Catherine, Press Release, Reuters, Sep. 16, 1984 (A21708908).

"AT&T Announces Major Additions to Telemarketing Products and Services," Telephone News, Dec. 14, 1987 (A21723927).

"AT&T; AT&T Announces New Software Enhancements," Business Wire, Feb. 10, 1987 (A21707782).

"AT&T Announces New Software Enhancements for its PBX," PR Newswire, Feb. 10, 1987 (A21707779).

"AT&T Computer System will be Produced Here," The Columbus Dispatch, Sep. 9, 1985 (A01354694).

"AT&T Inaugurates Pay–Per–View TV," Bell Laboratories Record, Jan. 1986 (A21708191) repeated (A21716664).

"AT&T's Digital Merlin," Telecommunications Product Review, vol. 13, No. 7, Jul. 1987 (A21724743).

"AT&T's Flagship System 75: A Comprehensive Analysis of the System 85's 'Little Cousin,'" Telecommunications Product Review, vol. 11, No. 7, Jul. 1984 (A21724612).

"AT&T Forms Unit to Sell Synthetic Speech Systems," Wall Street Journal, Sep. 10, 1985 (A01354689).

"AT&T Plans Computer Unit," The New York Times, Sep. 10, 1985 (A01354690).

"AT&T; Showtime's Viewer's Choice, Viacom Cable and AT&T to Test Pay–Per–View Ordering System," Business Wire, Dec. 5, 1985 (A21708103).

"AT&T Sports Service," PR Newswire, Sep. 24, 1980 (A21710432).

"The AT&T System 25," Telecommunications Product Review, vol. 13, No. 8, Aug. 1986 (A21706368).

Press Release, PR Newswire, Nov. 1, 1984 (A21708963).

AT&T Technical Journal—The 5ESS Switching System, vol. 64, No. 6, Part 2, Jul.–Aug. 1985 (A21723626).

Excerpt from AT&T Technical Journal, Sep.–Oct. 1990, pp. 53–60 (A21723942).

"Automated Switchboard Attendant Helps Insurance Company Control Net Expenses," Communications News, Jul. 1985 (A21726011).

Aversano, Nina, "The Telephone as Computer," Review of Business, Fall 1989, p. 5 (A21723928).

Ayres, Paul, "Voice Response Pay–By–Phone Matures," Computerworld, Nov. 9, 1979, p. 47 (A21725960).

Baker, Janet M., "Voice–Store–And–Forward: The Voice Message Medium," Speech Technology, Aug.–Sep. 1984 (A21724633).

Bakke, Bruce B., "Electronic Voice Mailbox: Potential for Fast Growth," BC Cycle, Jun. 29, 1984 (A21708785).

Bakke, Bruce B., "GTE's 'Voice Mailboxes' Page the World," U.P.I., Apr. 11, 1983 (A21713359).

Barbetta, Frank, "AT&T Offers Digital PBX Enhancements," Electronic News, vol. 30, Nov. 5, 1984, p. 69 (A21708967).

Barkauskas, B. J., et al., "Network Services Complex: A Generalized Customer Interface to the Telephone Network," IEEE International Conference on Communications, Conference Record, vol. 2, Jun. 1983, p. 805 (A21725715).

Barlin, David, "Switch–Hitter: A Data Man's Guide to the World of Voice," Data Communications, Oct. 1984, p. 114 (A21708926).

Basso, Richard J., et al., "Expanding the Capabilities of the ? Traffic Service Position System," Bell Laboratories Record, Feb. 1983, pp. 22–27 (A21724556).

Belcher, Jerry, "Earthquakes in Mexico; U. S. Relief Includes Hardware, Experts; Cash Aid Suggested," Los Angeles Times, Sep. 22, 1985 (A21708026).

Bell Laboratories Record, Aug. 1984, Cover Page and Table of Contents (A21708811).

The Bell System Technical Journal, May–Jun. 1982 (A21709814).

Excerpt from The Bell System Technical Journal, Oct. 1980, pp. 1384–1395.

Bertoglio, O., et al., "An Interactive Procedure for Voice Messaging Services in a Traditional Network," CSELT Technical Reports, vol. 12, Supplement 10, No. 3, Jun. 1984 (A21708755).

Bingham, Sanford, "Groceries By Phone," Inbound/Outbound, Aug. 1988 (A21725728).

"Some Tips on Integration," Inbound/Outbound, Aug. 1988 (A21725731).

Black, Philip, "How ISDN Services Could Make or Break the Big Network," Data Communications, Jun. 1984, p. 247 (A21708771).

"'Blast' from Data Systems Runs Under DG's AOS/VS," Computerworld, May 3, 1982, p. 38 (A21724423).

Booker, Ellis, "How to Save Big Bucks on Phone Calls," Computer Decisions, vol. 16, Nov. 15, 1984, p. 16 (A21708983).

Borchering, J. W., et al., "Customized Switching Systems," ISS '84 Florence, May 1984, Session 14 A, Paper 4, pp. 1–5 (A21725533).

Bowling, Tom, "Pay TV: A Pay–Per–Minute System Prototype," Television: Journal of the Royal Television Society, Mar.–Apr. 1984, pp. 79–83 (A21724588).

Brooke, Jill, "A Hi–Tech Interactive TV Service is Planned," New York Post, Jan. 20, 1989 (A01331148).

Brown, Jim, "Contracts; Rolm Wins College Bid," Network World, Mar. 9, 1987, p. 4 (A21707859).

Brown, Jim, et al., "ICA Preview, AT&T May Steal Show," Network World, May 26, 1986, p. 1 (A21708473).

Brown, Jim, "PBX Market; Rolm Beefs up CBX Line Capacity," Network World, Feb. 9, 1987, p. 4 (A21707777).

Brown, Jim, "VMX 5000 Series; Voice Messager Debuts," Network World, Oct. 13, 1986, p. 6 (A21706653).

Brown, Jim, "Voice Mail; Rolm to Accounce New Low–Cost Phonemail," Network World, Feb. 2, 1987 (A21707763).

Buckhout, Wayne, "Columbus–Born AT&T Computer Listens, Talks and Shows Promise," Article Source Unknown, Sep. 10, 1985 (A01354692).

Bulfer, Andrew F., et al., "A Trial of a National Pay–Per–View Ordering and Billing System," NCTA, 1986 (A21724669).

Burstyn, H. Paris, "Phone Features: The Next Wave," High Technology, Jun. 1986 (A21726009).

Capital Cities/ABC Video Enterprises, Inc. Teams with FDR Interactive Technologies to Explore Applications for New Telephone Technology, Capital Cities/ABC, Inc. Broadcast Group, Jan. 19, 1989 (A01331147).

Carlson, Rolf, et al., "Text–To–Speech conversion in Telecommunications," Proceedings of the Tenth International Symposium on Human Factors in Telecommunications, Jun. 1983, pp. 239–245 (A21725801).

Press Release, PR Newswire, Dec. 5, 1985 (A21708106).

Charlish, Geoffrey, "Telephone Message that Failed to Get Across to the U. K.," Financial Times, Jan. 16, 1986 (A21708203).

Collins, Francis R., "Reality of Equal Access: Implementation Problems," Telephone Engineer & Management, vol. 88, Sep. 1, 1984, p. 128 (A21708884).

"Company News: Phone Service to be Tested," The New York Times, Jan. 20, 1989 (A01331395).

"Components," Electronic News, 1984 (A21726007).

Connolly, James, "Republican Convention Set to Test Telecommunications," Computerworld, Jul. 9, 1984, p. 17 (A21708804).

"Corporate Preoccupation with Costs Spurs Telephone Management Sales," Computerworld Focus, May 14, 1986, p. 13 (A21708457).

Cox, John D., "Talk Into Telephone, Command a Computer," The Sacramento Bee, Sep. 10, 2985 (A01354683).

"CPU, PBX Vendors Drawing Alliances," Computerworld, Apr. 23, 1984, p. 15 (A21708674).

Crawford, K. E., et al., "4A Toll Crossbar Application," The Bell System Technical Journal, vol. 57, No. 2, Feb. 1978, pp. 283–323 (A21716223).

Croxall, L. M., et al., "Operational Experience with the 5ESS™ Switch," ISS Florence, Session 42 A, Paper 4, May 1984 (A21725550).

Cummings, Steve, "Voice–Mail Systems Attract Tentative Interest," PC Week, vol. 3, No. 49, Dec. 9, 1986, p. 140 (A21707565).

Curtis, Janice, "At a Turning Point, VMX Makes Moves to Boost Voice Messaging Business," Dallas Business Courier, vol. 2, No. 13, Section 1, Jul. 14, 1986, p. 19 (A21706328).

Daniel, Heidi, C., "Inventor Battles Computer Giants," South Florida Business Journal, Aug. 12, 1985 (A21707969).

Press Release, Communications Daily, vol. 4, No. 177, Sep. 11, 1984, p. 7 (A21708903).

Danner, Patrick, "Dial Info Charges Electronics Giant Disconnected Deal," San Francisco Business Times, vol. 2, No. 33, Apr. 18, 1988 (A21724767).

Excerpt from Data Communications, Sep. 1985, pp. 399–410 (A21707991).

"Definity Announcement Includes Other New Products," Telecommunications Product Review, vol. 16, No. 3, Mar. 1989 (A21712758).

DeLessio, N. X., et al., "An Integrated Operator Services Capability for the 5ESS System," ISS '84 Florence, May 1984, Session 22 C, Paper 3, p. 1–5 (A21725538).

Desmond, Paul, "Patented Call–Routing Tool Boon for Retail Industry; Instalink Will Use ISDN for Automatic Number ID," Network World, Aug. 1, 1988 (A21712653).

"Dial–A–Drill," The New York Times, Jan. 20, 1969 (A21725951).

"Dialing for Pennies," California Living Magazine, Aug. 12, 1984 (A21708855).

"Distributed Data Processing and Messaging Systems," Data Communications, May 1986, p. 105 (A21708428).

Dix, John, "AT&T Breathes New Life into its Switch–and–Wire Beast," Network World, Oct. 27, 1986, p. 1 (A21706662).

Dix, John, "AT&T Tries Different Tack," Computerworld, Nov. 25, 1985, p. 19 (A21708097).

Dix, John, "AT&T Unleashes 'Gazelle,'" Computerworld, Apr. 30, 1984, p. 2 (A21708710).

Dix, John, "Enhancements Out for AT&T's High–End PBX," Computerworld, Nov. 12, 1984, p. 99 (A21708970).

Brown, Jim, "VMX 5000 Series: Voice Messager Debuts," Network World, Oct. 13, 1986, p. 6 (A21706653).

Dix, John, "Ford Motor Co.; Driving Down Costs with Voice Mailboxes," Network World, Jul. 14, 1986, p. 32 (A21706326).

Dix, John, "'Hello, This is a Voice Mail Recording.,'" Network World, Jul. 14, 1986, p. 1 (A21706331).

Dix, John, "Rolm; Long–Awaited Redwood to Debut at ICA Today," Network World, Jun. 2, 1986, p. 4 (A21708493).

Dix, John, "Switch Management: DEC Tools Debut at ICA," Network World, Jun. 9, 1986, p. 8 (A21708497).

Dix, John, "Unified Messaging: AT&T Reveals New Message Blueprint," Network World, Sep. 22, 1986, p. 1 (A21706473).

Dix, John, "Voice/Data PBXs: More than Today's Users Need?," Computerworld, Apr. 23, 1984, p. 14 (A21708669).

"Dollars from Dialing," Fortune, Mar. 16, 1987, p. 10 (A21707648).

Dorros, Irwin, "Evolving Capabilities of the Public Switched Telecommunications Network," Business Communications Review, Jan.–Feb. 1981 (A21725652).

Dowd, Ann Reilly, et al., "Dollars from Dialing," Fortune, Mar. 16, 1987, p. 10 (A21707869).

Drinkwater, Larry, "Voice Processing: An Emerging Compter ? Technology," Speech Technology, Aug.–Sep. 1984, pp. 50–54 (A21708826) (illegible).

Edwards, M., "Digital PBXs Zero in on the Key Role as Hub of Office," Communications News, vol. 21, No. 12, Dec. 1984, p. 44 (A21708992).

Egly, Diana G., et al., "Mnemonic Aids for Telephone–Based Interfaces," Proceedings of the Eleventh International Symposium on Human Factors in Telecommunications, Sep. 1985 (A21725818).

Eichenwald, Kurt, "Just a Phone Call Away: More Dial–It Services," The New York Times, Apr. 16, 1988 (A21725852).

Excerpt from Electrical Communication Facilities (in Japanese), vol. 33, No. 9, 1981 (A21724248).

"Electronic Switching: Digital Central Office Systems of the World," Edited by Amos E. Joel, Jr., IEEE Press, 1982 (A21716673).

"Electronic Voice Mail Revolutionizing Communications," Tulsa Business Chronicle, vol. 5, No. 26, Jun. 30, 1986 (A21708510).

Press Release, PR Newswire, Mar. 20, 1984 (A21708647).

Elliot, Thomas R., "A Voice in the Wilderness," Computerworld, Jun. 13, 1984, p. 76 (A21708779).

Emerson, Jim, "Catalog Business," DM News, Dec. 15, 1985 (A21708115).

Emerson, Jim, "Eliminating Live Operators," DM News, Dec. 15, 1985 (A21708114).

Englebardt, Robert M., "Island Paradise Gets System Update," Telephone Engineer & Management, vol. 88, Sep. 15, 1984, p. 104 (A21708904).

Exacom Model AM–200 Answering Service Monitor System, General Description Installation and Operation Manual, Issue 1, Dec. 19, 1986 (W11483).

Fantel, Hans, "Video: Movies Hot Off the Tube," The New York Times, Mar. 29, 1987 (A21707890).

"The Father of Voice Messaging," Network World, Nov. 1984, p. 57 (A21708942).

Feldman, Robert, "New AT&T Packages Designed to Spruce up Systems 75/85," MIS Week, Jun. 2, 1986, p. 30 (A21725895).

"Firm Created After Patent Suit Against First Data," Reuters, Oct. 17, 1994 (A01331388).

Fischell, David R., et al., "Interactive Voice Technology Applications," AT&T Technical Journal, Sep.–Oct. 1990 (A34100164).

Foster, Robin Harris, "In the Forefront with Integrated Call Centers," AT&T Technology, vol. 7, No. 4, 1992 (A21712913).

Froehlich, F. E., et al., "The Switched Network Transaction Telephone System," The Bell System Technical Journal, vol. 57, No. 10, Dec. 1978, pp. 3475–3485 (A21725995).

Froehlich, Leopold, "Are Smart Buildings a Dumb Idea? If They're Going to Prosper, Shared Service Providers Will Have to Move from Telephony into Office Automation," Datamation, vol. 31, Oct. 1, 1985, p. 101 (A21708046).

Gates, G. W., et al., "Software," The Bell System Technical Journal, vol. 61, No. 5, May–Jun. 1982, pp. 863–883 (A21725913).

Gawron, L. J., et al., "Scanned–Image Technologies Bring New Ways to Conduct Business," AT&T Technology, vol. 6, No. 4, 1991 (A21713611).

Gawronski, Jane Donnelly, et al., "Audio Response System to Practice Mental Computation Skills," Proceedings of the Digital Equipment Computer Users Society, vol. 1, No. 2, Fall 1974, pp. 633–636 (A21725979).

Gawrys, G. W., "ISDN: Integrated Network/Premises Solutions for Customer Needs," IEEE, 1986, pp. 1.1.1–1.1.5 (A21725555).

Gaylord, D. M., "Better Health for Hospitals with Dimension 2000 PBX," Bell Laboratories Record, Jul.–Aug. 1981, pp. 170–173 (A21724371).

Gibson, Stanley, "Audix Upgrades Include Messaging, Billing, Management," Computerworld, Dec. 15, 1986, p. 29 (A21707568).

Gibson, Stanley, "Octel Links Voice Mail System to Rolm PBX," Computerworld, Dec. 8, 1986, p. 42 (A21707564).

Gillon, A.C., et al., "Voice Power Gives You Voice Messaging—And Then Some," AT&T Technology, vol. 4, No. 2, 1989 (A21712712) repeated (A21724818).

Gitten, L. J., et al., "5ESS System Evolution," ISS Florence, Session 41 A, Paper 1, May 1984 (A21725543).

Goecke, D., et al., "A Software Engineering Approach Applied to the Complete Design and Production Process of Large Communication Systems Software," ISS '84 Florence, Session 13 C, Paper 1, May 1984.

Goldstein, Mark L., "Send A Message. Now! New Digital Networks Can Give Companies a Competitive Edge," Industry Week, Jul. 21, 1986, p. 43 (A21706347).

"Gotcha!," Edited by John A. Conway, Forbes, Mar. 10, 1986, p. 9 (A21708345).

Gottlieb, Dan, "Does the Bell Toll for Voice/Data Independents?," Purchasing, Dec. 13, 1984, pp. 103–108 (A21724641).

Grau, Jeff, "IBM Hints at Entering Voice Response Market in 1992," Article Source Unknown, Dec. 11, 1990 (A01346366).

Greene, James E., et al., "Voice Response System Sticks to the Script and Saves Time, Money and Tempers for University Students and Administrators," Communication Age, Jan. 1986 (A21724080).

Grumhaus, Audrey, "What's New in Telephone Service: Some Bad News for Nuisance Callers," The New York Times, Nov. 16, 1986 (A21725855) repeated (A21725857).

Grunbaum, Rami, "Genesis Electronics Heeds the Voice Mail Calling," The Business Journal—Sacramento, vol. 2, No. 49, Mar. 10, 1986 (A21708341).

Gunderson, Gary W., "Computer Consoles; Can Your Community Save Lives when Seconds Count?," Business Wire, Feb. 11, 1987 (A21707785).

Hafner, Katherine, "Hello Voice Mail, Goodbye Message Slips," Business Week, Jun. 16, 1986 (A21708507).

Hafner, Katherine, "System 85 Targets Leading–Edge Users: NBI," Computerworld, Sep. 5, 1983, p. 53 (A21724580).

Hafner, Katherine, "Temporary Telephones," Network World, May 2, 1984 (A21708739).

Hafner, Katherine, "The Venture Capital Adventure," Network World, Aug. 1, 1984 (A21708837).

Hamel, Bob, "Voice Messaging; VMX Gives Firms Edge," Network World, Mar. 16, 1987 (A21707864).

Hanson, Robert J., "The DSC–2000 VoiceServer System," Speech Technology, Aug.–Sep. 1984, pp. 55–65 (A21708818).

Herits, E., et al., "A New Look for the White Pages," Bell Laboratories Record, Jun. 1980 (A21709547).

Hardy, James O., et al., "Handling Coin Toll Calls—Automatically," Bell Laboratories Record, Sep. 1980, pp. 256–262 (A21710422).

Harrar, George, "Interview: Ed Landry; Making Office Connections at John Hancock," Computerworld, Apr. 14, 1986, p. 63 (A21708404).

Hasui, Kouya, et al., "Man–Machine Interfaces in Office Communication Systems," IEEE Communications Magazine, vol. 24, No. 7, Jul. 1986, pp. 18–23 (A03701435).

Coover, Edwin R., "Voice–Data Integration in the Office: A PBX Approach," IEEE Communications Magazine, vol. 24, No. 7, Jul. 1986, pp. 24–29 (A03701442).

Haszto, E. D., et al., "Alliance Teleconferencing Services Boost Business Efficiency," AT&T Technology, vol. 3, No. 1, 1988 (A21724796).

Heberle, W., "Accumulation of the Signals when Using the Pushbutton Telephone for Data Entry," Proceedings of the 5$^{th}$ International Symposium on Human Factors in Telecommunications, Sep. 1970 (A21725766).

Heffron, W. G., et al., "Transaction Network Service," The Bell System Technical Journal, vol. 57, No. 10, Dec. 1978, pp. 3331–3347 (A21725986).

Henricks, Mark, "DSC Makes Japanese Connection," Dallas–Forth Worth Business Journal, vol. 9, No. 30, Mar. 17, 1986 (A21708347).

Hillhouse, Joseph, "PABX, the Hub: Keeping Communications on Track," Computer Decisions, vol. 16, Nov. 15, 1984, p. 84 (A21708974).

Hindlin, Eric, "PBXs Becoming Practical Alternative to LANs," PC Week, vol. 4, Mar. 17, 1987, p. C16 (A21707870).

Hird, E. V., "Party Line Cost Cutters," Telephone Engineer & Management, vol. 90, May 1, 1986, p. 51 (A21708442).

Hollitz, John, "Giving Information without Human Intervention," The Business Journal—Sacramento, vol. 3, No. 26, Section 1, Sep. 29, 1986, p. 25 (A21706505).

"Home Shopping Network Halts Talks," The Washington Post, Feb. 19, 1987 (A21707804).

"The Horizon Call Management System Tackles High Call Volume Demands," Telecommunications Product Review, Jan. 1983 (A21724553).

Horton, L. A., et al., "AT&T Systems Link the University of Maryland," AT&T Technology, vol. 7, No. 2, 1992 (A21712897) repeated (A21725512).

Horwitt, Elisabeth, "AT&T Enchancements Fill Gaps in System 75 Digital PBX," Computerworld, Jun. 16, 1986 (A21708505).

Horwitt, Elisabeth, "Rolm to Unveil Low–End PBX: Digital System Bucks Feature–Rich Trend," Computerworld, Jun. 2, 1986, p. 8 (A21708489).

Howitt, Doran, "Boom For Voice Mail Systems," InfoWorld, Oct. 29, 1984, pp. 37–38 (A21708940).

Hubbard, Thomas Leo, "Richardson: High–Tech Prosperity," Dallas Magazine, vol. 66, No. 2, Feb. 1987 (A21707741).

Huber, K. M., et al., "Getting the Message with UMS," AT&T Technology, vol. 1, No. 1, 1986 (A21708123).

Swann, L., "Universal Operations Systems—Integrated Building Blocks," AT&T Technology, vol. 1, No. 1, 1986 (A21708141).

Hunter, John J., "Telephone Tag Alternative: Voice Messaging Unshackles Users from Traditional Telephone Limitations," Network World, Jul. 13, 1987 (A21714278).

Hutchins, Dexter, "The Legal Battles Over Voice Messaging," Fortune, Oct. 28, 1985, p. 104 (A21708066).

"IBM Gives Voice to PS/2, RS/5000 Platforms," Voice Processing Newsletter, vol. 10, No. 22, Aug. 1, 1991 (A01346371).

"IBM, Inventor Reach Patent Agreement," The Washington Post, Aug. 30, 1985 (A21707976).

"IBM Reaches Patent Agreement with Inventor," U.P.I., Aug. 29, 1985 (A21707974).

"IBM–Rolm Eye CBX–SNA Link," Computerworld, Jan. 5, 1987 (A21707572).

"ICA Slates Huge Meeting, Exhibit; Includes Program and List of Exhibitors," Telephone Engineer & Management, vol. 88, Apr. 15, 1984, p. 96 (A21708657).

IEEE Transactions on Consumer Electronics, vol. CE–25, No. 3, Jul. 1979 (A21725141).

"Index to Theses," Edited by Geoffrey M. Paterson, et al., vol. XXVI, Part 1, 1977 (A21718028).

"Industry Leaders License Katz Interactive Technology Patents," PR Newswire, Sep. 25, 1995 (A01331383).

Press Release, Communications Daily, vol. 5, No. 126, Jun. 28, 1985, p. 5 (A21724661).

"Inside an Internetworking Voice–Mail Processor," Data Communications, Oct. 1986, p. 158 (A21706523).

"Integratec's Niche is Collecting on Delinquent Bank Card Accounts," American Banker, Aug. 10, 1988, p. 22 (A21724771).

"Card Titan Sees Gold in Electronic Commerce," Financial Service Online, Jul. 1996, p. 8 (A21724775).

"International Communications Network Service Installed by Commercial Cable," The Magazine of Bank Management, Jun. 1984, p. 126 (A21708770).

"International Information Network Acquisition," PR Newswire, Nov. 7, 1985 (A21708093).

"International Information Network Agreement," PR Newswire, Dec. 16, 1985 (A21708117.

"International Information Network Announces Agreements," PR Newswire, Feb. 12, 1986 (A21708309).

International Information Network Contract, Article Source Unknown, Feb. 25, 1986 (A21708312).

"International Information Network Earnings," PR Newswire, Dec. 9, 1985 (A21708110).

"International Information Sets Financing Program," PR Newswire, Oct. 22, 1985 (A21708064).

Press Release, Communications Daily, vol. 6, No. 41, Mar. 3, 1986, p. 11 (A21708337).

"Megaphone Intl Wins Calif. Lottery Contract," PR Newswire, Aug. 4, 1986 (A21706387).

"Introducing Voice Quote," The Washington Post, Oct. 9, 1986 (A21707805).

Press Release, Communications Daily, vol. 6, No. 189, Sep. 30, 1986, p. 7 (A21706510).

Press Release, Communications Daily, vol. 6, No. 189, Sep. 30, 1986, p. 7 (A21706511).

Jenkins, Avery, "Iowa State Launching Campus Wide Network," PC Week, vol. 4, Feb. 3, 1987, p. C14 (A21707767).

Jerman, Max, et al., "A CAI Program for the Home," Educational Technology, Dec. 1971, p. 49 (A21725984).

Johnson, Eric, "Analysts Say that Voice–Message Will Talk up $1 Billion," Data Communications, Jan. 1984, p. 50 (A21708551).

Johnson, J. W., et al., "Integrated Digital Services on the 5ESS™ System," ISS '84 Florence, May 1984, Session 14 A, Paper 3, pp. 1–8 (A21725525).

Johnston, David, "'Pay Radio' Tunes in Charities, Turns off Some Consumer Groups," Los Angeles Times, Part 6, Aug. 24, 1986, p. 1 (A21706399).

Excerpt from Journal of the Institute of Electronics and Communication Engineers of Japan (in Japanese), vol. 60, No. 10, 1977 (A21725080).

Kaplan, Jeffrey M., "4$^{th}$ Generation Lacking," Network World, Oct. 6, 1986, p. 38 (A21706646).

Kaplan, Jeff, "The Uncertain Future of Centrex," Network World, Mar. 14, 1984, p. 17 (A21708640).

Karpinski, Richard, "IBM Offers Voice Processing Line," Telephony, Aug. 5, 1991 (A01346377).

Katzel, Jeanine, "Selecting and Installing a Plant PBX System," Plant Engineering, vol. 37, Mar. 3, 1983 (A21713341).

Kawakami, Tokuhiro, et al., "Speaker Independent Speech Recognition and Audio Response System and Facsimile Response System," NEC Technical Journal, vol. 39, No. 7, 1986, pp. 54–79 (A21708159).

Kelleher, Joanne, "Users; Mastering DEC," Computerworld Extra!, Sep. 24, 1986, p. 61 (A21706475).

Kemezis, Paul, "The Shared Tenant–Services Debacle and Lessons from it" Data Communications, Sep. 1986, p. 94 (A21706444).

Koike, H., et al., "An Office–Use Voice Storage System with Elaborate User's Operativity," Proceedings of the Tenth International Symposium on Human Factors in Telecommunications, Jun. 1983, pp. 197–203 (A21725793).

"Kokusai Voicemail to Start International Voicemail Service," Comline Daily News Telecommunications, Mar. 10, 1987 (A21707861).

Kolodziej, Stan, "Where is the Electronic Messaging Explosion?," Computer World, Oct. 16, 1985, p. 21 (A21708056).

Korzeniowski, Paul, "Voice Messaging; ETS Demise Hits Rolm, Octel Users," Network World, Aug. 4, 1986, p. 1 (A21706390).

Kylin, J. C. et al., "Benefits of Integrating Data Bases into the SPC Network," ICC '79 Conference Record, vol. 1, Jun. 1979 (A21726001).

Lawson, Michael, "AT&T Leaves 'Super–PBX' money on the table for Northern Telecom," Data Communications, Sep. 1987 (A21712210).

Lazarus, George, "Pepsi Also Won the Super Bowl," Chicago Tribune, Jan. 30, 1987 (A21707647).

Lee, Linda, et al., "Meridian SL Information Services," Telesis, 1985, pp. 13–19.

Leibowitz, Ed, "The Wonder Years: Intriguing ACD Trends for the 1990s," Teleconnect, vol. 8, No. 4, Apr. 1990, p. 84 (A21712064).

Levin, David, "Private Branch Exchanges: The Best Time to Shop Might Be Right Now," Data Communications, Aug. 1987, p. 100 (A21714315).

Lineback, J. Robert, "VMX Girds for a Fight in Market it Pioneered," Electronics, May 12, 1986 pp. 55–56 (A21708453).

Lukeson, David R., "Class: The Smart Local Telephone Network," Proceedings of the International Congress on Technology and Technology Exchange, Oct. 1984, pp. 100–103 (A21725864).

"The LUMA Visual Telephone," Telecommunications Product Review, vol. 13, No. 7, Jul. 1986 (A21706313).

Lyman, Guy C., III, "Voice Messaging Comes of Age," Speech Technology, Aug.–Sep. 1984, pp. 45–49 (A21724634).

Mankin, Eric, "Playing TV Telephone: New System Opens Door for Audience Participation," Electronic Media, Apr. 24, 1989 (A01331389).

Marino, P. J., et al., "AT&T Communications ISDN Plans," IEEE, 1985, pp. 247–251 (A21723894) repeated (A21725560).

"Marubeni to Install Voice–Box–Mail System," Japan Economic Journal, Mar. 13, 1984, p. 9 (A21708639).

Mason, G. C. W., "Use of Recorded Announcements for Guidance of Users of Telecommunications Networks," Proceedings of the Eighth International Symposium on Human Factors in Telecommunications, Sep. 1977, pp. 257–262 (A21725784).

Massey, David K., "Voicetek Hears Sweet Success with Market Strategy," Boston Business Journal, vol. 7, No. 21, Section 1, Jul. 20, 1987, p. 6 (A21714290).

"The Master of Trivia," The Sporting News, Aug. 19, 1985 (A21706671).

Matheson, David, "ISDN: The Technology has Discovered its Purpose," Telemarketing, May 1990 (A40002414).

Maxemchuk, N. F., "An Experimental Speech Storage and Editing Facility," The Bell System Technical Journal, vol. 59, No. 8, Oct. 1980 (A21724241).

Mearns, Allison B., et al., "Calling Card—Don't Tell It–Dial It," Bell Laboratories Record, May–Jun. 1982, pp. 117–119 (A21709811) repeated (A21709808).

Michaelson, Marlene, "Business, Services Use 'Dial A' Formats," Contra Costa Times, Sep. 8, 1986 (A21707858).

Mier, Edwin, E., "A Big Bonanza in Little Switches," Data Communications, Jun. 1984, p. 68 (A21708764).

Miles, J. B., "AT&T System Upstages its FTS Rivals at Shows; The FTS 2000 Telecommunications Contract," Government Computer News, vol. 6, No. 4, Feb. 27, 1987, p. 1 (A21707808).

Miles, J. B., "Bypass Starts to Soar; More Businesses are Avoiding the Public Phone Network as New Technologies Surface and Telecomm Costs Rise," Computer Decisions, vol. 17, Nov. 5, 1985, p. 82 (A21708087).

Miles, J. B., "Network Control Under Control; Corporations Seeking Unified Network Management Systems May Find Hope in Several New Offerings," Computer Decisions, vol. 18, Jul. 15, 1986, p. 70 (A21706340).

Excerpt from Modern Office Technology, Jul. 1986 (A21706315).

Moore, Steve, "Project Management; Anatomy of a Cutover, Part 1" Network World, Aug. 25, 1986, p. 26 (A21706408).

Moore, Steve, "Project Management; Anatomy of a Cutover, Part 2" Network World, Sep. 1, 1986, p. 35 (A21706447).

Press Release, Data Communications, Aug. 1984, p. 58 (A21708825).

"MTV–Networks Signs with American Express Affiliate FDR Interactive Technologies," Business Wire, Mar. 28, 1989 (A01331393).

"NAB in the 'Big D.,'" Broadcasting, vol. 112, Mar. 30, 1987, p. 83 (A21707892).

"National Railways' Seat Reservation System by Touch Tone Telephone," Electrical Communication Facilities, vol. 38, No. 339, 1975 (A21724984).

"Newly Formed company Assigned Several Interactive Technology Patents Following the Settlement of Multimillion Dollar Patent Lawsuit," Business Wire, Oct. 17, 1994 (A01331386).

"New AT&T Device Made in Columbus," Columbus Citizen Journal, Sep. 7, 1985 (A01354693).

"New Products Telecommunications," Sound & Communications, vol. 28, No. 12, Apr. 1983, pp. 84–85 (A21713354).

"New Systems Stem Losses from Credit Card Debt; Technology Streamlines Phone Contacts," American Banker, Aug. 10, 1988 (A21724777).

Newton, Harry, "AT&T Information Systems One Year Later," Office Administration and Automation, vol. 45, Jan. 1984, p. 37, (A21708557).

Newton, Harry, "Dumb Smart Switches," Teleconnect, May 1991, pp. 14–18.

Newton, Harry, et al., "Send Us Your Pre–1989 Brochures," Computer Telephony, Oct. 1996, pp. 16–26 (A01331210).

Nishikado, Iwamasa, et al., "Voice Storage System for Centralized Extension System," Review of the Electrical Communication Laboratories, vol. 32, No. 6, 1984, pp. 1010–1018 (A21725924).

Press Release, The American Banker, Oct. 20, 1986, p. 13 (A21706658).

"Northern–Telecom–2; (NT) Northern Telecom Announces Software Feature Package," Business Wire, Feb. 18, 1987, (A21707802).

"No. Telecom Upgrades Digital PBX," Electronic News, vol. 30, Apr. 30, 1984, p. 63 (A21708708).

Nowogrocki, Jim, "City, County Spend About $ 1 Million on 911," St. Louis Business Journal, vol. 6, No. 43, Section 3, Aug. 4, 1986, p. 1C (A21706393).

"Office Automation Advances 'White Collar' Productivity," Dun's Business Month, vol. 126, Mar. 1986, p. 59 (A21708336).

The Official Proceedings of Speech Tech '85, Media Dimensions, Inc., Apr. 1985, Cover and General Information Pages.

Press Release, PR Newswire, May 9, 1986 (A21708451).

Paznik, Megan Jill,"Voice Mail: Pitfalls and Promises," Administrative Management, vol. 48, Mar. 1987, p. 16 (A21707849).

"The PBX Marketplace; Private Branch Exchanges," Administrative Management, vol. 47, Jan. 1986, p. 45 (A21708194).

Pelline, Jeff, "AT&T System Links Voice to Computer," San Francisco Chronicle, Sep. 10, 1985 (A01354691).

"Perception Technology; (PCEP) Perception Technology Announces ANI, DID Enhancements," Business Wire, Feb. 27, 1987 (A21707811).

Petit, J. C., et al., "Galaxie: Toward Adaptive Distributed Control Systems," ISS '84 Florence, May 1984, Session 41 A, Paper 3.

Petrosky, Mary, "Interactive Speech System From AT&T's Business Unit," Infoworld, vol. 7, Issue 38, Sep. 23, 1986 (A21708029).

Pfister, George M., "The PBX: What Matters, What Doesn't," Datamation, vol. 30, Aug. 1, 1984, p. 121 (A21708831).

Plakias, Mark, "The Katz that Ate the Canary," Telemedia News and Views, vol. 2, No. 11, Nov. 1994 (A01331037).

Pollack, Andrew, "Audiotex: Data By Telephone," The New York Times, Jan. 5, 1984 (A21725850).

Portantiere, Nick, "AT&T Introduces System 25 Digital PBX," Electronic News, Jul. 7, 1986, p. 34 (A21706324).

Power of Attorney for USPA 5,109,404 Inventor Ronald A. Katz.

Prell, E. M., et al., "The Changing Role of the Operator," International Switching Symposium, May 1979, pp. 697–703 (A21725933).

Prince, Terry, et al., "A Telephone for the 'Checkless' Society," Bell Laboratories Record, Sep. 1972, pp. 249–253 (A21725647).

"Profit from Impulse Pay–Per–View," Advertisement for Science Dynamics Corporation, Technology, Jul. 14, 1986 (A21706337).

"Prudential Insurance Mortgage by Phone Program," PR Newswire, Feb. 19, 1986 (A21708310) repeated (A21708311).

Pulford, Jack, "Aurora System is Built to Grow," Telephone Engineer & Management, vol. 88, Aug. 1, 1984, p. 78 (A21708841).

Putnam, Jane, "Winners," Contra Costa Sun, Aug. 14, 1975 (A21706705).

"Putting an End to Telephone Tag," ABA Banking Journal, Feb. 1987, (A21707747).

Raack, G. A., et al., "Customer Control of Network Features," ISS '84 Florence, May 1984, Session 14 A, Paper 2 (A21725520) repeated (A21725717).

Raimondi, Donna, "AT&T Debuts Primary Rate for System 85," Computerworld, Feb. 23, 1987, p. 41 (A21707806).

Rappaport, David M., "Voice Mail: Key Tool or Costly Toy," Data Communications, Oct. 1986, p. 153 (A21706526).

"Redwood by Rolm," Telecommunications Product Review, vol. 13, No. 6, Jun. 1986 (A21708487).

Rees, Norm, "Flexible Voice Response Software Speeds Development for Resellers," Speech Technology, Mar.–Apr. 1988, pp. 46–49.

Results of Lexis Search Request for "Call Interactive," Date of search Aug. 5, 1996 (A01331399).

Rice, Valerie, "AT&T Enters Speech–Processing Business, Names First Customers," Investor's Daily, Sep. 10, 1985 (A01354684).

Riederer, S. A., "Conversant VIS Means Business," AT&T Technology, vol. 5, No. 4 (A21711986).

Rangnekar, S., et al., "AT&T Voice Mail Service," AT&T Technology, vol. 5, No. 4 (A21711992).

"Ring System; Provides District of Columbia with Automatic Number and Location Identification to Aid in Emergency Services Response," Business Wire, Aug. 7, 1986 (A21706396).

Press Release, PR Newswire, Mar. 3, 1986 (A21708338).

Rippteau, Jane, "'Smart' Way To Get Message Across," Financial Times, Jun. 12, 1986 (A21708502).

Rogers, Thomas, et al., "Scounting—A Worthwhile Trivial Pursuit," The New York Times, Aug. 9, 1985 (A21707968).

"Rolm–Corp; Appoints Harvey and Zalisk as Vice President," Business Wire, May 21, 1986 (A21708472).

"Rolm–corp; Introduces Redwood for Branch Offices and Small Business," Businesses Wire, Jun. 2, 1986 (A21708491).

"Rolm; Links PhoneMail to IBM VM Host," Business Wire, May 5, 1986 (A21708447).

"Rolm Releases Four–Channel Phonemail Voice Message Unit," Computerworld, Jan. 28, 1985.

"Rolm; Rolm Announces PhoneMail Network," Business Wire, Feb. 9, 1987 (A21707775).

"Rolm; Rolm Awarded Major contract by Columbia University," Business Wire, Mar. 2, 1987 (A21707855).

"Rolm; Rolm CBX II 9000AE Offers Abundant System Power for Applications Growth," Business Wire, Feb. 3, 1987 (A21707765).

"Rolm; 15–Node Rolm System to be Installed at University of Rochester," Business Wire, Nov. 11, 1985 (A21708096).

Roman, David R., "Building Up Your Personal Computer; Part II: Data–Input Devices," Computer Decisions, vol. 16, Mar. 1984, p. 110 (A21708630).

Rosenbaum, Art, "This 'Maniac' Spreads His Loot Around," San Francisco Chronicle, Jul. 24, 1986 (A21706875).

Sanger, David E., "A Driving Force Leaves Rolm," The New York Times, Jan. 15, 1986, (A21708200).

Press Release, PR Newswire, Sep. 17, 1985 (A21708022).

Schindler, Paul, E., Jr., "AT&T Talking up Conversant 1 Unit," Information Week, Sep. 16, 1985 (A21723912).

Schinke, David, "Speaker Independent Recognition Applied to Telephone Access Information Systems," Speech Tech '86, 1986 (A21718178).

Schulman, Henry, "AT&T Device: Talk to Computer By Phone," The Oakland Tribune, Sep. 10, 1985 (A01354685).

Schumaker, Robert M., Jr., "Phone–Based Interfaces: Research and Guidelines," Proceedings of the Human Factors Society 36$^{th}$ Annual Meeting, 1992, pp. 1051–1055.

Schwartz, P., et al., "JISTEL 500—Time Division Exchange Including Voice and Data with Voice Messaging," ISS '84 Florence, May 1984, Session 21 A, Paper 6, pp. 1–4.

Scully, Sharon, "Product News; Saturn PBX Revamped," Network World, May 19, 1986, p. 4 (A21708470).

Seaman, John, "Voice Mail: Is Anybody Listening?," Computer Decisions, vol. 16, May 1984, p. 174 (A21708731).

"Select List of Telecommunications Providers," The Magazine of Bank Management, Aug. 1986, p. 32 (A21706373).

Semilof, Margie, "High–End Voice/Data PBXs: Voicing Doubts about Data," Network World, Mar. 31, 1986, p. 65 (A21708354).

"Senate Panel Meets Today; C&P Objects to House Decision Awarding Telephone Contract to AT&T–IS," Communications Daily, vol. 5, No. 238, Dec. 10, 1985, p. 4 (A21708112).

Session No. 13—Contemporary Developments in Addressability and Pay–Per–View, Pay–Per–View Conference, Apr. 28, 1985, p. 21 (A21707196).

Sharma, Ranjana, "PBX Users Benefit from Vitality of ACD Market," Network World, Oct. 17, 1988 (A21712686).

Shaw, Peter, "The Need for BT's Managed Information Services," British Telecommunications Engineering, vol. 11, Apr. 1992, pp. 2–6.

Shepherd, John, et al., "Managed Recorded Information Services—An Overview," British Telecommunications Engineering, vol. 11, Apr. 1992, pp. 7–13.

Shimizu, Hiroshi, "Advanced Credit Call Service," Japan Telecommunications Review, Oct. 1986, pp. 247–250.

Press Release, PR Newswire, Dec. 5, 1985 (A21708108).

Siragusa, Gail, "Voice Mail Takes Off: Send and Receive Messages by Phone," Administrative Management, vol. 47, Apr. 1986, p. 43 (A21708393).

"Small Company Initial Public Offerings: Dec. 1983," Goldhirsch Group, Inc., Mar. 1984, p. 138 (A21708624).

Smith, Tom, "Production Use of ISDN Lives up to Expectations," Network World, Feb. 26, 1990 (A21712004).

Snow, Stephen, A., "Consumers Show Strong Preference for Automated Telephone Call Processing," Business Wire, Oct. 19, 1988 (A21724781).

"AT&T to Offer New Service," Reuter Newswire, Nov. 21, 1988 (A21724788).

"Soap Opera Updates Now Available in Area," Contra Costa Times/TV, May 28, 1984, p. 4 (A21708748).

"Something for Everyone at NAB's Equipment Exhibition," Broadcasting, vol. 12, Mar. 23, 1987, p. 63 (A21707873).

Song, D, et al., "System 12 Line and Trunk Testing," ISS Florence, May 1984, Session 32 A, Paper 5, p. 1.

"Special Information Tones Provide Computer with Vital Call Data," Bell Laboratories Record, Nov. 1981 (A21710768).

Staehler, R. E., "Toward a More Automated Network—TSPS Enhancements Lead the Way," Telephony, Feb. 8, 1982, pp. 45–48 (A21725941).

Stern, Aimee, "Cable Operators Fight Back; Pay–Per–View TV," Dun's Business Month, vol. 129, Feb. 1987 (A21707748).
Stewart, Alan, "Signaling Changes for Interconnects; NATA 86 Trade Show," Telephone Engineer and Management, vol. 90, Dec. 15, 1986, p. 72 (A21707569).
Stix, Gary, "Many Bands=Light Work," Computer Decisions, vol. 17, Sep. 10, 1985, p. 92 (A21708015).
Press Release, Communications Daily, vol. 5, No. 148, Jul. 31, 1985, p. 7 (A21708033).
"International Information Network Earnings," PR Newswire, Sep. 30, 1985 (A21708033) repeated (A21724666).
"International Information Sets Financing Program," PR Newswire, Oct. 22, 1985 (A21708034) repeated (A21724667).
Stoffels, Bob, "REA Takes its Show on the Road: Engineering and Management Seminars," Telephone Engineer & Management, vol. 88, May 15, 1984, p. 129 (A21708746).
"Strike Three," S. F. Progress, Aug. 7, 1985 (A21706708).
Strom, David, "Telephone or MIS Managers: Who Flips the PBX Switch; Management and Use of New Communications Technology; Connectivity—Focus on LANs," PC Week, vol. 4, Feb. 17, 1987, p. C1 (A21707798).
Sullivan, Linda, "Ameritech Services Signs Leading National Information Provider as a Master Dealer," Business Wire, Sep. 25, 1989 (A21724794).
Susca, Paul, "Telemarketing: Reach Out and Sell Someone," Network World, May 4, 1987 (A21714122).
"System 85 Voice Messaging Due in '85," Data Communications, Dec. 1984, p. 204 (A21709005).
Tagg, Ed, "Automating Operator–Assisted Calls Using Voice Recognition," Speech Technology, Mar.–Apr. 1988, pp. 22–25.
Takahashi, Y., "Technique to Use Chinese Letters for the On–Line System in Marketing Business," Packaging Technology, vol. 19, No. 11, 1981 (A21724264).
Talmadge, Candace, "MetroCal Dumps Richards for K–C," Adweek, Jan. 1987, (A21707728).
"Tech Deals," Phillips Business Information, vol. 7, No. 120, Jun. 25, 1996 (A01331382).
Telecommunication Technology, vol. 4, No. 4, Apr. 1986, p. 68 (A21724070).
"'Teleguide' Network Gives Tourists the Answers," ComputerData, Apr. 1983 (A21724569).
"Telephone Service Offers the Latest News on the Soaps," Augusta, GA Chronicle–Herald, Jul. 28, 1984 (A21724626).
Telephony, Sep. 29, 1980 (A21716447).
Tetschner, Walt, "PC–Based Voice Processing Software Tools," Speech Technology, Mar.–Apr. 1988, pp. 42–45.
Tetschner, Walt, "The Voicetek VTK 90 Voice Computer," Speech Technology, Mar.–Apr. 1987, pp. 102–106.
"They've Got Your Number in AT&T's first Primary–Rate Test," Data Communications, Feb. 1988, p. 15 (A21712494).
"Toshiba Telecom Introduces Universal Instrumentation for Entire Line of Key and PBX Systems," Telecommunications Product Review, vol. 11, No. 2, Feb. 1984 (A21708573).
"Tracking the Trucks," Network World, Sep. 5, 1984, p. 55 (A21708897).
"Trivial Tickets," The fort Wayne Journal–Gazette, Aug. 11, 1985 (A21706713).
"Two Firms Introduce FMS Products," Energy User News, vol. 9, Aug. 6, 1984, p. 12 (A21708848).

Tyson, David O., "Voice Mail Technology Streamlines Bank Telephone Messaging Services," The American Banker, Oct. 15, 1986, p. 13 (A21706655).
Upton, Molly, "No Clear Winner in War of Mails," Computerworld, May 19, 1986, p. 60 (A21708459).
Vanandel, M. A., "While You're Away, AUDIX Will Answer," AT&T Technology, vol. 3, No. 3, 1988 (A21724808).
"Vendor Support Eases GOP Costs," Computerworld, Aug. 27, 1984 (A21708865).
"View from Silicon Valley: Silicon Valley Companies Battle for Advantage, Compatibility," Communications Daily, vol. 4, No. 90, May 8, 1984, p. 1 (A21708743).
Virzi, Robert A., "Skip and Scan Telephone Menus: User Performance as a Function of Experience," Proceedings of the Human Factors Society $36^{th}$ Annual Meeting—1992, p. 211–215.
Vizcarrondo, John, et al., "HOBIS: New Designs on Hotel Billing," Bell Laboratories Record, Jan. 1980 (A21709392).
"VMX Announces InfoLink: New capability in Voice Messaging Arena," Business Wire, Jun. 16, 1987 (A21714159).
"VMX/Honneywell; (VMXI) (HON) Take Voice Messaging 'Down Under' After Signing Distribution/OEM Agreement for Australia and Pacific Basin," Business Wire, Sep. 3, 1986 (A21724699) repeated (A21706451).
"VMX, Inc. Adds Internal Revenue Service to Voice Message (SM) Users," Southwest Newswire, Feb. 8, 1984 (A21708587).
"VMX, Inc. Announces Another Good Quarter," Southwest Newswire, Aug. 1, 1984 (A21708846).
"VMX, Inc. Announces First Quarter Results," Southwest Newswire, Oct. 18, 1985 (A21708063).
"VMX, Inc. Announces Landmark Approval of first Voice Message System in Japan," Southwest Newswire, Jun. 1, 1984 (A21708776).
"VMX, (VMXI) AT&T Tops List of Seven License Agreements Granted in Third Quarter," Business Wire, Sep. 9, 1986 (A21706457).
"VMX–Inc; (VMXI) Hosts First International Networking Seminar," Business Wire, Jul. 18, 1986 (A21706345).
"VMX, Inc. Provides First Voice Message (SM) Systems to Three Bell Operating Companies," Southwest Newswire, Dec. 11, 1984 (A21709007).
"VMX, Inc. Releases Audited Fiscal 1984 Financials—It was a Very Good Year," Southwest Newswire, Aug. 7, 1984 (A21708852).
"VMX; (VMXI) Voice Messaging Leader VMX, Inc. Launches New Generation Technology with VMX(R) 5000 Series," Business Wire, Oct. 7, 1986 (A21706650).
"VMX; (VMXI) Voice Messaging Patent–Holder VMX Inc. Moves into France after Signing Distribution Agreement with Jeumont–Schneider," Business Wire, Sep. 15, 1986 (A21706459).
"VMX; (VMXI) VMX 5000 Series Voice Messaging System Scores High Sales During First Quarter," Business Wire, Mar. 10, 1987 (A21707862).
Press Release, Communications Daily, vol. 4, No. 209, Oct. 26, 1984, p. 6 (A21708939).
Press Release, Computerworld, Oct. 7, 1985, p. 68 (A21708055).
Press Release, PR Newswire, Jan. 18, 1984 (A21708570).
Press Release, PR Newswire, Apr. 10, 1984 (A21708655).
Press Release, PR Newswire, Oct. 16, 1984 (A21708935).
Press Release, PR Newswire, Jan. 24, 1986 (A21708207).

Voice Mail User Instructions, Voicemail International, 1991 (W70211).

"Voice Messaging Capability from VMX," The Magazine of Bank Management, Oct. 1985, p. 86 (A21708037).

Voice Processing International Conference Program, Jul. 1986 (A21723351).

Voice Processing—The New Revolution, Proceedings of the International Conference, Jul. 1986 (A21722980).

"Voice System Tunes up Automaker's Communications," Computerworld, Nov. 12, 1984, p. 35 (A21708972).

"Voice '92," Conference Information and Program, 1992 (W11651).

Press Release, Communications Daily, vol. 4, No. 110, Jun. 6, 1984, p. 9 (A21708778).

"Votrax Announces Centrum 9000, Model 5," Source Unknown, Oct. 16, 1987 (A21724763).

Waite, Andew J., "Applying IVR Systems," Inbound/Outbound, Sep. 1988, pp. 30–39 (A21725733).

Walker, Murt, "CCS7 Offers New Paths to Revenue Generating Services,"AT&T Technology, vol. 6, No. 2, 1991, pp. 8–19 (A21713600).

Wallace, Bob, "All Voice Systems Are Not Alike," Network World, Sep. 14, 1987 (A21712240).

Wallace, Bob, "Comnet '87; AT&T Announces ISDN Interface for System 85," Feb. 16, 1987 (A21707796).

Walters, R. E., et al., "Voice Processing Systems in British Telecom," British Telecommunications Engineering, vol 9, Jul. 1990, pp. 88–97.

Warner, Edward, "Bank's Speech Synthesizers Greet Financiers' Calls with Daily Balance," Computerworld, Oct. 22, 1984, p. 6 (A21708937).

Watt, Peggy, "Local Phone Companies Eyeing Market for Voice Mail Services," Computerworld, Mar. 24, 1986, p. 23 (A21708350).

Watt, Peggy, "Republicans Ready for High–Tech: GOP Convention will Feature Voice Message System," InfoWorld, Aug. 27, 1984 (A21708862).

Weinstein, Bob, "Stock Exchange Gets News by Phone," Inbound/Outbound, Oct. 1988, pp. 39–46 (A21725744).

Weinstein, Bob, "Stopping the Broker's Bottleneck," Inbound/Outbound, Nov. 1988, pp. 22–23 (A21725753).

West Interactive Settles with FDR: Patent Suit Settlement Could Have major Industry Impact, Enterprise Communications, Nov. 1994 (A01331040).

Whalen, Bernie, "Marketers Expand Applications of Dial–It 900 Technology," Marketing News, Nov. 26, 1982 (A21725861).

"What's An 'Automated' Attendant," Inbound/Outbound, Jul. 1989, pp. 40–42 (A21724789).

"Whether to Answer the Phone," The Washington Post, Dec. 7, 1986 (A21707563).

Whitten, W. B., "Advanced Interfaces Speed Delivery of Services," AT&T Technologies, vol. 2, No. 3 (A21707593).

"Who Switches Data Along with Voice? PBX Users, Increasingly," Data Communications, Feb. 1987, p. 77 (A21707751).

Wilpon, Jay G., et al., "Speech Recognition: From the Laboratory to the Real World," AT&T Technical Journal, Sep.–Oct. 1990, pp. 14–24 (A21723481).

Wise, Deborah C. "This Computer Even Deciphers Noo Yawk Talk," Business Week, Sep. 23, 1985, pp. 40–42 (A01354687).

Witten, Ian H., "Making Computers Talk: An Introduction to Speech Synthesis," Prentice–Hall, 1986 (A21708148).

Witten, Ian H., "Principles of Computer Speech," Academic Press, 1982 (A21709597).

Wolfe, R. M., et al., "Telecommunications Data Base Application with the 3B™ 20 Processor," ISS '84 Florence, May 1984, Session 22 A, Paper 2 (A21725518).

Wollenberg, Skip, "American Express Affiliate Plans Interactive Phone Service," The Associated Press, Jan. 19, 1989 (A01331396).

Wood, Lamont, "Stretching the Workday; Corporate Users Find that Voice Mail Saves them Time in Transmitting Important Messages," Computer Decisions, vol. 18, Dec. 2, 1986, p. 44 (A21707561).

Wood, Lamont, "Will New Alliances Forge Better Links? Private Branch Exchange Vendors Merge with Computer Firms," Computer Decisions, vol. 18, Jul. 29, 1986, p. 40 (A21706353).

Worrall, D. P., "New Custom Calling Services," The Bell System Technical Journal, vol. 61, No. 5, May–Jun. 1982, pp. 821–839 (A21725897).

Youngs, E. A., "The Changing Role of Human Factors Work Supporting New Telecommunications Products and Service," Proceedings of the Tenth International Symposium on Human Factors in Telecommunications, Jun. 1983 (A21725809).

Youngs, E. A., "Effects of Automating Operator Services on Customers and Operators," Proceedings of the Eighth International Symposium on Human Factors in Telecommunications, Sep. 1977, pp. 251–255 (A21725776).

"Zenith; Centel Plans Zenith Phonevision Pay–Per–View Cable TV System," Business Wire, Dec. 5, 1985 (A21708105).

Zuckerman, Steve, "Ogilvy & Mather/Dallas Looks for Partner to Go After Bigger Accounts," Dallas Business Courier, vol. 2, No. 21, Section 1, Sep. 8, 1986, p. 12 (A21706454).

Complete Issue of Bell Labs News, vol. 21, No. 40, Oct. 5, 1981 (A21710762).

Complete Issue of Bell Labs News, vol. 25, No. 36, Sep. 30, 1985 (A21724662).

Complete Issue of Bell Labs News, vol. 26, No. 31, Aug. 18, 1986 (A21706398).

Complete Issue of Bell Labs News, vol. 27, No. 33, Aug. 17, 1989 (A21710741).

Bell of Pennsylvania Press Release, Mar. 13, 1984 (A21725876).

Dorros, Irwin, et al., "Reaching into the Future with Stored Program Control," Bell Laboratories Record, Dec. 1980, pp. 387–393 (A21710507).

Complete Issue of Voice News, vol. 4, No. 9, Oct. 1984 (A21708913).

Complete Issue of Voice News, vol. 6, No. 7, Jul./Aug. 1986 (A21706303).

Complete Issue of Voice News, vol. 7, No. 2, Feb. 1987 (A21707730).

Complete Issue of Voice News, vol. 7, No. 3, Mar. 1987 (A21707834).

Complete Issue of Voice News, vol. 7, No. 5, May 1987 (A21714110).

Complete Issue of Voice News, vol. 7, No. 10, Oct. 1987 (A21724749).

"Network Communications Applications and Services," AT&T Communications Consultant Liaison Program, Issue , Jun. 1984.

"DST DST Systems Inc. Mutual Fund System Audio Response System," DST Systems, Inc., 1985 (Manual).

"Tele–Account Voice Response System Enhancements Functional Specifications Mar. 18, 1985," Mar. 18, 1985 (Manual).

"Periphonics Project Management Review Meeting," Mar. 21, 1985 (Agenda).

Boni, D., "Call Coding Report," Apr. 11, 1985 (Memo).

Vollmer, H.D., "Periphonics Management Review," May 1, 1985 (Meeting Minutes).

"DST Conversion Flow," Apr. 12, 1985 (Chart).

"Tele–Account Audit Report," Source Unknown, Jul. 26, 1984.

"Tele–Account Problem Report," Source Unknown, Jul. 26, 1984.

"100 Cool Call Things," Callcenter, Oct. 5, 2000.

Aisenberg, A., et ano., "A Distributed Control System For Public Telephones In Israel," *The 11th Convention of Electrical and Electronics Engineers In Israel*, Oct. 1979.

Aldrich, Nancy, "Choosing A Telecommunications Consultant," *Hospital Topics*, Mar./Apr. 1981, pp. 7–8.

An, Chungming, et al., "Helping The Stored Program Controlled Network Respond Quickly," *Bell Laboratories Record*, May/Jun. 1982, pp. 120–122.

Anderson, Lee, "French 'Smart Cards' Explained To Americans," *Telephony*, Apr. 19, 1982, pp. 100–101, 174.

Antelman, Leonard, "Hart Industries Files Bankruptcy," *Electronic News*, Dec. 7, 1981.

Arden, Bruce W., *What Can Be Automated? : The Computer Science And Engineering Research Study (COSERS)*, MIT Press, 1980.

Armstrong, Scott, "The 'Smart Card': Revolution In The Way You Pay Bills?," *The Christian Science Monitor*, Sep. 13, 1983.

Arnold, P.A., "Card Operated Payphones Can Simplify Service And Security," *Telephony*, Sep. 27, 1982, pp. 56–57.

"Autelca Proudly Introduces TelcaStar," (Advertisement), *Telecommunications Journal*, Sep. 1985.

Ayres, Paul, "One Bank's Approach," *Bank Administration*, Jan. 1980, vol. LVI, No. 1, pp. 30–32.

Baggot, A.J., "Token Meters," *Telecommunications Journal*, Apr. 1977, pp. 35–37.

Bagley, John, et al., "Impacts Of Calling Card Service (CCS) Implementation," *GTE Automatic Electric Journal*, May–Jun. 1982, pp. 99–108.

Berenyi, Ivan, "Telefax, Smart Phones Debut In Hungary, But Service Remains Limited," *Telephony*, Sep. 23, 1985, pp. 85–86.

Bertman, Lee A., "How To Make Your Communication System Less; Communications Are Integrally Related To Cost Containment, Employee Retention, And Increased Revenue," *Hospital Topics*, Jul./Aug. 1984, pp. 6–9.

Block, Victor, "FCC Rules Pay Phones Subject To Regulation," In the Nation's Capital, *Telephony*, Jun. 3, 1985, pp. 16–18.

Bowin, William F., "Understanding the Pay Station—Types Control, Terminology, Improvements (All In Simple English)," *Telephone Engineering & Management*, Jun. 15, 1972, pp. 54–60.

Brooks, A.P., "Operand Consistency Attendant: An Associative Solution To The Data Field Consistency Problem," *IBM Technical Disclosure Bulletin*, Jun. 1976, vol. 19, No. 1, pp. 222–224.

"Broward Man Charged in Phone Fraud," Nov. 24, 1981.

Caisperlein, Hermann, et ano., "Münzfunkfernsprecher Bei Der Deutschen Bundesbahn," *Die Bundesbahn*, 1980, pp. 551–554.

"Call Up The Future With The Phonocard. Pre–Paid Card Public Telephone Box.," (Advertisement), *Telecommunications Journal*, Aug. 1979.

Cane, Alan, "The 'Electronic Chequebook' Makes Its Debut," *Financial Times*, Aug. 9, 1983.

Cariou, J., et ano., "The Freephone Service: A New Application For The E12 System," *Communication and Transmission*, No. 5, 1982, pp. 63–73.

Chen, David D. et ano., "Approximating The Performance Of Two Phase Locking Using An Iteration Solution Model," *The University Of Michigan Computing Research Laboratory*, Apr. 1984.

"Coin–Operated Phones—Back to the Future," *TE&M*, Mar. 15, 1987, pp. 57–59, 61.

Crabbe, E., et al., "DMTM: A Data Management And Transmission Module," *GTE Automatic Electronic Journal*, Second Quarter 1983, pp. 51–56.

Curran, L., "Revisiting the Luddites," *Byte Publications, Inc.*, vol. 9, No. 1, Jan. 1984, p. 4.

Dickerson, Brian, "Bell Cuts WATS Service To Hart," *The Miami Herald*, 1981.

Dickerson, Brian, "Canadian Firm Could Get Hart Industries' Remaining Assets," *The Miami Herald*, Jan. 16, 1982.

Dickerson, Brian, "Credibility The First Hurdle For Discount Phone Call Firm," *The Miami Herald*, Mar. 9, 1981.

Dickerson, Brian, "FCC Delay Snarls Long–Distance Phone Plan," *The Miami Herald*, Dec. 1980.

Dickerson, Brian, "Hart Delays Long Distance Service Again," *The Miami Herald*, Jun. 3, 1981.

Dickerson, Brian, "Hart Gets Approval For Long–Distance Calls," *The Miami Herald*, Apr. 29, 1981, p. 6D.

Dickerson, Brian, "Hart Industries' Lines Still Clogged," *The Miami Herald*, Jul. 15, 1981.

"80 Years Of Public Telephones," *NTT Business*, vol. 32, No. 1, 1981, pp. 8–11.

Estes, Betty A., "Charge–A–Call Spreading Rapidly," *Telephone Engineer & Management*, Jan. 1, 1979, p. 89.

"FCC Approves World's First Smart Card Telephone," *Southwest Newswire*, Jul. 15, 1985.

"Fernsprechapparate," Einführung, *Electrisches Nachrichtenwesen*, Band 58, vol. 1, 1983 pp. 54–55, 58–59.

Finneran, Michael F., "Data Comm Focus—Packet Switching," *Business Communications Review*, Nov./Dec. 1985, pp. 35–40.

"Fire Destroys Hart Industries," *The Miami Herald*, 1981.

"For Every Telephone Call, Monoprint Records The Price, The Hour, The Date, The Length, The Number. And That's Not All . . . ," Advertisement, *Telecommunications Journal*, Dec. 1979.

"France: Poised To Deliver The Backbone For The Information Age," Special Advertising Section, *Data Communications*, Jun. 1983.

Freeman, Peter, *Software Systems Principles: A Survey*, 1975, pp. 136–137.

"French EFT Program Enters Its Final Phase," Newsfront, *Data Communications*, Jun. 1983.

"French Phone Booths Get Smarter," Dataletter, *Data Communications*, Oct. 20, 1982.

"The French 'Smart Card' Finally Arrives In The U.S.," *Data Communications*, Nov. 1984, pp. 263–265.

Fritz, Mark S., et ano., "Bloomington Hospital's Experience With Lifeline®," *Hospital Topic*, Sep./Oct. 1982, pp. 14–18.

Gechtman, V., et al., "Customer Line Usage Studies," *The 11th Convention of Electrical and Electronics Engineers In Israel*, Oct. 1979.

Grunig, R., "Halser Mailmaster F 204 Franking Machine," *Hasler Review*, vol. 11, No. 1, 1978.

Haberman, E., "Microcomputer Controlled Telephone Line Scanner," *The Tenth Convention of Electrical and Electronics Engineers In Israel*, Oct. 1977.

Haggerty, Maryann, "Firms Sell Varying Ways to Save," *The Miami News*, Aug. 8, 1981.

Haggerty, Maryann, "Talk Is Cheaper Long–Distance Callers Have Alternatives To Bell," *The Miami News*, Aug. 8, 1981.

Harrop, Peter, "New Electronics For Payment," (source unknown), 1982, pp. 339–342.

"Hart Industries Settles," Jul. 28, 1981.

Harvey Dean, "This Boss Works for Residence Customers" *Bell Laboratories Record*, Mar. 1990, pp. 81–86.

Higashiyama, Fukuo, et ano., "Credit Call Service," *Japan Telecommunications Review*, Oct. 1980, pp. 308–309.

"The History Of The Payphone," http://www.kitecom.co.uk/phone/histor1.html.

Hughes, Le A., "Busy . . . busy . . . busy . . . New Phone Service Faces First–Day Problems," *The Miami Herald*, Jul. 8, 1981.

"IC Cards Are On The Way," *TE&M*, May 15, 1987, pp. 71, 74–75.

Komatsu, Hiroyuki, "Station Message Detailed Accounting System KX–400," *IWATSU Gino*, vol. 21, No. 1, 1982.

Lannon, John F., "How To Save Money And Increase Your Telecommunications Capabilities," *Hospital Topics*, Sep./Oct. 1982, pp. 30–34.

Lawser, John J., et ano., "Realizing The Potential Of The Stored Program Controlled Network," *Bell Laboratories Record*, Mar. 1979, pp. 85–89.

Lessin, Arlen R., "Smart Card Technology and How It Can Be Used," *American Banker*, May 20, 1982.

Lipman, Andrew D., "Computer II And Coinless Pay Phones," *Telephony*, Sep. 16, 1985, pp. 53–57.

Lissandrello, George J., "Future's Bright For Smart Cards," Telephone *Engineer & Management*, Nov. 1, 1985.

Lucking, K.F.C., "Card Operated Pre–Payment Metering," Sangamo Electricity Metering, U.K., 1978.

Matsui, Hiroyuki, et al., "A Multi–Functional Telephone With Memory Cards Which Expand Talking Services," *IEEE Transcations On Consumer Electronics*, vol. 34, No. 3, Aug. 1988, pp. 749–758.

Merzer, Martin, "Cut–Rate Long Distance Calls Replace AT&T's Monopoly," *Miami Herald*, Sep. 29, 1980, Communications p. 6.

"Microprocessor–Controlled Telephone System," New Products, *Telecommunications Journal*, Mar. 1983, p. 151.

Mier, Edwin E., "Inside the Smart Card," *Data Communications*, Jun. 1982.

Mills, Mark, "Memory Cards: A New Concept In Personal Computing," *Byte Publications, Inc.,* Jan. 1984, pp. 154–156, 159–160, 162, 164, 166, 168.

Peterson, Erlend D., "The Brigham Young University Touch–Tone Telephone Data Entry and Computer Voice Response Registration System: An Analysis of Student Acceptability," A Dissertation presented to the Department of Educational Administration Brigham Young University, Apr. 1985.

Schaffer, S., "'PCM' Switching System," *The Tenth Convention of Electrical and Electronics Engineers In Israel*, Oct. 1977.

"Smart Cards im Vormarsch: Elektronisches Geld," *Kommunikationstechnik*, Mar. 1985, pp. 39–41.

Walker Leigh, Vanya, "US Vanguard Visits France To Look At The Smart Card," *American Banker*, Aug. 11, 1982.

Webster's II New College Dictionary, Houghton Mifflin Company, 1995, pp. 401, 1134.

Yehoshua, Etkin, et. ano., "Design Principles And Implementation Of Business Communication Systems (TBA–62)," *The 11th Convention of Electrical and Electronics Engineers In Israel*, Oct. 1979.

Bonnell, Fraser, "Audio Response At Tymshare," Nov. 5, 1982.

Carroll, Bob, "Linking ACDs With Audio Response Units," *Telemarketing*, Sep. 1985, pp. 40–43.

"Class Feature: Calling Number Delivery," *Bell Communications Research*, Technical Reference, TR–TSY–000031, Issue 2, Jun. 1988.

Cloward, William H., "Sophisticated, High Speech Capacity Voice Response Applications For End Users," The Official Proceedings Of Speech Tech '86, Voice Input/Output Applications Show And Conference, Apr. 28–30, 1986, New York, NY, pp. 58–61.

Friedes, A., et al., "ISDN Opportunities For Large Business—800 Service Customers," IEEE International Conference on Communications '86, Toronto, Canada Jun. 22–25, 1986, pp. 28–32.

Grant, Steven C., et ano., "The Teleconnect Guide To Automatic Call Distributors," Bookcrafters, Chelsea, MI, 1985, pp. 4–16.

Hladik, William M., et al., "Mechanizing The Customer Access To Network Trouble Reporting Operations," Bell Communications Research, Inc., ISSLS 88, The International Symposium On Subscriber Loops And Services Proceedings, Boston, MA, Sep. 11–16, 1988, pp. 0262–0266.

Wang, Emil, "Intelligent Call Processing In Automatic Call Distributors," *Business Communications Review*, Jan.–Feb. 1988, pp. 22–26.

General Trading Co., Inc., VoiceStar Proposal Jan. 29, 1988 (Vz Cal 339367–339414).

Gitlin, Bob, "Impersonal Touch? Risk Management Resources' Bottom Line Outweighs Criticism of Voice Processing," Communications News, Feb. 1, 1990, vol. 27, No. 2.

Periphonics Corporation, Bank of American Versatel Home Banking System, Sep. 2, 1980 (Vz Cal 339415–339456).

Steven C. Grant and Yvonne Brooks Grant, *The Teleconnect Guide to Automatic Call Distributors,* $2^{nd}$ Ed. Jan. 1985, ("The Teleconnect Guide").

*Special Feature: The Automated Switchboard Attendant in the Telemanagement Report*, pp. 49–56, vol. 2, No. 5 (15), Jun. 1984 ("The Telemanagement Report").

Via Cable, vol. 2, No. 7 (Nov. 1982).

Via Cable, vol. 3, No. 1 (Dec./Jan. 1983).

CableData U.S. Computer System Annual Report (1982).

Letter from Douglas Semon, Director of Engineering, New Technology Development, Viacom Cable to Mr. Semir Serazi, CATV Division, Zenith Electronics Corp., dated Feb. 22, 1985.

Letter from Andrew Paff, Manager, New Business Development to Donna Brickell, Project Manager, Pacific Bell, dated May 21, 1985.

*A Trick of a National Pay–Per–view Ordering and Billing System*, published by the 1986 Convention Technical Program Committee of the National Cable Television Asscociation (Mar. 1986).

Viacom Cable Memo dated May 20, 1986.

Customer Interface User Manual dated Oct. 18, 1986.

Viacom Cable Memo dated Nov. 26, 1986.

The Yankee Group, "Cable and the Telcos: From Confrontation to Détente,"—Jun. 1983, pp. 162–167.

"The Voice," VCT Quarterly Newsletter, vol. 1, No. 2, Winter 1986, pp. 1–6 (Vz Cal 291279–291284).

"The Voice," VCT Quarterly Newsletter, vol. 2, No. 3, Winter 1987, pp. 1–6 (Vz Cal 291273–291278).

Reisman, Bert, "New IBM Audio Response Unit Enables Computer To Answer Information Inquiries With Voice Messages," IBM Technical Information, Jan. 24, 1964, pp. 1–3 (press release) (Vz Cal 114854–114856).

"IBM system/360 Component Description, IBM 7772 Audio Response Unit," IBM Systems Reference Library, File No. S360–09, Form A27–2711–0, 1966, pp. 5–29 (Vz Cal 92638–92669).

"The Mississauga Transit Demonstration of the Automatic Bus Passenger Information Concept," Prepared for the Urban Transportation Research Branch of Canadian Surface Transportation Administration Transport Canada, Montreal, Quebec, Mar. 1979, 10 pages (Vz Cal 114898–114906).

Oliver, G.P., "Architecture of System X, Part 3–Local Exchanges," *POEEJ*, vol. 73, Apr. 1980, pp. 27–34 (Vz Cal 92702–92709).

Letter from Murphy (ASI Teleprocessing) to Kopruco (International Tech) re ASI Teleprocessing and its SolidVoice System, May 27, 1980 (Vz Cal 134785).

Shepard, H., et al., "Functional Specification for Bank of America, EBR—Bank Card Systems, San Francisco, California, Aug. 8, 1980," Aug. 8, 1980 (Vz Cal 137696–137721).

"Calling Card Service Debuts in St. Louis, Marks a significant change in customer calling service," *Bell Labs News*, Oct. 5, 1961?, 2 pages (Vz Cal 134090–134091, and duplicate under Vz Cal 93043–93044).

"BT–II Data Entry/Voice Response Processor," PTC, Perception Technology Corporation, 6 pages (Vz Cal 133904–133909).

Special Edition: 1983 Buyer's Guide Issue, *Speech Technology*, Math/Machine Voice Communications, vol. 1, No. Jan./Feb. 1983, 9 pages (introductory pages for the following articles) (Vz Cal 80988–80996).

Lea, Wayne, "Selecting the Best Speech Recognizer for the Job," *Speech Technology*, Jan/Feb. 1983, pp. 10–29 (Vz Cal 80997–81016).

Voiers, William D., "Evaluating Processed Speech Using the Diagnostic Rhyme Test," *Speech Technology*, Jan/Feb. 1983, pp. 30–39 (Vz Cal 81017–81026).

Rubinchek, Benjamin, "Toward Standards for Speech I/O Systems," *Speech Technology*, Jan./Feb. 1983, pp. 40–42 (Vz Cal 81027–81031).

Sorace, R.E., et al., "Interactive Voice and Video Game Shows Off Speech Recognizer Advances," *Speech Technology*, Jan./Feb. 1983, pp. 45–53 (Vz Cal 81032–81041).

"Voice Leaders Speak Out," *Speech Technology*, Jan./Feb. 1983, pp. 55–69 (Vz Cal 81042–81056).

Bell, Donald, et al., "Designing Experiments to Evaluate Speech I/O Devices and Applications," *Speech Technology*, Jan./Feb. 1983, pp. 70–79 (Vz Cal 81057–81066).

Stoughton, Alan M., "Personal Computers Deliver Economical Speech Aids to the Handicapped," *Speech Technology*, Jan./Feb. 1983, pp. 80–88 (Vz Cal 81067–81075).

DeSipio, Richard G., et al., "Avionics System Plays 'Ask and Tell' with Its Operator," *Speech Technology*, Jan./Feb. 1983, pp. 89–93 (Vz Cal 81076–81080).

Baker, Janet M., et al., "Aspects of Stochastic Modeling for Speech Recognition," *Speech Technology*, Jan./Feb. 1983, pp. 94–97 (Vz Cal 81081–81087).

Prull, Dale W., "Signal Squeezing Produces High–Quality Speech in PCM Systems," *Speech Technology*, Jan./Feb. 1983, pp. 107–115 (Vz Cal 81088–81096).

Chan, Chi Foon, et al., "A Total Approach to Speech Recognition," *Speech Technology*, Jan./Feb. 1983, pp. 116–118, 121–128, 130 (Vz Cal 81097–81109).

"What's The Best Way to Analyze Speech and Other Non–Stationary Signals?" "Digital Sound", *Speech Technology*, Jan./Feb. 1983, 2 pages (Vz Cal 81110–81111).

Datavoice Technology, Publication #3850201A, Jan. 1983, Periphonics (Vz Cal 140657–140678).

Shepard, H., et al., Functional Specification for First Hawaiian Bank, 165 South King Street, Honolulu, Hawaii 96847, Original: Sep. 26, 1980, First Revision: Sep. 13, 1982, Second Revision: Oct. 13, 1983, System No. 2010, Reference No. 12038 (Vz Cal137521–137564).

Computer System Proposal for Oceanic Cablevision, Honolulu, Hawaii, Nov. 17, 1983, by Business Systems, Inc., 2720 Wade Hampton Blvd., Greenville, S.C. 29615 (Vz Cal 92432–92436).

Touch Tone Data Entry/Voice Response Systems, The Perception Technology Corporation Marketing Agreement (Advance Copy), Prepared by: AT&T Information Systems, W. Gourley, R. Fortin, J. Maynes, May 1984 (Vz Cal 79189–79238).

Special Feature, The Automated Switchboard Attendant, *The Telemanagement Report*, vol. 2, No. 5 (15)—Jun. 1984, pp. 50–56 (Vz Cal 114914–114921).

Uenohara, Michiyuki, "Speech Products and Their Applications in Japan," NEC Corporation, *Speech Tech '85*, pp. 273–276 (Vz Cal 92690–92693).

"The Automated Switchboard Attendant gives you . . . ", Dytel, 4 pages (handwritten date: Jun. 1986) (Vz Cal 85945–85948).

Kirvan, Paul F., "Centrex Positions Itself for Your Future," *Business Communications Review*, Jul.–Aug. 1985, vol. 15, No. 4, pp. 2–6 (Vz Cal87688–87694).

Hills, Michael T., "Does Equal Access Have a Place in Automatic Route Selection Patterns?" *Business Communications Review*, Jul.–Aug. 1985, vol. 15, No. 4, pp. 20–25 (Vz Cal 87695–87700).

McQuillan, John, "Office Automation Strategies," *Business Communications Review*, Jul.–Aug. 1985, vol. 15, No. 4, pp. 38–39 (Vz Cal 87701–87702).

AT&T Speech Response Service Product Description, (Advance Copy), Jul. 22, 1985 (Vz Cal 135020–135033).

Bank–By–Phone, Your most convenient way to bank and pay your bills, California First Bank, Form 2850–D, Rev. Sep. 1985 (Vz Cal 92374–92386).

Kauffman, Marc, "Pay–per–view technologies: Real–time vs. store and forward," *Communications Technology,* Oct. 1985, pp. 36, 48, 50–52 (Vz Cal 92310–92314).

Ferber, Leon, "Voice response IPPV," *Communications Engineering & Design/The Magazine of,* Oct. 1985, 3 pages (Vz Cal 92729–92732).

Wienski, Robert M., et al., "Getting Ready for ISDN," *Business Communications Review*, Nov.–Dec. 1985, pp. 2–6 (Vz Cal 87731–87736).

Speech Response Service, Automated Course Registration for College Administrators, AT&T, 1986, 4 pages (Vz Cal 92352–92355, and duplicate under Vz Cal 134803–134806).

Toth, Victor, J., "Washington Perspective, Computer III—The Challenge That could Be the FCC's Undoing," *Business Communications Review*, Jan.–Feb. 1986, pp. 25–30 (Vz Cal 140145–140150).

Toth, Victor "Telecom Legislation: The Time Is Almost Ripe But this Time Let's Do It Right," *Business Communications Review*, Mar.–Apr. 1986, pp. 8–12 (Vz Cal 89987–89994).

Speech Response Service Marketing Guide, Prepared by: AT&T Information Systems, Speech Response Service Product Marketing, Apr. 1986 (Vz Cal 135971–136002).

Letter from Pollpeter (Rockwell International) to Scally (Perception Technology Corporation) re Rockwell's interest in offering an Audio Response Unit as part of the Galaxy ACD (Automatic Call Distributor) Product Line, May 27, 1986, 1 page (Vz Cal 93068).

Draft Baybanks Systems, Inc. Telephone Banking Requirements Report, Project No. 1816, Prepared by: Becca Ellis, Carol Bubilis, Larry Mariasis, Nov. 7, 1986, pp. 1–37, Exhibit A and Exhibit B (Vz Cal 137618–137655).

Voice News, vol. 7, No. 1, Jan. 1987, pp. 1–8 (Vz Cal 79725–79732).

Letter from Brown (CECORP) to Ferber (NUSC/CU) re request for information on CEVOICE (along with CEVOICE Demo Instructions), Apr. 29, 1987, 5 pages total including letter (Vz Cal 92408–92412).

The Aspect CallCenter, *Business Communications Review,* vol. 17, No. 3, May–Jun. 1987, pp. 43–45 (Vz Cal 90444–90472).

Letter from Glenn Appleyard (Phone Programs Inc.) to Scally (Perception Technology Corp.) re Request for Information for equipment to be used by Phone Programs Illinois, Inc. (1 page), Jul. 9, 1987 (Vz Cal 92389).

The Complete Guide to the "Dial–It" Business, by InfoText Magazine, 1988, pp. 1–81 (Vz Cal 92202–92288).

Gordon, James R., "PBX Vendors Jockey for Position," *Business Communications Review*, vol. 18, No. 1, Jan.–Feb. 1988, pp. 7–10 (Vz Cal 90163–90168).

Wallace, Bob, "Amex details experience with ISDN at user meeting; First PRI user cites better productivity, service" *Network World, Inc.,* Oct. 3, 1988, 3 pages (Vz Cal 89844–89846).

Sharma, Ranjana, "On the ACD cutting edge," *Network World, Inc.,* Oct. 17, 1988, 2 pages (Vz Cal 89842–89843).

"Phone–Based System Reduces Registration Frustration and Costs," T.H.E. (Technological Horizons in Education) Journal, Dec./Jan. 1988/89, 1 page + cover (Vz Cal 92970–92971).

Toader, Adrian, "'900': Image the opportunities," *Voice Processing Magazine,* $3^{rd}$ quarter 1989, 1 page (Vz Cal 92413).

"A Load of Technology and Know–How," *Inbound/Outbound Magazine*, Oct. 1989, 4 pages (Vz Cal 92414–92417).

"Data Entry/Voice Response, Today's simplest, most cost–effective approach to data entry and retrieval," by Perception Technology, 8 pages, May 1985 (Vz Cal 92344–92351).

Urix Corporation Product Data, 5 pages, 1984 (Vz Cal 134815–134819).

Field, Rebecca R., "SMDR—Designing A Resource Management Tool," *Business Communications Review*, Jan.–Feb. 1985, pp. 19–27 (Vz Cal 87590–87598).

"Voice response systems offer many benefits," *Telecommunications Technology*, vol. 4, No. 4, Apr. 1986, 4 pages (Vz Cal 79092–79095).

Addendum for Colombia: The ANI Feature, Oct. 1986, pp. 1–11 (Vz Cal 96113–96123).

"Getting the Vendor's Attention", "Northern Announces ISDN for SL–1s and SL–200S", "Who Will Play in AT&Ts UNMA Game?" *Business Communications Review*, Nov.–Dec. 1987, 2 pages (Vz Cal 90550–90551).

"Lo–Ad Communications, Preliminary Functional Specification," by: Ken Teagan (Software Engineer), May 19, 1989, Lo–Ad Communications, pp. 1–14 (Vz Cal 92418–92431).

"Turning the Clock Back to a Good Idea," *Communication & Computer Product & Software News*, Mar./Apr. 1990, reprint by Periphonics, 1 page (Vz Cal 133903).

Letter from Steinhoff (Dytel Corporation) to Pavelle (Symbolics Inc.) re The Automated Switchboard Attendant, enclosing brochure (The Automated Switchboard Attendant Product Notes, Issue 2—Nov. 1983 (1 page letter and 4 page brochure), Dec. 9, 1985 (Vz Cal 92317–92321).

Toth, Victor J., "Washington Perspective, The AT&T and GTE Consent Decrees—One Decree Too Many," *Business Communications Review*, (handwritten date: 1985), 1 page (Vc Cal 87599).

Wallace, Bob, "Call It Telethievery," ComputerWorld, Jul. 4, 1984, pp. 31–33, 35–36.

S. Sirazi, C. Bestler, T. Rossen and G. Reichard, Jr., "Comparative Study of Hybrid–IPPV Implementations," *NCTA Technical Papers*, 1985, pp. 27–33, presented Jun. 3, 1985 to Cable 85, in Las Vegas, NV.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 2, 20, 25, 27 and 29 is confirmed.

Claims 3–19, 21–24, 26, 28 and 30–32 were not reexamined.

* * * * *

(12) EX PARTE REEXAMINATION CERTIFICATE (10737th)
United States Patent
Katz

(10) Number: US 6,512,415 C2
(45) Certificate Issued: *Oct. 14, 2015

(54) TELEPHONIC-INTERFACE GAME CONTROL SYSTEM

(75) Inventor: Ronald A. Katz, Los Angeles, CA (US)

(73) Assignee: Ronald A. Katz Technology Licensing L.P., Los Angeles, CA (US)

Reexamination Request:
No. 90/012,413, Jul. 31, 2012
No. 90/012,643, Sep. 14, 2012

Reexamination Certificate for:
Patent No.: 6,512,415
Issued: Jan. 28, 2003
Appl. No.: 09/340,618
Filed: Jun. 28, 1999

Reexamination Certificate C1 6,512,415 issued Nov. 10, 2009

Certificate of Correction issued Mar. 6, 2012

( * ) Notice: This patent is subject to a terminal disclaimer.

Related U.S. Application Data

(63) Continuation of application No. 09/128,936, filed on Aug. 5, 1998, now Pat. No. 6,151,387, which is a continuation of application No. 08/559,538, filed on Nov. 16, 1995, now Pat. No. 5,793,846, which is a (Continued)

(51) Int. Cl.
*H04Q 3/64* (2006.01)
*H04Q 3/00* (2006.01)
(Continued)

(52) U.S. Cl.
CPC ............... *H04Q 3/665* (2013.01); *G07C 11/00* (2013.01); *G07C 15/005* (2013.01); *G07C 15/006* (2013.01); *H04M 3/36* (2013.01); *H04M 3/38* (2013.01); *H04M 3/46* (2013.01);

(Continued)

(58) Field of Classification Search
None
See application file for complete search history.

(56) References Cited

To view the complete listing of prior art documents cited during the proceedings for Reexamination Control Numbers 90/012,413 and 90/012,643, please refer to the USPTO's public Patent Application Information Retrieval (PAIR) system under the Display References tab.

*Primary Examiner* — Stephen J Ralis

(57) ABSTRACT

A control system CS interfaces a multiplicity of individual terminals T1-Tn through a telephone network facility CO to accommodate game formats. At the terminals T1-Tn, callers are prompted by voice-generated instructions to provide digital data that is identified for positive association with a caller and stored, as for processing. Calls are conditionally accepted based on a test of preliminary identification data (ANI or DNIS). Computer generated designations are assigned to callers and stored. Questions for game use are stored in banks, classified by order of difficulty for selection according to various formats. Specific game formats accommodate various time criteria and caller selection of degree of risk. Caller data is stored in cells along with statistical and identification data; also, key contest data is held accessible in a cache memory for reporting. Caller data may be processed individually or in interrelated formats as with reference to random or source data as to establish progressive subsets. A break-off control circuit may terminate the computer interface aborting to a manual terminal for direct communication with an operator. Real-time operation processing is an alternative to subsequently processing stored data.

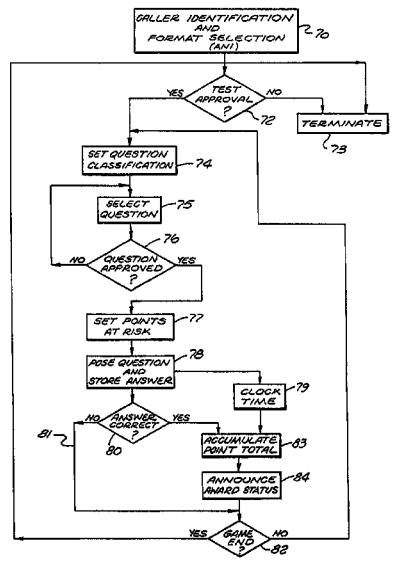

Related U.S. Application Data continuation of application No. 08/073,585, filed on Jun. 7, 1993, now Pat. No. 5,553,120, which is a continuation of application No. 07/534,907, filed on Jun. 8, 1990, now Pat. No. 5,218,631, which is a continuation-in-part of application No. 07/335,923, filed on Apr. 10, 1989, now Pat. No. 6,016,344, which is a continuation of application No. 07/194,258, filed on May 16, 1988, now Pat. No. 4,845,739, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned.

(51) Int. Cl.

| | |
|---|---|
| *H04Q 3/66* | (2006.01) |
| *H04Q 3/74* | (2006.01) |
| *H04M 3/51* | (2006.01) |
| *H04M 3/50* | (2006.01) |
| *H04M 11/00* | (2006.01) |
| *H04M 3/46* | (2006.01) |
| *H04M 3/487* | (2006.01) |
| *H04M 3/38* | (2006.01) |
| *G07C 15/00* | (2006.01) |
| *G07C 11/00* | (2006.01) |
| *H04M 3/493* | (2006.01) |
| *H04M 3/36* | (2006.01) |
| *H04Q 3/545* | (2006.01) |
| *H04Q 3/72* | (2006.01) |
| *H04M 3/436* | (2006.01) |
| *H04M 3/42* | (2006.01) |
| *A63F 3/08* | (2006.01) |

(52) U.S. Cl.
CPC ............... *H04M 3/493* (2013.01); *H04M 3/51* (2013.01); *H04M 11/00* (2013.01); *H04Q 3/002* (2013.01); *H04Q 3/5455* (2013.01); *H04Q 3/54533* (2013.01); *H04Q 3/54591* (2013.01); *H04Q 3/72* (2013.01); *H04Q 3/74* (2013.01); *A63F 2003/086* (2013.01); *H04M 3/42059* (2013.01); *H04M 3/42102* (2013.01); *H04M 3/436* (2013.01); *H04M 2201/40* (2013.01); *H04M 2203/2016* (2013.01); *H04M 2242/22* (2013.01); *H04Q 2213/1309* (2013.01); *H04Q 2213/1316* (2013.01); *H04Q 2213/1322* (2013.01); *H04Q 2213/1328* (2013.01); *H04Q 2213/1332* (2013.01); *H04Q 2213/13034* (2013.01); *H04Q 2213/1337* (2013.01); *H04Q 2213/13072* (2013.01); *H04Q 2213/13091* (2013.01); *H04Q 2213/13093* (2013.01); *H04Q 2213/13095* (2013.01); *H04Q 2213/13096* (2013.01); *H04Q 2213/13097* (2013.01); *H04Q 2213/13103* (2013.01); *H04Q 2213/13106* (2013.01); *H04Q 2213/13107* (2013.01); *H04Q 2213/13173* (2013.01); *H04Q 2213/13175* (2013.01); *H04Q 2213/13178* (2013.01); *H04Q 2213/13204* (2013.01); *H04Q 2213/13256* (2013.01); *H04Q 2213/13349* (2013.01); *H04Q 2213/13375* (2013.01); *H04Q 2213/13376* (2013.01); *H04Q 2213/13377* (2013.01)

EX PARTE
REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1, 2, 20 and 24 are cancelled.

Claims 3-19, 21-23, 26, 28 and 30-32 were not reexamined.

Claims 25, 27 and 29 previously confirmed in another reexamination proceeding.

\* \* \* \* \*